(12) United States Patent
Zingg et al.

(10) Patent No.: US 6,521,681 B1
(45) Date of Patent: *Feb. 18, 2003

(54) PHENOL-FREE STABILIZATION OF POLYOLEFIN FIBRES

(75) Inventors: Jürg Zingg, Reinach (CH); Jean-Roch Pauquet, Kaiseraugst (CH); Christoph Kröhnke, Breisach (DE)

(73) Assignee: Ciba Specialty Chemicals Corporation, Tarrytown, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/880,386

(22) Filed: Jun. 23, 1997

(30) Foreign Application Priority Data

Jul. 5, 1996 (CH) .................................. 1687/96

(51) Int. Cl.$^7$ .................. C08K 5/1535; C08K 5/3432; C08K 5/5333; C08K 5/524
(52) U.S. Cl. .................. 524/99; 524/102; 524/103; 524/104; 524/111; 524/117; 524/118; 524/119; 524/120; 524/126; 524/128; 524/135; 524/151; 524/405
(58) Field of Search .................. 524/109, 111, 524/117, 118, 119, 120, 126, 128, 135, 151, 102, 103, 99; 252/405

(56) References Cited

U.S. PATENT DOCUMENTS

| | | | | |
|---|---|---|---|---|
| 4,325,863 A | | 4/1982 | Hinsken et al. | 624/111 |
| 4,338,244 A | | 7/1982 | Hinsken et al. | 524/109 |
| 4,665,112 A | | 5/1987 | Berdahl | 524/111 |
| 4,867,907 A | * | 9/1989 | Burton et al. | 524/118 |
| 4,912,155 A | * | 3/1990 | Burton | 524/118 |
| 5,175,312 A | | 12/1992 | Dubs et al. | 549/307 |
| 5,216,052 A | | 6/1993 | Nesvadba et al. | 524/108 |
| 5,252,643 A | * | 10/1993 | Nesvadba | 524/111 |
| 5,308,901 A | * | 5/1994 | Hobbs et al. | 524/120 |
| 5,340,855 A | * | 8/1994 | Meier et al. | 524/111 |
| 5,356,966 A | | 10/1994 | Nesvadba | 524/111 |
| 5,364,895 A | * | 11/1994 | Stevenson et al. | 524/120 |
| 5,367,008 A | | 11/1994 | Nesvadba | 524/111 |
| 5,369,159 A | | 11/1994 | Nesvadba | 524/111 |
| 5,414,033 A | * | 5/1995 | Nesvadba | 524/120 |
| 5,428,162 A | | 6/1995 | Nesvadba | 544/221 |
| 5,428,177 A | | 6/1995 | Nesvadba | 549/304 |
| 5,488,117 A | | 1/1996 | Nesvadba | 549/302 |
| 5,516,920 A | | 5/1996 | Nesvadba et al. | 549/307 |
| 5,596,033 A | * | 1/1997 | Horsey et al. | 524/102 |
| 5,777,113 A | | 7/1998 | Pitteloud | 544/198 |

FOREIGN PATENT DOCUMENTS

| | | | | |
|---|---|---|---|---|
| GB | 2252325 | * | 8/1992 | 524/111 |
| GB | 2266531 | | 11/1993 | |
| GB | 2305180 | | 4/1997 | |

OTHER PUBLICATIONS

N.S. Allen et al "Light stabilizer . . . . polypropylene film"—Polymer Degradation and Stability , vol. 24, (1989)17–31, Elsevier Applied Science Pub.*

The Condensed Chemical Dictionary, 10$^{th}$ Edition, Revised by Gessner G. Hawley, Van Nostrand Reinhold Company. p. 988 (1981).

The 4$^{th}$ Enlarged Edition of Concise Chemical and Technical Dictionary, Edited by H. Bennett, Chemical Publishing Co. Inc., New York, NY, p. 1094 (1986).

Ullmann's Encyclopedia of Industrial Chemistry, 5$^{th}$ , Completely revised edition, vol. B8, p. 21 (1995).

* cited by examiner

*Primary Examiner*—Peter Szekely
(74) *Attorney, Agent, or Firm*—Kevin T. Mansfield; Luther A. R. Hall

(57) ABSTRACT

Organic materials which possess outstanding stability to oxidative, thermal or light-induced degradation comprise as stabilizers at least one compound of the benzofuran-2-one type and at least one compound of the sterically hindered amine type.

17 Claims, No Drawings

PHENOL-FREE STABILIZATION OF POLYOLEFIN FIBRES

The present invention relates to compositions comprising an organic material subject to oxidative, thermal or light-induced degradation, especially polyolefins, for example polyolefin fibres, and as stabilizers at least one compound of the benzofuran-2-one type and at least one compound of the sterically hindered amine type, and to the use thereof for stabilizing organic materials against oxidative, thermal or light-induced degradation.

The use of compounds of the benzofuran-2-one type as stabilizers for organic polymers is known, for example, from U.S. Pat. Nos. 4,325,863; 4,388,244; 5,175,312; 5,252,643; 5,216,052; 5,369,159; 5,488,117; 5,356,966; 5,367,008; 5,428,162; 5,428,177 or 5,516,920.

Sterically hindered amines, including in particular compounds containing 2,2,6,6-tetramethylpiperidyl groups, are known as "hindered amine" light stabilizers (HALS).

The known stabilizers do not satisfy in every respect the high requirements which a stabilizer is required to meet, especially with regard to shelf life, water absorption, sensitivity to hydrolysis, in-process stabilization, colour properties, volatility, migration behaviour, compatibility and improvement in protection against light. As a result there continues to be a need for effective stabilizers for organic materials, especially polyolefins, for example polyolefin fibres, that are sensitive to oxidative, thermal and/or light-induced degradation.

Polyolefin fibres have to date been stabilized with sterically hindered phenols in combination with compounds from the group of the organic phosphites or phosphonites and, in some cases, with additional use of light stabilizers. The use of such stabilizer mixtures leads in many cases to yellowing of the polyolefin fibres thus produced, especially under the action of $NO_x$ gas, referred to in the art as gas fading. In many cases discoloration occurs even during processing, especially in the case of melt extrusion. It is also known that compounds from the group of the sterically hindered amines, which may be added as light stabilizers, show an antagonistic effect together with the sterically hindered phenols, which adversely effects the long-term thermal stability.

It has now been found that a stabilizer mixture comprising at least one compound of the benzofuran-2-one type and at least one compound of the sterically hindered amine type is particularly suitable as a stabilizer for organic materials which are sensitive to oxidative, thermal or light-induced degradation. Such phenol-free stabilization systems exhibit, in particular, excellent stabilization of polyolefins in the course of processing to polypropylene fibres, for example. These novel stabilizer systems suppress the discoloration of the organic materials during processing, have an excellent action in respect of resistance to the effect of $NO_x$ (no gas fading) and, moreover, exhibit improved long-term thermal stability relative to stabilization systems which include phenolic antioxidants. The sterically hindered amines, which replace the phenolic long-term thermal stabilizers, additionally provide good protection against photooxidative degradation of the organic material.

The present invention therefore provides compositions comprising a) an organic material which is subject to oxidative, thermal or light-induced degradation, b) at least one compound having a benzofuran-2-one moiety, and c) at least one compound having a sterically hindered amine radical.

The present invention also provides compositions comprising, in addition to components (a), (b) and (c), also d) at least one compound from the group of the organic phosphites or phosphonites.

Compositions which are of interest include those comprising as component (b) a compound of the formula I

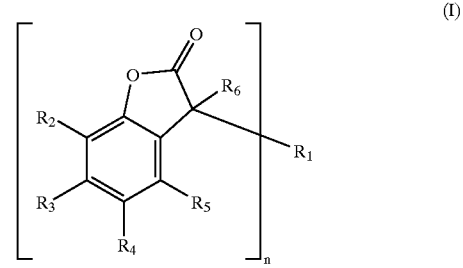

in which, if n is 1,

R$_1$ is unsubstituted or C$_1$–C$_4$alkyl-, C$_1$–C$_4$alkoxy-, C$_1$–C$_4$alkylthio-, hydroxyl-, halo-, amino-, C$_1$–C$_4$alkylamino-, phenylamino- or di(C$_1$–C$_4$alkyl)amino-substituted naphthyl, phenanthryl, anthryl, 5,6,7,8-tetrahydro-2-naphthyl, 5,6,7,8-tetrahydro-1-naphthyl, thienyl, benzo[b]thienyl, naphtho[2,3-b]thienyl, thianthrenyl, dibenzofuryl, chromenyl, xanthenyl, phenoxathiinyl, pyrrolyl, imidazolyl, pyrazolyl, pyrazinyl, pyrimidinyl, pyridazinyl, indolizinyl, isoindolyl, indolyl, indazolyl, purinyl, quinolizinyl, isoquinolyl, quinolyl, phthalazinyl, naphthyridinyl, quinoxalinyl, quinazolinyl, cinnolinyl, pteridinyl, carbazolyl, β-carbolinyl, phenanthridinyl, acridinyl, perimidinyl, phenanthrolinyl, phenazinyl, isothiazolyl, phenothiazinyl, isoxazolyl, furazanyl, biphenyl, terphenyl, fluorenyl or phenoxazinyl, or R$_1$ is a radical of the formula II

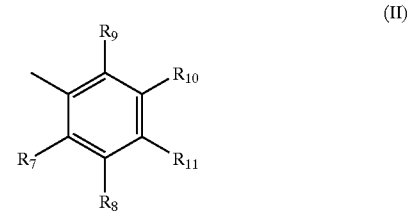

and if n is 2,

R$_1$ is unsubstituted or C$_1$–C$_4$alkyl- or hydroxy-substituted phenylene or naphthylene; or is —R$_{12}$—X—R$_{13}$—, R$_2$, R$_3$, R$_4$ and R$_5$ independently of one another are hydrogen, chlorine, hydroxyl, C$_1$–C$_{25}$alkyl, C$_7$–C$_9$-phenylalkyl, unsubstituted or C$_1$–C$_4$alkyl-substituted phenyl; unsubstituted or C$_1$–C$_4$alkyl-substituted C$_5$–C$_8$cycloalkyl; C$_1$–C$_{18}$alkoxy, C$_1$–C$_{18}$alkylthio, C$_1$–C$_4$alkylamino, di(C$_1$–C$_4$alkyl)amino, C$_1$–C$_{25}$alkanoyloxy, C$_1$–C$_{25}$alkanoylamino, C$_3$–C$_{25}$alkenoyloxy, C$_3$–C$_{25}$alkanoyloxy which is interrupted by oxygen, sulfur or

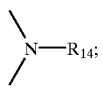

$C_6$–$C_9$cycloalkylcarbonyloxy, benzoyloxy or $C_1$–$C_{12}$alkyl-substituted benzoyloxy; or else the radicals $R_2$ and $R_3$ or the radicals $R_3$ and $R_4$ or the radicals $R_4$ and $R_5$, together with the carbon atoms to which they are attached, form a benzo ring, $R_4$ is additionally —$(CH_2)_p$—$COR_{15}$ or —$(CH_2)_q$OH or, if $R_3$, $R_5$ and $R_6$ are hydrogen, $R_4$ is additionally a radical of the formula III

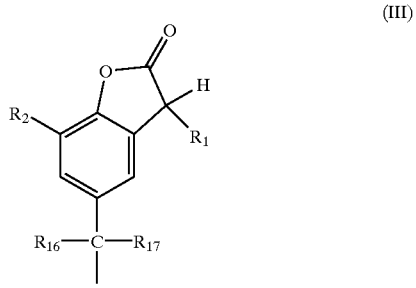

(III)

in which
$R_1$ is defined as indicated above for n=1,
$R_6$ is hydrogen or a radical of the formula IV

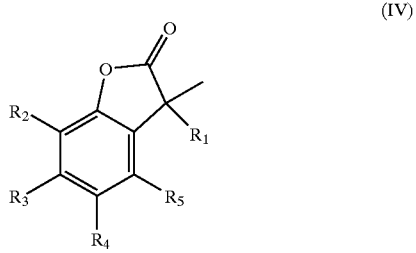

(IV)

where
$R_4$ is not a radical of the formula III and $R_1$ is defined as indicated above for n=1,
$R_7$, $R_8$, $R_9$, $R_{10}$ and $R_{11}$ independently of one another are hydrogen, halogen, hydroxyl, $C_1$–$C_{25}$alkyl, $C_2$–$C_{25}$alkyl interrupted by oxygen, sulfur or

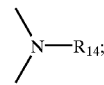

$C_1$–$C_{25}$alkoxy, $C_2$–$C_{25}$alkoxy interrupted by oxygen, sulfur or

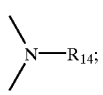

$C_1$–$C_{25}$alkylthio, $C_3$–$C_{25}$alkenyl, $C_3$–$C_{25}$alkenyloxy, $C_3$–$C_{25}$alkynyl, $C_3$–$C_{25}$alkynyloxy, $C_7$–$C_9$phenylalkyl, $C_7$–$C_9$phenylalkoxy, unsubstituted or $C_1$–$C_4$alkyl-substituted phenyl; unsubstituted or $C_1$–$C_4$alkyl-substituted phenoxy; unsubstituted or $C_1$–$C_4$alkyl-substituted $C_5$–$C_8$cycloalkyl; unsubstituted or $C_1$–$C_4$alkyl-substituted $C_5$–$C_8$cycloalkoxy; $C_1$–$C_4$alkylamino, di($C_1$–$C_4$alkyl)amino, $C_1$–$C_{25}$alkanoyl, $C_3$–$C_{25}$alkanoyl interrupted by oxygen, sulfur or

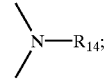

$C_1$–$C_{25}$alkanoyloxy, $C_3$–$C_{25}$alkanoyloxy interrupted by oxygen, sulfur or

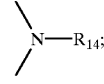

$C_1$–$C_{25}$alkanoylamino, $C_3$–$C_{25}$alkenoyl, $C_3$–$C_{25}$alkenoyl interrupted by oxygen, sulfur or

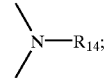

$C_3$–$C_{25}$alkenoyloxy, $C_3$–$C_{25}$alkenoyloxy interrupted by oxygen, sulfur or

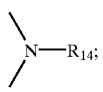

$C_6$–$C_9$cycloalkylcarbonyl, $C_6$–$C_9$cycloalkylcarbonyloxy, benzoyl or $C_1$–$C_{12}$alkyl-substituted benzoyl; benzoyloxy or $C_1$–$C_{12}$alkyl-substituted benzoyloxy;

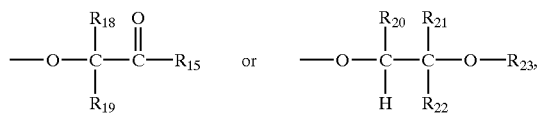

or else, in formula II, the radicals $R_7$ and $R_8$ or the radicals $R_8$ and $R_{11}$, together with the carbon atoms to which they are attached, form a benzo ring,
$R_{12}$ and $R_{13}$ independently of one another are unsubstituted or $C_1$–$C_4$alkyl-substituted phenylene or naphthylene,
$R_{14}$ is hydrogen or $C_1$–$C_8$alkyl,
$R_{15}$ is hydroxyl,

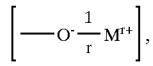

$C_1$–$C_{18}$alkoxy or

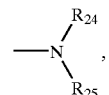

$R_{16}$ and $R_{17}$ independently of one another are hydrogen, $CF_3$, $C_1$–$C_{12}$alkyl or phenyl, or $R_{16}$ and $R_{17}$, together with the C atom to which they are attached, form a $C_5$–$C_8$cycloalkylidene ring which is unsubstituted or substituted from 1 to 3 times by $C_1$–$C_4$alkyl;

$R_{18}$ and $R_{19}$ independently of one another are hydrogen, $C_1$–$C_4$alkyl or phenyl, $R_{20}$ is hydrogen or $C_1$–$C_4$alkyl, $R_{21}$ is hydrogen, unsubstituted or $C_1$–$C_4$alkyl-substituted phenyl; $C_1$–$C_{25}$alkyl, $C_2$–$C_{25}$alkyl interrupted by oxygen, sulfur or

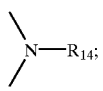

$C_7$–$C_9$phenylalkyl which is unsubstituted or substituted on the phenyl radical from 1 to 3 times by $C_1$–$C_4$alkyl; $C_7$–$C_{25}$phenylalkyl which is unsubstituted or substituted on the phenyl radical from 1 to 3 times by $C_1$–$C_4$alkyl and interrupted by oxygen, sulfur or

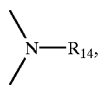

or else the radicals $R_{20}$ and $R_{21}$, together with the carbon atoms to which they are attached, form a $C_5$–$C_{12}$cycloalkylene ring which is unsubstituted or substituted from 1 to 3 times by $C_1C$–$_4$alkyl;

$R_{22}$ is hydrogen or $C_1$–$C_4$alkyl, $R_{23}$ is hydrogen, $C_1$–$C_{25}$alkanoyl, $C_3$–$C_{25}$alkenoyl, $C_3$–$C_{25}$alkanoyl interrupted by oxygen, sulfur or

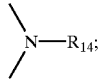

$C_2$–$C_{25}$alkanoyl substituted by a di($C_1$–$C_6$alkyl) phosphonate group;

$C_6$–$C_9$cycloalkylcarbonyl, thenoyl, furoyl, benzoyl or $C_1$–$C_{12}$alkyl-substituted benzoyl;

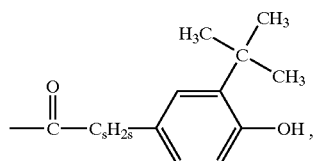

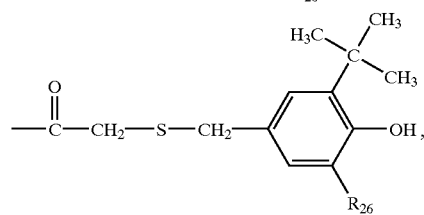

-continued

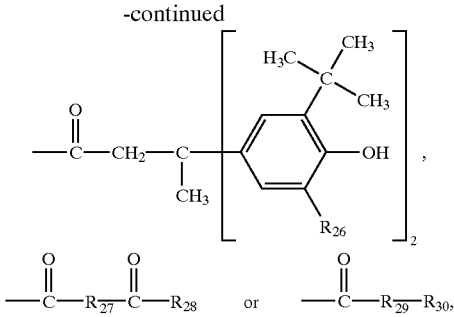

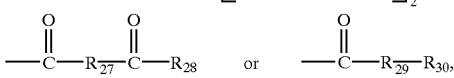

$R_{24}$ and $R_{25}$ independently of one another are hydrogen or $C_1$–$C_{18}$alkyl, $R_{26}$ is hydrogen or $C_1$–$C_8$alkyl, $R_{27}$ is a direct bond, $C_1$–$C_{18}$alkylene, $C_2$–$C_{18}$alkylene interrupted by oxygen, sulfur or

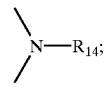

$C_2$–$C_{18}$alkenylene, $C_2$–$C_{20}$alkylidene, $C_7$–$C_{20}$phenylalkylidene, $C_5$–$C_8$cycloalkylene, $C_7$–$C_8$bicycloalkylene, unsubstituted or $C_1$–$C_4$alkyl-substituted phenylene, or

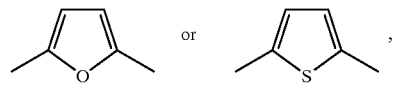

$R_{28}$ is hydroxyl,

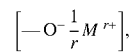

$C_1$–$C_{18}$alkoxy or

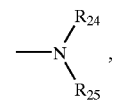

$R_{29}$ is oxygen, —NH— or

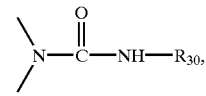

$R_{30}$ is $C_1$–$C_{18}$alkyl or phenyl, $R_{31}$ is hydrogen or $C_1$–$C_{18}$alkyl, M is an r-valent metal cation, X is a direct bond, oxygen, sulfur or —$NR_{31}$—, n is 1 or 2, p is 0, 1 or 2, q is 1, 2, 3, 4, 5 or 6, r is 1, 2 or 3, and s is 0, 1 or 2.

Unsubstituted or $C_1$–$C_4$alkyl-, $C_1$–$C_4$alkoxy-, $C_1$–$C_4$alkylthio-, hydroxyl-, halo-, amino-, $C_1$–$C_4$alkylamino-, phenylamino- or di($C_1$–$C_4$alkyl)amino-substituted naphthyl, phenanthryl, anthryl, 5,6,7,8-tetrahydro-2-naphthyl, 5,6,7,8-tetrahydro-1-naphthyl, thienyl, benzo[b]thienyl, naphtho[2,3-b]thienyl, thianthrenyl, dibenzofuryl, chromenyl, xanthenyl, phenoxathiinyl, pyrrolyl, imidazolyl, pyrazolyl, pyrazinyl, pyrimidinyl, pyridazinyl, indolizinyl, isoindolyl, indolyl, indazolyl, purinyl, quinolizinyl, isoquinolyl, quinolyl, phthalazinyl, naphthyridinyl, quinoxalinyl, quinazolinyl, cinnolinyl, pteridinyl, carbazolyl, β-carbolinyl, phenanthridinyl, acridinyl, perimidinyl, phenanthrolinyl, phenazinyl, isothiazolyl, phenothiazinyl, isoxazolyl, furazanyl, biphenyl, terphenyl, fluorenyl or phenoxazinyl is, for example, 1-naphthyl, 2-naphthyl, 1-phenylamino-4-naphthyl, 1-methylnaphthyl, 2-methylnaphthyl, 1-methoxy-2-naphthyl, 2-methoxy-1-naphthyl, 1-dimethylamino-2-naphthyl, 1,2-dimethyl-4-naphthyl, 1,2-dimethyl-6-naphthyl, 1,2-dimethyl-7-naphthyl, 1,3-dimethyl-6-naphthyl, 1,4-dimethyl-6-naphthyl, 1,5-dimethyl-2-naphthyl, 1,6-dimethyl-2-naphthyl, 1-hydroxy-2-naphthyl, 2-hydroxy-1-naphthyl, 1,4-dihydroxy-2-naphthyl, 7-phenanthryl, 1-anthryl, 2-anthryl, 9-anthryl, 3-benzo[b]thienyl, 5-benzo[b]thienyl, 2-benzo[b]thienyl, 4-dibenzofuryl, 4,7-dibenzofuryl, 4-methyl-7-dibenzofuryl, 2-xanthenyl, 8-methyl-2-xanthenyl, 3-xanthenyl, 2-phenoxathiinyl, 2,7-phenoxathiinyl, 2-pyrrolyl, 3-pyrrolyl, 5-methyl-3-pyrrolyl, 2-imidazolyl, 4-imidazolyl, 5-imidazolyl, 2-methyl-4-imidazolyl, 2-ethyl-4-imidazolyl, 2-ethyl-5-imidazolyl, 3-pyrazolyl, 1-methyl-3-pyrazolyl, 1-propyl-4-pyrazolyl, 2-pyrazinyl, 5,6-dimethyl-2-pyrazinyl, 2-indolizinyl, 2-methyl-3-isoindolyl, 2-methyl-1-isoindolyl, 1-methyl-2-indolyl, 1-methyl-3-indolyl, 1,5-dimethyl-2-indolyl, 1-methyl-3-indazolyl, 2,7-dimethyl-8-purinyl, 2-methoxy-7-methyl-8-purinyl, 2-quinolizinyl, 3-isoquinolyl, 6-isoquinolyl, 7-isoquinolyl, isoquinolyl, 3-methoxy-6-isoquinolyl, 2-quinolyl, 6-quinolyl, 7-quinolyl, 2-methoxy-3-quinolyl, 2-methoxy-6-quinolyl, 6-phthalazinyl, 7-phthalazinyl, 1-methoxy-6-phthalazinyl, 1,4-dimethoxy-6-phthalazinyl, 1,8-naphthyridin-2-yl, 2-quinoxalinyl, 6-quinoxalinyl, 2,3-dimethyl-6-quinoxalinyl, 2,3-dimethoxy-6-quinoxalinyl, 2-quinazolinyl, 7-quinazolinyl, 2-dimethylamino-6-quinazolinyl, 3-cinnolinyl, 6-cinnolinyl, 7-cinnolinyl, 3-methoxy-7-cinnolinyl, 2-pteridinyl, 6-pteridinyl, 7-pteridinyl, 6,7-dimethoxy-2-pteridinyl, 2-carbazolyl, 3-carbazolyl, 9-methyl-2-carbazolyl, 9-methyl-3-carbazolyl, β-carbolin-3-yl, 1-methyl-β-carbolin-3-yl, 1-methyl-β-carbolin-6-yl, 3-phenanthridinyl, 2-acridinyl, 3-acridinyl, 2-perimidinyl, 1-methyl-5-perimidinyl, 5-phenanthrolinyl, 6-phenanthrolinyl, 1-phenazinyl, 2-phenazinyl, 3-isothiazolyl, 4-isothiazolyl, 5-isothiazolyl, 2-phenothiazinyl, 3-phenothiazinyl, 10-methyl-3-phenothiazinyl, 3-isoxazolyl, 4-isoxazolyl, 5-isoxazolyl, 4-methyl-3-furazanyl, 2-phenoxazinyl or 10-methyl-2-phenoxazinyl.

Particular preference is given to unsubstituted or $C_1$–$C_4$alkyl-, $C_1$–$C_4$alkoxy-, $C_1$–$C_4$alkylthio-, hydroxyl-, phenylamino- or di($C_1$–$C_4$alkyl)amino-substituted naphthyl, phenanthryl, anthryl, 5,6,7,8-tetrahydro-2-naphthyl, 5,6,7,8-tetrahydro-1-naphthyl, thienyl, benzo[b]thienyl, naphtho[2,3-b]thienyl, thianthrenyl, dibenzofuryl, chromenyl, xanthenyl, phenoxathiinyl, pyrrolyl, isoindolyl, indolyl, phenothiazinyl, biphenyl, terphenyl, fluorenyl or phenoxazinyl such as, for example, 1-naphthyl, 2-naphthyl, 1-phenylamino-4-naphthyl, 1-methylnaphthyl, 2-methylnaphthyl, 1-methoxy-2-naphthyl, 2-methoxy-1-naphthyl, 1-dimethylamino-2-naphthyl, 1,2-dimethyl-4-naphthyl, 1,2-dimethyl-6-naphthyl, 1,2-dimethyl-7-naphthyl, 1,3-dimethyl-6-naphthyl, 1,4-dimethyl-6-naphthyl, 1,5-dimethyl-2-naphthyl, 1,6-dimethyl-2-naphthyl, 1-hydroxy-2-naphthyl, 2-hydroxy-1-naphthyl, 1,4dihydroxy-2-naphthyl, 7-phenanthryl, 1-anthryl, 2-anthryl, 9-anthryl, 3-benzo[b]thienyl, 5-benzo[b]thienyl, 2-benzo[b]thienyl, 4-dibenzofuryl, 4,7-dibenzofuryl, 4-methyl-7-dibenzofuryl, 2-xanthenyl, 8-methyl-2-xanthenyl, 3-xanthenyl, 2-pyrrolyl, 3-pyrrolyl, 2-phenothiazinyl, 3-phenothiazinyl, 10-methyl-3-phenothiazinyl.

Halogen (halo) is, for example, chlorine, bromine or iodine. Preference is given to chlorine.

Alkanoyl having up to 25 carbon atoms is a branched or unbranched radical such as, for example, formyl, acetyl, propionyl, butanoyl, pentanoyl, hexanoyl, heptanoyl, octanoyl, nonanoyl, decanoyl, undecanoyl, dodecanoyl, tridecanoyl, tetradecanoyl, pentadecanoyl, hexadecanoyl, heptadecanoyl, octadecanoyl, eicosanoyl or docosanoyl. Preference is given to alkanoyl having 2 to 18, especially 2 to 12, for example 2 to 6 carbon atoms. Particular preference is given to acetyl.

$C_2$–$C_{25}$alkanoyl substituted by a di($C_1$–$C_6$alkyl) phosphonate group is, for example, $(CH_3CH_2O)_2POCH_2CO-$, $(CH_3O)_2POCH_2CO-$, $(CH_3CH_2CH_2CH_2O)_2POCH_2CO-$, $(CH_3CH_2O)_2POCH_2CH_2CO-$, $(CH_3O)_2POCH_2CH_2CO-$, $(CH_3CH_2CH_2CH_2O)_2POCH_2CH_2CO-$, $(CH_3CH_2O)_2PO(CH_2)_4CO-$, $(CH_3CH_2O)_2PO(CH_2)_8CO-$ or $(CH_3CH_2O)_2PO(CH_2)_{17}CO-$.

Alkanoyloxy having up to 25 carbon atoms is a branched or unbranched radical such as, for example, formyloxy, acetoxy, propionyloxy, butanoyloxy, pentanoyloxy, hexanoyloxy, heptanoyloxy, octanoyloxy, nonanoyloxy, decanoyloxy, undecanoyloxy, dodecanoyloxy, tridecanoyloxy, tetradecanoyloxy, pentadecanoyloxy, hexadecanoyloxy, heptadecanoyloxy, octadecanoyloxy, eicosanoyloxy or docosanoyloxy. Preference is given to alkanoyloxy having 2 to 18, especially 2 to 12, for example 2 to 6 carbon atoms. Particular preference is given to acetoxy.

Alkenoyl having 3 to 25 carbon atoms is a branched or unbranched radical such as, for example, propenoyl, 2-butenoyl, 3-butenoyl, isobutenoyl, n-2,4-pentadienoyl, 3-methyl-2-butenoyl, n-2-octenoyl, n-2-dodecenoyl, iso-dodecenoyl, oleoyl, n-2-octadecenoyl or n-4-octadecenoyl. Preference is given to alkenoyl having 3 to 18, especially 3 to 12, for example 3 to 6, in particular 3 to 4 carbon atoms.

$C_3$–$C_{25}$alkenoyl interrupted by oxygen, sulfur or

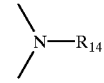

is, for example, $CH_3OCH_2CH_2CH=CHCO-$ or $CH_3OCH_2CH_2OCH=CHCO-$.

Alkenoyloxy having 3 to 25 carbon atoms is a branched or unbranched radical such as, for example, propenoyloxy, 2-butenoyloxy, 3-butenoyloxy, isobutenoyloxy, n-2,4-pentadienoyloxy, 3-methyl-2-butenoyloxy, n-2-octenoyloxy, n-2-dodecenoyloxy, iso-dodecenoyloxy, oleoyloxy, n-2-octadecenoyloxy or n-4-octadecenoyloxy. Preference is given to alkenoyloxy having 3 to 18, especially 3 to 12, for example 3 to 6, in particular 3 to 4 carbon atoms.

$C_3$–$C_{25}$alkenoyloxy interrupted by oxygen, sulfur or

is, for example, $CH_3OCH_2CH_2CH=CHCOO-$ or $CH_3OCH_2CH_2OCH=CHCOO-$.

$C_3$–$C_{25}$alkanoyl interrupted by oxygen, sulfur or

is, for example, $CH_3-O-CH_2CO-$, $CH_3-S-CH_2CO-$, $CH_3-NH-CH_2CO-$, $CH_3-N(CH_3)-CH_2CO-$, $CH_3-O-CH_2CH_2-O-CH_2CO-$, $CH_3-(O-CH_2CH_2-)_2O-CH_2CO-$, $CH_3-(O-CH_2CH_2-)_3O-CH_2CO-$ or $CH_3-(O-CH_2CH_2-)_4O-CH_2CO-$.

$C_3$–$C_{25}$alkanoyloxy interrupted by oxygen, sulfur or

is, for example, $CH_3-O-CH_2COO-$, $CH_3-S-CH_2COO-$, $CH_3-NH-CH_2COO-$, $CH_3-N(CH_3)-CH_2COO-$, $CH_3-O-CH_2CH_2-O-CH_2COO-$, $CH_3-(O-CH_2CH_2-)_2O-CH_2COO-$, $CH_3-(O-CH_2CH_2-)_3O-CH_2COO-$ or $CH_3-(O-CH_2CH_2-)_4O-CH_2COO-$.

$C_6$–$C_9$cycloalkylcarbonyl is, for example, cyclopentylcarbonyl, cyclohexylcarbonyl, cycloheptylcarbonyl or cyclooctylcarbonyl. Cyclohexylcarbonyl is preferred.

$C_6$–$C_9$cycloalkylcarbonyloxy is, for example, cyclopentylcarbonyloxy, cyclohexylcarbonyloxy, cycloheptylcarbonyloxy or cyclooctylcarbonyloxy. Cyclohexylcarbonyloxy is preferred.

$C_1$–$C_{12}$alkyl-substituted benzoyl, which preferably carries 1 to 3, especially 1 or 2 alkyl groups, is, for example, o-, m- or p-methylbenzoyl, 2,3-dimethylbenzoyl, 2,4-dimethylbenzoyl, 2,5-dimethylbenzoyl, 2,6-dimethylbenzoyl, 3,4-dimethylbenzoyl, 3,5-dimethylbenzoyl, 2-methyl-6-ethylbenzoyl, 4-tert-butylbenzoyl, 2-ethylbenzoyl, 2,4,6-trimethylbenzoyl, 2,6-dimethyl-4-tert-butylbenzoyl or 3,5-di-tert-butylbenzoyl. Preferred substituents are $C_1$–$C_8$alkyl, especially $C_1$–$C_4$alkyl.

$C_1$–$C_{12}$alkyl-substituted benzoyloxy, which preferably carries 1 to 3, especially 1 or 2 alkyl groups, is, for example, o-, m- or p-methylbenzoyloxy, 2,3-dimethylbenzoyloxy, 2,4-dimethylbenzoyloxy, 2,5-dimethylbenzoyloxy, 2,6-dimethylbenzoyloxy, 3,4-dimethylbenzoyloxy, 3,5-dimethylbenzoyloxy, 2-m ethyl-6-ethylbenzoyloxy, 4-tert-butylbenzoyloxy, 2-ethyl-benzoyloxy, 2,4,6-trimethylbenzoyloxy, 2,6-dimethyl-4-tert-butylbenzoyloxy or 3,5-di-tert-butylbenzoyloxy. Preferred substituents are $C_1$–$C_8$alkyl, especially $C_1$–$C_4$alkyl.

Alkyl having up to 25 carbon atoms is a branched or unbranched radical such as, for example, methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl or docosyl. One of the preferred meanings of $R_2$ and $R_4$ is, for example, $C_1$–$C_{18}$alkyl. A particularly preferred meaning of $R_4$ is $C_1$–$C_4$alkyl.

Alkenyl having 3 to 25 carbon atoms is a branched or unbranched radical such as, for example, propenyl, 2-butenyl, 3-butenyl, isobutenyl, n-2,4-pentadienyl, 3-methyl-2-butenyl, n-octenyl, n-2-dodecenyl, iso-dodecenyl, oleyl, n-2-octadecenyl or n-4-octadecenyl. Preference is given to alkenyl having 3 to 18, especially 3 to 12, for example 3 to 6, in particular 3 to 4 carbon atoms.

Alkenyloxy having 3 to 25 carbon atoms is a branched or unbranched radical such as, for example, propenyloxy, 2-butenyloxy, 3-butenyloxy, isobutenyloxy, n-2,4-pentadienyloxy, 3-methyl-2-butenyloxy, n-2-octenyloxy, n-2-dodecenyloxy, iso-dodecenyloxy, oleyloxy, n-2-octadecenyloxy or n-4-octadecenyloxy. Preference is given to alkenyloxy having 3 to 18, especially 3 to 12, for example 3 to 6, in particular 3 to 4 carbon atoms.

Alkynyl having 3 to 25 carbon atoms is a branched or unbranched radical such as, for example, propynyl

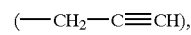

2-butynyl, 3-butynyl, n-2-octynyl, or n-2-dodecynyl. Preference is given to alkynyl having 3 to 18, especially 3 to 12, for example 3 to 6, in particular 3 to 4 carbon atoms.

Alkynyloxy having 3 to 25 carbon atoms is a branched or unbranched radical such as, for example, propynyloxy

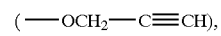

2-butynyloxy, 3-butynyloxy, n-2-octynyloxy, or n-2-dodecynyloxy. Preference is given to alkynyloxy having 3 to 18, especially 3 to 12, for example 3 to 6, in particular 3 to 4 carbon atoms.

$C_2$–$C_{25}$alkyl interrupted by oxygen, sulfur or

is, for example, $CH_3-O-CH_2-$, $CH_3-S-CH_2-$, $CH_3-NH-CH_2-$, $CH_3-N(CH_3)-CH_2-$, $CH_3-O-CH_2CH_2-O-CH_2-$, $CH_3-(O-CH_2CH_2-)_2O-CH_2-$, $CH_3-(O-CH_2CH_2-)_3O-CH_2-$ or $CH_3-(O-CH_2CH_2-)_4O-CH_2-$.

$C_7$–$C_9$phenylalkyl is, for example, benzyl, α-methylbenzyl, α,α-dimethylbenzyl or 2-phenylethyl. Benzyl and α,α-dimethylbenzyl are preferred.

$C_7$–$C_9$phenylalkyl which is unsubstituted or substituted on the phenyl radical from 1 to 3 times by $C_1$–$C_4$alkyl is, for example, benzyl, α-methylbenzyl, α,α-dimethylbenzyl, 2-phenylethyl, 2-methylbenzyl, 3-methylbenzyl, 4-methylbenzyl, 2,4-dimethylbenzyl, 2,6-dimethylbenzyl or 4-tert-butylbenzyl. Benzyl is preferred.

$C_7$–$C_{25}$phenylalkyl which is unsubstituted or substituted on the phenyl radical from 1 to 3 times by $C_1$–$C_4$alkyl and is interrupted by oxygen, sulfur or

is a branched or unbranched radical such as, for example, phenoxymethyl, 2-methylphenoxymethyl, 3-methylphenoxymethyl, 4-methylphenoxymethyl, 2,4-dimethylphenoxymethyl, 2,3-dimethylphenoxymethyl, phenylthiomethyl, N-methyl-N-phenylmethyl, N-ethyl-N-phenylmethyl, 4-tert-butylphenoxymethyl, 4-tert-butylphenoxyethoxymethyl, 2,4-di-tert-butylphenoxymethyl, 2,4-di-tert-butylphenoxyethoxymethyl, phenoxyethoxyethoxyethoxymethyl, benzyloxymethyl, benzyloxyethoxymethyl, N-benzyl-N-ethylmethyl or N-benzyl-N-isopropylmethyl.

$C_7$–$C_9$phenylalkoxy is, for example, benzyloxy, α-methylbenzyloxy, α,α-dimethylbenzyloxy or 2-phenylethoxy. Benzyloxy is preferred.

$C_1$–$C_4$alkyl-substituted phenyl, which preferably contains 1 to 3, especially 1 or 2 alkyl groups, is, for example, o-, m- or p-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 4-tert-butylphenyl, 2-ethylphenyl or 2,6-diethylphenyl.

$C_1$–$C_4$alkyl-substituted phenoxy, which preferably contains 1 to 3, especially 1 or 2 alkyl groups, is, for example, o-, m- or p-methylphenoxy, 2,3-dimethylphenoxy, 2,4-dimethylphenoxy, 2,5-dimethylphenoxy, 2,6-dimethylphenoxy, 3,4-dimethylphenoxy, 3,5-dimethylphenoxy, 2-methyl-6-ethylphenoxy, 4-tert-butylphenoxy, 2-ethylphenoxy or 2,6-diethylphenoxy.

Unsubstituted or $C_1$–$C_4$alkyl-substituted $C_5$–$C_8$cycloalkyl is, for example, cyclopentyl, methylcyclopentyl, dimethylcyclopentyl, cyclohexyl, methylcyclohexyl, dimethylcyclohexyl, trimethylcyclohexyl, tert-butylcyclohexyl, cycloheptyl or cyclooctyl. Preference is given to cyclohexyl and tert-butylcyclohexyl.

Unsubstituted or $C_1$–$C_4$alkyl-substituted $C_5$–$C_8$cycloalkoxy is, for example, cyclopentoxy, methylcyclopentoxy, dimethylcyclopentoxy, cyclohexoxy, methylcyclohexoxy, dimethylcyclohexoxy, trimethylcyclohexoxy, tert-butylcyclohexoxy, cycloheptoxy or cyclooctoxy. Preference is given to cyclohexoxy and tert-butylcyclohexoxy.

Alkoxy having up to 25 carbon atoms is a branched or unbranched radical such as, for example, methoxy, ethoxy, propoxy, isopropoxy, n-butoxy, isobutoxy, pentoxy, isopentoxy, hexoxy, heptoxy, octoxy, decyloxy, tetradecyloxy, hexadecyloxy or octadecyloxy. Preference is given to alkoxy having 1 to 12, especially 1 to 8, for example 1 to 6 carbon atoms.

$C_2$–$C_{25}$alkoxy interrupted by oxygen, sulfur or

is, for example, $CH_3$—O—$CH_2CH_2$O—, $CH_3$—S—$CH_2CH_2$O—, $CH_3$—NH—$CH_2CH_2$O—, $CH_3$—N($CH_3$)—$CH_2CH_2$O—, $CH_3$—O—$CH_2CH_2$—O—$CH_2CH_2$O—, $CH_3$—(O—$CH_2CH_2$—)$_2$O—$CH_2CH_2$O—, $CH_3$—(O—$CH_2CH_2$—)$_3$O—$CH_2CH_2$— or $CH_3$—(O—$CH_2CH_2$—)$_4$O—$CH_2CH_2$O—.

Alkylthio having up to 25 carbon atoms is a branched or unbranched radical such as, for example, methylthio, ethylthio, propylthio, isopropylthio, n-butylthio, isobutylthio, pentylthio, isopentylthio, hexylthio, heptylthio, octylthio, decylthio, tetradecylthio, hexadecylthio or octadecylthio. Preference is given to alkylthio having 1 to 12, especially 1 to 8, for example 1 to 6 carbon atoms.

Alkylamino having up to 4 carbon atoms is a branched or unbranched radical such as, for example, methylamino, ethylamino, propylamino, isopropylamino, n-butylamino, isobutylamino or tert-butylamino.

Di($C_1$–$C_4$alkyl)amino also means that the two radicals independently of one another are branched or unbranched, such as, for example, dimethylamino, methylethylamino, diethylamino, methyl-n-propylamino, methylisopropylamino, methyl-n-butylamino, methylisobutylamino, ethylisopropylamino, ethyl-n-butylamino, ethylisobutylamino, ethyl-tert-butylamino, diethylamino, diisopropylamino, isopropyl-n-butylamino, isopropylisobutylamino, di-n-butylamino or diisobutylamino.

Alkanoylamino having up to 25 carbon atoms is a branched or unbranched radical such as, for example, formylamino, acetylamino, propionylamino, butanoylamino, pentanoylamino, hexanoylamino, heptanoylamino, octanoylamino, nonanoylamino, decanoylamino, undecanoylamino, dodecanoylamino, tridecanoylamino, tetradecanoylamino, pentadecanoylamino, hexadecanoylamino, heptadecanoylamino, octadecanoylamino, eicosanoylamino or docosanoylamino. Preference is given to alkanoylamino having 2 to 18, especially 2 to 12, for example 2 to 6 carbon atoms.

$C_1$–$C_{18}$alkylene is a branched or unbranched radical such as, for example, methylene, ethylene, propylene, trimethylene, tetramethylene, pentamethylene, hexamethylene, heptamethylene, octamethylene, decamethylene, dodecamethylene or octadecamethylene. Preference is given to $C_1$–$C_{12}$alkylene, especially $C_1$–$C_8$alkylene.

A $C_1$–$C_4$alkyl-substituted $C_5$–$C_{12}$cycloalkylene ring, which preferably contains 1 to 3, especially 1 or 2 branched or unbranched alkyl group radicals is, for example, cyclopentylene, methylcyclopentylene, dimethylcyclopentylene, cyclohexylene, methylcyclohexylene, dimethylcyclohexylene, trimethylcyclohexylene, tert-butylcyclohexylene, cycloheptylene, cyclooctylene or cyclodecylene. Preference is given to cyclohexylene and tert-butylcyclohexylene.

$C_2$–$C_{18}$alkylene interrupted by oxygen, sulfur or

is, for example, —$CH_2$—O—$CH_2$—, —$CH_2$—S—$CH_2$—, —$CH_2$—NH—$CH_2$—, —$CH_2$—N($CH_3$)—$CH_2$—, —$CH_2$—O—$CH_2CH_2$—O—$CH_2$—, —$CH_2$—(O—$CH_2CH_2$—)$_2$O—$CH_2$—, —$CH_2$—(O—$CH_2CH_2$—)$_3$O—$CH_2$—, —$CH_2$—(O—$CH_2CH_2$—)$_4$O—$CH_2$— or —$CH_2CH_2$—S—$CH_2CH_2$—.

$C_2$–$C_{18}$alkenylene is, for example, vinylene, methylvinylene, octenylethylene or dodecenylethylene. Preference is given to $C_2$–$C_8$alkenylene.

Alkylidene having 2 to 20 carbon atoms is, for example, ethylidene, propylidene, butylidene, pentylidene, 4-methylpentylidene, heptylidene, nonylidene, tridecylidene, nonadecylidene, 1-methylethylidene, 1-ethylpropylidene or 1-ethylpentylidene. Preference is given to $C_2$–$C_8$alkylidene.

Phenylalkylidene having 7 to 20 carbon atoms is, for example, benzylidene,: 2-phenylethylidene or 1-phenyl-2-hexylidene. Preference is given to $C_7$–$C_9$-phenylalkylidene.

$C_5$–$C_8$cycloalkylene is a saturated hydrocarbon group having two free valencies and at least one ring unit and is, for example, cyclopentylene, cyclohexylene, cycloheptylene or cyclooctylene. Preference is given to cyclohexylene.

$C_7$–$C_8$bicycloalkylene is, for example, bicycloheptylene or bicyclooctylene.

Unsubstituted or $C_1$–$C_4$alkyl-substituted phenylene or naphthylene is, for example, 1,2-, 1,3-, 1,4-phenylene, 1,2-, 1,3-, 1,4-, 1,6-, 1,7-, 2,6- or 2,7-naphthylene. 1,4-Phenylene is preferred.

A $C_1$–$C_4$alkyl-substituted $C_5$–$C_8$cycloalkylidene ring, which preferably contains 1 to 3, especially 1 or 2 branched or unbranched alkyl group radicals is, for example, cyclopentylidene, methylcyclopentylidene, dimethylcyclopentylidene, cyclohexylidene, methylcyclohexylidene, dimethylcyclohexylidene, trimethylcyclohexylidene, tert-butylcyclohexylidene, cycloheptylidene or cyclooctylidene. Preference is given to cyclohexylidene and tert-butylcyclohexylidene.

A mono-, di- or trivalent metal cation is preferably an alkali metal, alkaline earth metal or aluminium cation, for example, $Na^+$, $K^+$, $Mg^{++}$, $Ca^{++}$ or $Al^{+++}$.

Preference is given to compositions comprising as component (b) at least one compound of the formula I in which, if n is 2, $R_1$ is —$R_{12}$—X—$R_{13}$—, $R_{12}$ and $R_{13}$ are phenylene, X is oxygen or —$NR_{31}$—, and $R_{31}$ is $C_1$–$C_4$alkyl.

Preference is also given to compositions comprising as component (b) at least one compound of the formula I in which, if n is 1, $R_1$ is unsubstituted or $C_1$–$C_4$alkyl-, $C_1$–$C_4$alkoxy-, $C_1$–$C_4$alkylthio-, hydroxyl-, halo-, amino-, $C_1$–$C_4$alkylamino- or di($C_1$–$C_4$-alkyl)amino-substituted naphthyl, phenanthryl, thienyl, dibenzofuryl, carbazolyl, fluorenyl or a radical of the formula II

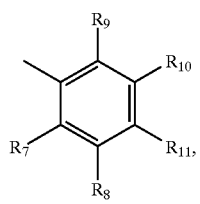

(II)

$R_7$, $R_8$, $R_9$, $R_{10}$ and $R_{11}$ independently of one another are hydrogen, chlorine, bromine, hydroxyl, $C_1$–$C_8$alkyl, $C_2$–$C_{18}$alkyl interrupted by oxygen or sulfur; $C_1$–$C_{18}$alkoxy, $C_2$–$C_{18}$alkoxy interrupted by oxygen or sulfur; $C_1$–$_8$alkylthio, $C_3$–$C_{12}$alkenyloxy, $C_3$–$C_{12}$alkynyloxy, $C_7$–$C_9$phenylalkyl, $C_7$–$C_9$phenylalkoxy, unsubstituted or $C_1$–$C_4$alkyl-substituted phenyl; phenoxy, cyclohexyl, $C_5$–$C_8$cycloalkoxy, $C_1$–$C_4$alkylamino, di($C_1$–$C_4$-alkyl) amino, $C_1$–$C_{12}$alkanoyl, $C_3$–$C_{12}$alkanoyl interrupted by oxygen or sulfur; $C_1$–$C_{12}$alkanoyloxy, $C_3$–$C_{12}$alkanoyloxy interrupted by oxygen or sulfur; $C_1$–$C_{12}$alkanoylamino, $C_3$–$C_{12}$alkenoyl, $C_3$–$C_{12}$alkenoyloxy, cyclohexylcarbonyl, cyclohexylcarbonyloxy, benzoyl or $C_1$–$C_4$alkyl-substituted benzoyl; benzoyloxy or $C_1$–$C_4$alkyl-substituted benzoyloxy;

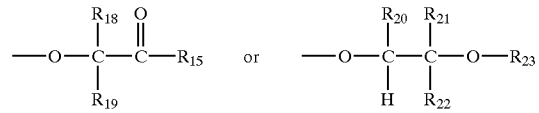

or else in formula II the radicals $R_7$ and $R_8$ or the radicals $R_8$ and $R_{11}$ together with the carbon atoms to which they are attached, form a benzo ring, $R_{15}$ is hydroxyl, $C_1$–$C_{12}$alkoxy or

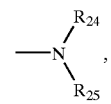

$R_{18}$ and $R_{19}$ independently of one another are hydrogen or $C_1$–$C_4$alkyl, $R_{20}$ is hydrogen, $R_{21}$ is hydrogen, phenyl, $C_1$–$C_{18}$alkyl, $C_2$–$C_{18}$alkyl interrupted by oxygen or sulfur; $C_7$–$C_9$phenylalkyl, $C_7$–$C_{18}$-phenylalkyl which is unsubstituted or substituted on the phenyl radical from 1 to 3 times by $C_1$–$C_4$alkyl and is interrupted by oxygen or sulfur, or else the radicals $R_{20}$ and $R_{21}$, together with the carbon atoms to which they are attached, form a cyclohexylene ring which is unsubstituted or substituted from 1 to 3 times by $C_1$–$C_4$alkyl, $R_{22}$ is hydrogen or $C_1$–$C_4$alkyl, $R_{23}$ is hydrogen, $C_1$–$C_{18}$alkanoyl, $C_3$–$C_{18}$alkenoyl, $C_3$–$C_{12}$alkanoyl interrupted by oxygen or sulfur; $C_2$–$C_{12}$alkanoyl substituted by a di($C_1$–$C_6$-alkyl) phosphonate group; $C_6$–$C_9$cycloalkylcarbonyl, benzoyl,

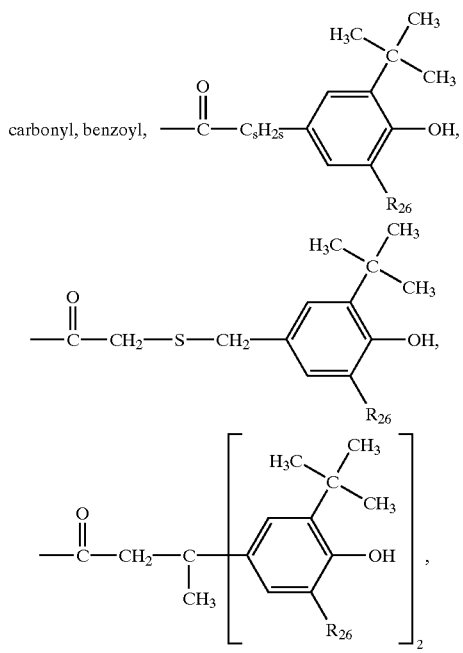

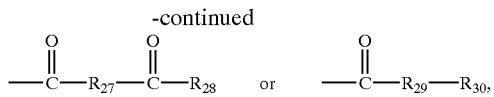

$R_{24}$ and $R_{25}$ independently of one another are hydrogen or $C_1$–$C_{12}$alkyl, $R_{26}$ is hydrogen or $C_1$–$C_4$alkyl, $R_{27}$ is $C_1$–$C_{12}$alkylene, $C_2$–$C_8$alkenylene, $C_2$–$C_8$alkylidene, $C_7$–$C_{12}$phenylalkylidene, $C_5$–$C_8$cycloalkylene or phenylene, $R_{28}$ is hydroxyl, $C_1$–$C_{12}$alkoxy or

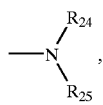

$R_{29}$ is oxygen or —NH—, $R_{30}$ is $C_1$–$C_{18}$alkyl or phenyl, and s is 1 or 2.

Preference is likewise given to compositions comprising as component (b) at least one compound of the formula I in which, if n is 1, $R_1$ is phenanthryl, thienyl, dibenzofuryl, unsubstituted or $C_1$–$C_4$alkyl-substituted carbazolyl; or is fluorenyl; or $R_1$ is a radical of the formula II

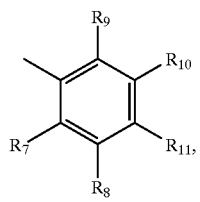

(II)

$R_7$, $R_8$, $R_9$, $R_{10}$ and $R_{11}$ independently of one another are hydrogen, chlorine, hydroxyl, $C_1$–$C_{18}$alkyl, $C_1$–$C_{18}$alkoxy, $C_1$–$C_{18}$alkylthio, $C_3$–$C_4$alkenyloxy, $C_3$–$C_4$alkinyloxy, $C_2$–$C_{18}$alkanoyloxy, phenyl, benzoyl, benzoyloxy or

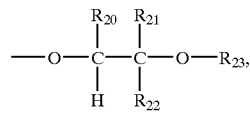

$R_{20}$ is hydrogen, $R_{21}$ is hydrogen, phenyl or $C_1$–$C_{18}$alkyl, or else the radicals $R_{20}$ and $R_{21}$, together with the carbon atoms to which they are attached, form a cyclohexylene ring which is unsubstituted or substituted from 1 to 3 times by $C_1$–$C_4$alkyl, $R_{22}$ is hydrogen or $C_1$–$C_4$alkyl, and $R_{23}$ is hydrogen, $C_1$–$C_{18}$alkanoyl or benzoyl.

Particular preference is given to compositions comprising as component (b) at least one compound of the formula I in which, if n is 1, $R_7$, $R_8$, $R_9$, $R_{10}$ and $R_{11}$ independently of one another are hydrogen, $C_1$–$C_{12}$alkyl, $C_1$–$C_{12}$alkoxy, $C_1$–$C_4$alkylthio, $C_2$–$Cl_2$alkanoyloxy,

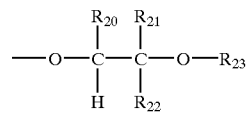

or phenyl, $R_{20}$, $R_{21}$ and $R_{22}$ are hydrogen, and $R_{23}$ is hydrogen or $C_1$–$C_{18}$alkanoyl.

Of particular interest are compositions comprising as component (b) at least one compound of the formula I in which $R_2$, $R_3$, $R_4$ and $R_5$ independently of one another are hydrogen, chlorine, $C_1$–$C_{18}$alkyl, benzyl, phenyl, $C_5$–$C_8$cycloalkyl, $C_1$–$C_{18}$alkoxy, $C_1$–$C_{18}$alkylthio, $C_1$–$C_{18}$alkanoyloxy, $C_1$–$C_{18}$alkanoylamino, $C_3$–$C_{18}$alkenoyloxy or benzoyloxy; or else the radicals $R_2$ and $R_3$ or the radicals $R_3$ and $R_4$ or the radicals $R_4$ and $R_5$, together with the carbon atoms to which they are attached, form a benzo ring, $R_4$ is additionally —$(CH_2)_p$—$COR_{15}$ or —$(CH_2)_q$OH, or, if $R_3$, $R_5$ and $R_6$ are hydrogen, $R_4$ is additionally a radical of the formula III, $R_{15}$ is hydroxyl, $C_1$–$C_{12}$alkoxy or

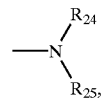

$R_{16}$ and $R_{17}$ are methyl groups or, together with the C atom to which they are attached, form a $C_5$–$C_8$cycloalkylidene ring which is unsubstituted or substituted from 1 to 3 times by $C_1$–$C_4$alkyl, $R_{24}$ and $R_{25}$ independently of one another are hydrogen or $C_1$–$C_{12}$alkyl, p is 1 or 2, and q is 2, 3, 4, 5 or 6.

Also of particular interest are compositions comprising as component (b) at least one compound of the formula I in which at least two of the radicals $R_2$, $R_3$, $R_4$ and $R_5$ are hydrogen.

Of special interest are compositions comprising as component (b) at least one compound of the formula I in which $R_3$ and $R_5$ are hydrogen.

Of very special interest are compositions comprising as component (b) at least one compound of the formula I in which $R_2$ is $C_1$–$C_4$alkyl, $R_3$ is hydrogen, $R_4$ is $C_1$–$C_4$alkyl or, if $R_6$ is hydrogen, $R_4$ is additionally a radical of the formula III, $R_5$ is hydrogen, and $R_{16}$ and $R_{17}$, together with the C atom to which they are attached, form a cyclohexylidene ring which is unsubstituted or substituted by $C_1$–$C_4$alkyl.

The following compounds are examples of the benzofuran-2-one type which are particularly suitable as component (b) in the novel composition: 3-[4-(2-acetoxyethoxy)phenyl]-5,7-di-tert-butyl-benzofuran-2-one; 5,7-di-tert-butyl-3-[4-(2-stearoyloxyethoxy)phenyl]benzofuran-2-one; 3,3'-bis[5,7-di-tert-butyl-3-(4-[2-hydroxyethoxy]phenyl)benzofuran-2-one]; 5,7-di-tert-butyl-3-(4-ethoxyphenyl)benzofuran-2-one; 3-(4-acetoxy-3, 5-dimethylphenyl)-5,7-di-tert-butylbenzofuran-2-one; 3-(3,5-dimethyl-4-pivaloyloxy-phenyl)-5,7-di-tert-butyl-benzofuran-2-one; 5,7-di-tert-butyl-3-phenylbenzofuran-2-one; 5,7-di-tert-butyl-3-(3,4-dimethylphenyl)benzofuran-2-one; 5,7-di-tert-butyl-3-(2,3-dimethylphenyl)benzofuran-2-one.

Also of special interest are compositions comprising as component (b) at least one compound of the formula V

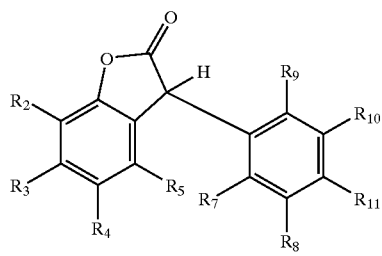

(V)

in which

R$_2$ is hydrogen or C$_1$–C$_6$alkyl,

R$_3$ is hydrogen,

R$_4$ is hydrogen, C$_1$–C$_6$alkyl or a radical of the formula IIIa

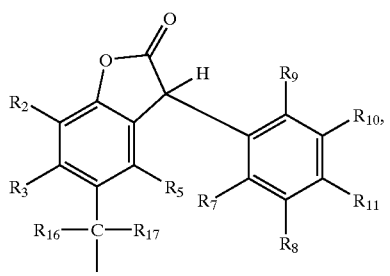

(IIIa)

R$_5$ is hydrogen,

R$_7$, R$_8$, R$_9$, R$_{10}$ and R$_{11}$ independently of one another are hydrogen, C$_1$–C$_4$alkyl, C$_1$–C$_4$alkoxy, C$_2$–C$_6$alkanoyloxy or

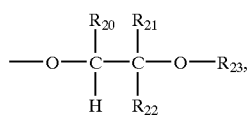

with the proviso that at least two of the radicals R$_7$, R$_8$, R$_9$, R$_{10}$ or R$_{11}$ are hydrogen, R$_{16}$ and R$_{17}$, together with the C atom to which they are attached, form a cyclohexylidene ring which is unsubstituted or substituted by C$_1$–C$_4$alkyl;

R$_{20}$, R$_{21}$, and R$_{22}$ are hydrogen, and

R$_{23}$ is hydrogen or C$_1$–C$_{18}$alkanoyl.

Very particular preference is given to compositions comprising as component (b) at least one compound of the formula Va or Vb

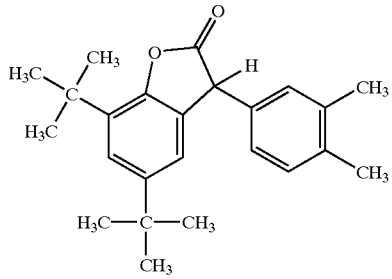

(Va)

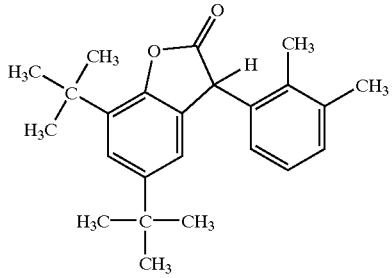

(Vb)

or a mixture of the two compounds of the formula Va and Vb.

The compounds of the benzofuran-2-one type as component (b) in the novel composition are known in the literature and their preparation is described, for example, in the following U.S. Pat. Nos. 4,325,863; 4,388,244; 5,175,312; 5,252,643; 5,216,052; 5,369,159; 5,488,117; 5,356,966; 5,367,008; 5,428,162; 5,428,177 or U.S. Pat. No. 5,516,920.

Compositions of interest include those comprising as component (c) at least one radical of the formula XII or XIII

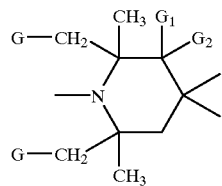

(XII)

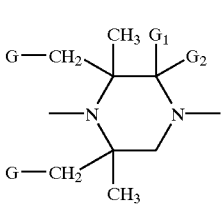

(XIII)

in which

G is hydrogen or methyl, and

G$_1$ and G$_2$ are hydrogen, methyl or together are oxygen.

Of particular interest are compositions comprising as component (c) at least one compound from the group of the sterically hindered amines of the class of compounds described under (a') to (g'), which comprise at least one radical of the formula XII or XIII.

(a') Compounds of the formula XIIa

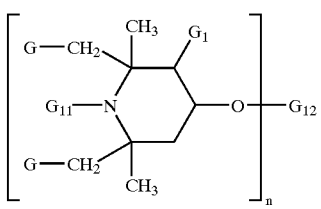

(XIIa)

in which
n is a number from 1 to 4,
G and $G_1$ independently of one another are hydrogen or methyl,
$G_{11}$ is hydrogen, O*, hydroxyl, NO, —$CH_2CN$, $C_1$–$C_{18}$alkyl, $C_3$–$C_8$alkenyl, $C_3$–$C_8$alkynyl, $C_7$–$C_{12}$aralkyl, $C_1$–$C_{18}$alkoxy, $C_5$–$C_8$cycloalkoxy, $C_7$–$C_9$phenylalkoxy, $C_1$–$C_8$alkanoyl, $C_3$–$C_5$alkenoyl, $C_1$–$C_{18}$alkanoyloxy, benzyloxy, glycidyl or a group —$CH_2CH(OH)$—Z, where $G_{11}$ is preferably hydrogen, $C_1$–$C_4$alkyl, allyl, benzyl, acetyl or acryloyl,
Z is hydrogen, methyl or phenyl, and,
if n is 1,
$G_{12}$ is hydrogen, $C_1$–$C_{18}$alkyl, which is uninterrupted or interrupted by one or more oxygen atoms, or is cyanoethyl, benzyl, glycidyl, a monovalent radical of an aliphatic, cycloaliphatic, araliphatic, unsaturated or aromatic carboxylic acid, carbamic acid or phosphorus-containing acid or a monovalent silyl radical, preferably a radical of an aliphatic carboxylic acid having 2 to 18 carbon atoms, of a cycloaliphatic carboxylic acid having 7 to 15 carbon atoms, of an α,β-unsaturated carboxylic acid having 3 to 5 carbon atoms or of an aromatic carboxylic acid having 7 to 15 carbon atoms, it being possible for the carboxylic acid to be substituted in each case in the aliphatic, cycloaliphatic or aromatic moiety from 1 to 3 times by —$COOZ_{12}$,
$Z_{12}$ is hydrogen, $C_1$–$C_{20}$alkyl, $C_3$–$C_{12}$alkenyl, $C_5$–$C_7$cycloalkyl, phenyl or benzyl, and,
if n is 2,
$G_{12}$ is $C_2$–$C_{12}$alkylene, $C_4$–$C_{12}$alkenylene, xylylene, a divalent radical of an aliphatic, cycloaliphatic, araliphatic or aromatic dicarboxylic acid, dicarbamic acid or phosphorus-containing acid or a divalent silyl radical, preferably a radical of an aliphatic dicarboxylic acid having 2 to 36 carbon atoms, of a cycloaliphatic or aromatic dicarboxylic acid having 8 to 14 carbon atoms or of an aliphatic, cycloaliphatic or aromatic dicarbamic acid having 8 to 14 carbon atoms, it being possible for the dicarboxylic acid to be substituted in each case in the aliphatic, cycloaliphatic or aromatic moiety by 1 or 2 groups of —$COOZ_{12}$, and,
if n is 3,
$G_{12}$ is a trivalent radical of an aliphatic, cycloaliphatic or aromatic tricarboxylic acid, which can be substituted in the aliphatic, cycloaliphatic or aromatic moiety by —$COOZ_{12}$, of an aromatic tricarbamic acid or of a phosphorus-containing acid, or is a trivalent silyl radical, and,
if n is 4,
$G_{12}$ is a tetravalent radical of an aliphatic, cycloaliphatic or aromatic tetracarboxylic acid.

The carboxylic acid radicals indicated include in each case radicals of the formula (—CO)$_n$R, in which the meaning of n is indicated above and the meaning of R is evident from the definition stated.

Any $C_1$–$C_{12}$alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

As $C_1$–$C_{18}$alkyl $G_{11}$ or $G_{12}$ can be, for example, the groups indicated above and also, for example, n-tridecyl, n-tetradecyl, n-hexadecyl or n-octadecyl.

If $G_{11}$ is $C_3$–$C_8$alkenyl it can, for example, be 1-propenyl, allyl, methallyl, 2-butenyl, 2-pentenyl, 2-hexenyl, 2-octenyl or 4-tert-butyl-2-butenyl.

$G_{11}$, as $C_3$–$C_8$alkynyl is preferably propargyl.

$G_{11}$ as $C_7$–$C_{12}$aralkyl is especially phenethyl and in particular benzyl.

$G_{11}$ as $C_1$–$C_8$alkanoyl is, for example, formyl, propionyl, butyryl, octanoyl, but preferably acetyl and as $C_3$–$C_5$alkenoyl is especially acryloyl.

$G_{12}$ as a monovalent radical of a carboxylic acid is, for example, an acetic, caproic, stearic, acrylic, methacrylic, benzoic or β-(3,5-di-tert-butyl-4-hydroxyphenyl)propionic acid radical.

If $G_{12}$ is a monovalent silyl radical then it is, for example, a radical of the formula —$(C_jH_{2j})$—$Si(Z')_2Z''$ in which j is an integer from the range from 2 to 5 and Z' and Z" independently of one another are $C_1$–$C_4$alkyl or $C_1$–$C_4$alkoxy.

If $G_{12}$ is a divalent radical of a dicarboxylic acid then it is, for example, a malonic, succinic, glutaric, adipic, suberic, sebacic, maleic, itaconic, phthalic, dibutylmalonic, dibenzylmalonic, butyl(3,5-di-tert-butyl-4-hydroxybenzyl)malonic or bicycloheptenedicarboxylic acid radical or a radical of the formula

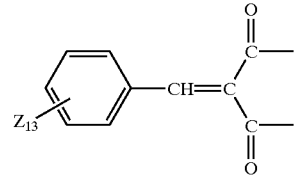

in which $Z_{13}$ is hydrogen,
$C_1$–$C_{12}$alkyl or $C_1$–$C_{12}$alkoxy. A particularly preferred meaning of $Z_{13}$ is hydrogen, $C_1$–$C_4$alkyl or $C_1$–$C_4$alkoxy, especially para-$C_1$–$C_4$alkoxy, for example p-methoxy.

If $G_{12}$ is a trivalent radical of a tricarboxylic acid then it is, for example, a trimellitic, citric or nitrilotriacetic acid radical.

If $G_{12}$ is a tetravalent radical of a tetracarboxylic acid then it is, for example, the tetravalent radical of butane-1,2,3,4-tetracarboxylic acid or of pyromellitic acid.

If $G_{12}$ is a divalent radical of a dicarbamic acid then it is, for example, a hexamethylenedicarbamic or a 2,4-tolylenedicarbamic acid radical.

Preference is given to compounds of the formula XIIa in which G is hydrogen, $G_{11}$ is hydrogen or methyl, n is 2 and $G_{12}$ is the diacyl radical of an aliphatic dicarboxylic acid having 4 to 12 carbon atoms.

Examples of polyalkylpiperidine compounds of this class are the following compounds:
1) 4-Hydroxy-2,2,6,6-tetramethylpiperidine
2) 1-Allyl-4-hydroxy-2,2,6,6-tetramethylpiperidine
3) 1-Benzyl-4-hydroxy-2,2,6,6-tetramethylpiperidine
4) 1-(4-tert-Butyl-2-butenyl)-4-hydroxy-2,2,6,6-tetramethylpiperidine
5) 4-Stearoyloxy-2,2,6,6-tetramethylpiperidine 6) 1-Ethyl-4-salicyloyloxy-2,2,6,6-tetramethylpiperidine
7) 4-Methacryloyloxy-1,2,2,6,6-pentamethylpiperidine
8) 1,2,2,6,6-Pentamethylpiperidin-4-yl β-(3,5-di-tert-butyl-4-hydroxyphenyl)propionate
9) Di(1-benzyl-2,2,6,6-tetramethylpiperidin-4-yl)maleate
10) Di(2,2,6,6-tetramethylpiperidin-4-yl)succinate
11) Di(2,2,6,6-tetramethylpiperidin-4-yl)glutarate
12) Di(2,2,6,6-tetramethylpiperidin-4-yl)adipate
13) Di(2,2,6,6-tetramethylpiperidin-4-yl)sebacate
14) Di(1,2,2,6,6-pentamethylpiperidin-4-yl)sebacate
15) Di(1,2,3,6-tetramethyl-2,6-diethyl-piperidin-4-yl)sebacate
16) Di(1-allyl-2,2,6,6-tetramethylpiperidin-4-yl)phthalate
17) 1-Hydroxy-4-β-cyanoethyloxy-2,2,6,6-tetramethylpiperidine
18) 1-Acetyl-2,2,6,6-tetramethylpiperidin-4-yl acetate
19) Tri(2,2,6,6-tetramethylpiperidin-4-yl)trimellitate
20) 1-Acryloyl-4-benzyloxy-2,2,6,6-tetramethylpiperidine
21) Di(2,2,6,6-tetramethylpiperidin-4-yl)diethylmalonate
22) Di(1,2,2,6,6-pentamethylpiperidin-4-yl)dibutylmalonate
23) Di(1,2,2,6,6-pentamethylpiperidin-4-yl)butyl(3,5-di-tert-butyl-4-hydroxybenzyl)malonate
24) Di(1-octyloxy-2,2,6,6-tetramethylpiperidin-4-yl)sebacate
25) Di(1-cyclohexyloxy-2,2,6,6-tetramethylpiperidin-4-yl)sebacate
26) Hexane-1',6'-bis(4-carbamoyloxy-1-n-butyl-2,2,6,6-tetramethylpiperidine)
27) Toluene-2',4'-bis(4-carbamoyloxy-1-n-propyl-2,2,6,6-tetramethylpiperidirie)
29) Phenyltris(2,2,6,6-tetramethylpiperidin-4-oxy)silane
30) Tris(1-propyl-2,2,6,6-tetramethylpiperidin-4-yl)phosphite
31) Tris(1-propyl-2,2,6,6-tetramethylpiperidin-4-yl)phosphate
32) Phenyl [bis(1,2,2,6,6-pentamethylpiperidin-4-yl)] phosphonate
33) 4-Hydroxy-1,2,2,6,6-pentamethylpiperidine
34) 4-Hydroxy-N-hydroxyethyl-2,2,6,6-tetramethylpiperidine
35) 4-Hydroxy-N-(2-hydroxypropyl)-2,2,6,6-tetramethylpiperidine
36) 1-Glycidyl-4-hydroxy-2,2,6,6-tetramethylpiperidine.

A particularly preferred compound of the formula XIIa is the compound of the formula H7.

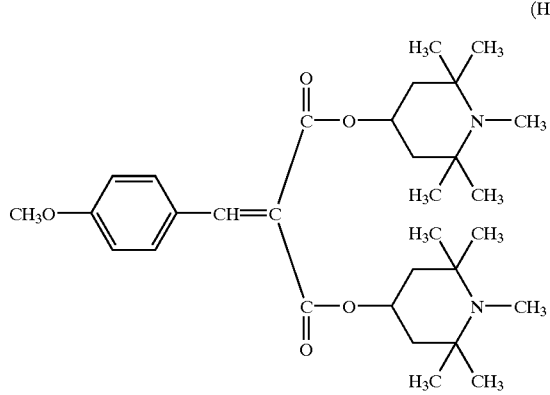

(H7)

(b') Compounds of the formula XIIb

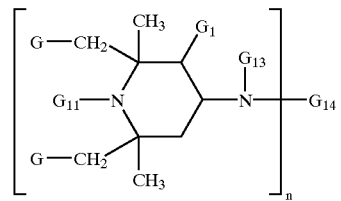

(XIIb)

in which n is the number 1 or 2,

G, $G_1$ and $G_{11}$ are as defined under (a'), $G_{13}$ is hydrogen, $C_1$–$C_{12}$alkyl, $C_2$–$C_5$hydroxyalkyl, $C_5$–$C_7$cycloalkyl, $C_7$–$C_8$aralkyl, $C_2$–$C_{18}$alkanoyl, $C_3$–$C_5$alkenoyl, benzoyl or a group of the formula

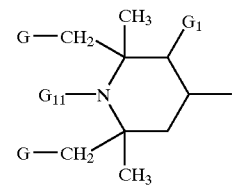

and, if n is 1, $G_{14}$ is hydrogen, $C_1$–$C_{18}$alkyl, $C_3$–$C_8$alkenyl, $C_5$–$C_7$cycloalkyl, or $C_1$–$C_4$alkyl substituted by a hydroxyl, cyano, alkoxycarbonyl or carbamide group; glycidyl, a group of the formula —$CH_2$—CH(OH)—Z or of the formula —CONH—Z, in which Z is hydrogen, methyl or phenyl, and if n is 2, $G_{14}$ is $C_2$–$C_{12}$alkylene, $C_6$–$C_{12}$arylene, xylylene, a —$CH_2$—CH(OH)—$CH_2$— group or a group —$CH_2$—CH(OH)—$CH_2$—O—D—O— in which D is $C_2$–$C_{10}$alkylene, $C_6$–$C_{15}$arylene, $C_6$–$C_{12}$cycloalkylene or, provided that $G_{13}$ is not alkanoyl, alkenoyl or benzoyl, $G_{14}$ can alternatively be 1-oxo-$C_2$–$C_{12}$alkylene, a divalent radical of an aliphatic, cycloaliphatic or aromatic dicarboxylic acid or dicarbamic acid or else can be the group —CO—, or, if n is 1, $G_{13}$ and $G_{14}$ together can be the divalent radical of an aliphatic, cycloaliphatic or aromatic 1,2- or 1,3-dicarboxylic acid.

Any $C_1$–$C_{12}$- or $C_1$–$C_{18}$alkyl substituents are as already defined under (a').

Any $C_5$–$C_7$cycloalkyl substituents are, in particular, cyclohexyl.

$G_{13}$ as $C_7$–$C_8$aralkyl is in particular phenylethyl or especially benzyl. As $C_2$–$C_5$hydroxyalkyl $G_{13}$ is, in particular, 2-hydroxyethyl or 2-hydroxypropyl.

$G_{13}$ as $C_2$–$C_{18}$alkanoyl is, for example, propionyl, butyryl, octanoyl, dodecanoyl, hexadecanoyl, octadecanoyl, but preferably acetyl, and as $C_3$–$C_5$alkenoyl is especially acryloyl.

If $G_{14}$ is $C_2$–$C_8$alkenyl it is, for example, allyl, methallyl, 2-butenyl, 2-pentenyl, 2-hexenyl or 2-octenyl.

$G_{14}$ as $C_1$–$C_4$alkyl substituted by a hydroxyl, cyano, alkoxycarbonyl or carbamide group can, for example, be 2-hydroxyethyl, 2-hydroxypropyl, 2-cyanoethyl, methoxycarbonylmethyl, 2-ethoxycarbonylethyl, 2-aminocarbonylpropyl or 2-(dimethylaminocarbonyl)ethyl.

Any $C_2$–$C_{12}$alkylene substituents are, for example, ethylene, propylene, 2,2-dimethylpropylene, tetramethylene, hexamethylene, octamethylene, decamethylene or dodecamethylene.

Any $C_6$–$C_{15}$arylene substituents are, for example, o-, m- or p-phenylene, 1,4-naphthylene or 4,4'-diphenylene.

As $C_6$–$C_{12}$cycloalkylene particular mention may be made of cyclohexylene.

Preference is given to compounds of the formula XIIb in which n is 1 or 2, G is hydrogen, $G_{11}$ is hydrogen or methyl, $G_{13}$ is hydrogen, $C_1$–$C_{12}$alkyl or a group of the formula

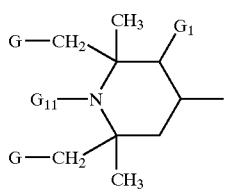

and $G_{14}$, if n=1, is hydrogen or $C_1$–$C_{12}$alkyl and, if n=2, is $C_2$–$C_8$alkylene or 1-oxo-$C_2$–$C_8$alkylene.

Examples of polyalkylpiperidine compounds of this class are the following compounds:

37) N,N'-Bis(2,2,6,6-tetramethylpiperidin-4-yl) hexamethylene-1,6-diamine
38) N,N'-Bis(2,2,6,6-tetramethylpiperidin-4-yl) hexamethylene-1,6-diacetamide
39) Bis(2,2,6,6-tetramethylpiperidin-4-yl)amine
40) 4-Benzoylamino-2,2,6,6-tetramethylpiperidine
41) N,N'-Bis(2,2,6,6-tetramethylpiperidin-4-yl)-N,N'-dibutyladipamide
42) N,N'-Bis(2,2,6,6-tetramethylpiperidin-4-yl)-N,N'-dicyclohexyl-2-hydroxypropylene-1,3-diamine
43) N,N'-Bis(2,2,6,6-tetramethylpiperidin-4-yl)-p-xylylenediamine
44) N,N'-Bis(2,2,6,6-tetramethylpiperidin-4-yl)succinamide
45) Di(2,2,6,6-tetramethylpiperidin-4-yl) N-(2,2,6,6-tetramethylpiperidin-4-yl)-β-amino-dipropionate
46) The compound of the formula

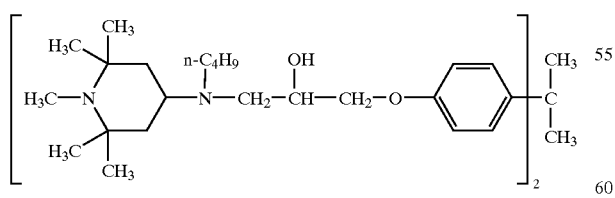

47) 4-(Bis-2-hydroxyethylamino)-1,2,2,6,6-pentamethylpiperidine
48) 4-(3-Methyl-4-hydroxy-5-tert-butylbenzamido)-2,2,6,6-tetramethylpiperidine
49) 4-Methacrylamido-1,2,2,6,6-pentamethylpiperidine (c') Compounds of the formula XIIc

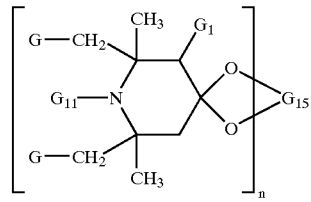

(XIIc)

in which n is the number 1 or 2, G, $G_1$ and $G_{11}$ are as defined under (a'), and if n is 1, $G_{15}$ is $C_2$–$C_8$alkylene or $C_2$–$C_8$hydroxyalkylene or $C_4$–$C_{22}$acyloxyalkylene, and, if n is 2, $G_{15}$ is the group $(-CH_2)_2C(CH_2-)_2$.

If $G_{15}$ is $C_2$–$C_8$alkylene or $C_2$–$C_8$hydroxyalkylene then it is, for example, ethylene, 1-methylethylene, propylene, 2-ethylpropylene or 2-ethyl-2-hydroxymethylpropylene.

$G_{15}$ as $C_4$–$C_{22}$acyloxyalkylene is, for example, 2-ethyl-2-acetoxymethylpropylene.

Examples of polyalkylpiperidine compounds of this class are the following compounds:

50) 9-Aza-8,8,10,10-tetramethyl-1,5-dioxaspiro[5.5]undecane
51) 9-Aza-8,8,10,10-tetramethyl-3-ethyl-1,5-dioxaspiro[5.5]undecane
52) 8-Aza-2,7,7,8,9,9-hexamethyl-1,4-dioxaspiro[4.5]decane
53) 9-Aza-3-hydroxymethyl-3-ethyl-8,8,9,10,10-pentamethyl-1,5-dioxaspiro[5.5]undecane
54) 9-Aza-3-ethyl-3-acetoxymethyl-9-acetyl-8,8,10,10-tetramethyl-1,5-dioxaspiro[5.5]undecane
55) 2,2,6,6-Tetramethylpiperidine-4-spiro-2'-(1',3'-dioxane)-5'-spiro-5"-(1",3"-dioxane)-2"-spiro-4'''-(2''',2''',6''',6'''-tetramethylpiperidine).

(d') Compounds of the formulae XIId, XIIe and XIIf, with compounds of the formula XIIf being preferred

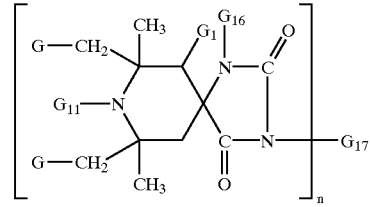

(XIId)

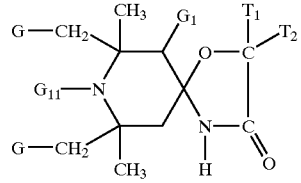

(XIIe)

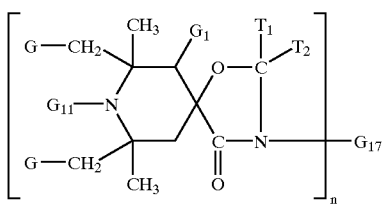

in which
> n is the number 1 or 2, G, $G_1$ and $G_{11}$ are as defined under (a'),
> $G_{16}$ is hydrogen, $C_1$–$C_{12}$alkyl, allyl, benzyl, glycidyl or $C_2$–$C_6$alkoxyalkyl, and
> if n is 1,
> $G_{17}$ is hydrogen, $C_1$–$C_{12}$alkyl, $C_3$–$C_5$alkenyl, $C_7$–$C_9$aralkyl, $C_5$–$C_7$cycloalkyl, $C_2$–$C_{14}$hydroxyalkyl, $C_2$–$C_6$alkoxyalkyl, $C_6$–$C_{10}$aryl, glycidyl or a group of the formula —$(CH_2)$p-COO—Q or of the formula —$(CH_2)$p-O—CO—Q in which p is 1 or 2 and Q is $C_1$–$C_4$alkyl or phenyl, and
> if n is 2,
> $G_{17}$ is $C_2$–$C_{12}$alkylene, $C_4$–$C_{12}$alkenylene, $C_6$–$C_{12}$arylene, a group —$CH_2$—CH(OH)—$CH_2$—O—D—O—$CH_2$—CH(OH)—$CH_2$— in which D is $C_2$–$C_{10}$alkylene, $C_6$–$C_{15}$arylene $C_6$–$C_{12}$cycloalkylene, or a group —$CH_2$CH(OZ')$CH_2$—(O$CH_2$—CH(OZ')$CH_2$)$_2$— in which Z' is hydrogen, $C_1$–$C_{18}$alkyl, allyl, benzyl, $C_2$–$C_{12}$alkanoyl or benzoyl,
> $T_1$ and $T_2$ independently of one another are hydrogen, $C_1$–$C_{18}$alkyl or unsubstituted or halo- or $C_1$–$C_4$alkyl-substituted $C_6$–$C_{10}$aryl or $C_7$–$C_9$aralkyl or $T_1$ and $T_2$, together with the carbon atom to which they are attached, form a $C_5$–$C_{14}$cycloalkane ring.

Any $C_1$–$C_{12}$alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

Any substituents in the meaning of $C_1$–$C_{18}$alkyl can, for example, be the groups listed above and also, for example, n-tridecyl, n-tetradecyl, n-hexadecyl or n-octadecyl.

Any $C_2$–$C_6$alkoxyalkyl substituents are, for example, methoxymethyl, ethoxymethyl, propoxymethyl, tert-butoxymethyl, ethoxyethyl, ethoxypropyl, n-butoxyethyl, tert-butoxyethyl, isopropoxyethyl or propoxypropyl.

If $G_{17}$ is $C_3$–$C_5$alkenyl then it is, for example, 1-propenyl, allyl, methallyl, 2-butenyl or 2-pentenyl.

$G_{17}$, $T_1$ and $T_2$ as $C_7$–$C_9$aralkyl are, in particular, phenethyl or especially benzyl. If $T_1$ and $T_2$ together with the carbon atom form a cycloalkane ring then this can, for example, be a cyclopentane, cyclohexane, cyclooctane or cyclododecane ring.

If $G_{17}$ is $C_2$–$C_4$hydroxyalkyl then it is, for example, 2-hydroxyethyl, 2-hydroxypropyl, 2-hydroxybutyl or 4-hydroxybutyl.

$G_{17}$, $T_1$ and $T_2$ as $C_6$–$C_{10}$aryl are, in particular, phenyl, α- or β-naphthyl which are unsubstituted or substituted by halogen or $C_1$–$C_4$alkyl.

If $G_{17}$ is $C_2$–$C_{12}$alkylene then it is, for example, ethylene, propylene, 2,2-dimethylpropylene, tetramethylene, hexamethylene, octamethylene, decamethylene or dodecamethylene.

$G_{17}$ as $C_4$–$C_{12}$alkenylene is, in particular, 2-butenylene, 2-pentenylene or 3-hexenylene.

If $G_{17}$ is $C_6$–$C_{12}$arylene then it is, for example, o-, m- or p-phenylene, 1,4-naphthylene or 4,4'-diphenylene.

If Z' is $C_2$–$C_{12}$alkanoyl then it is, for example, propionyl, butyryl, octanoyl, dodecanoyl, but preferably acetyl.

D as $C_2$–$C_{10}$alkylene, $C_6$–$C_{15}$arylene or $C_6$–$C_{12}$cycloalkylene is as defined under (b').

Examples of polyalkylpiperidine compounds of this class are the following compounds:
56) 3-Benzyl-1,3,8-triaza-7,7,9,9-tetramethylspiro[4.5]decane-2,4-dione
57) 3-n-Octyl-1,3,8-triaza-7,7,9,9-tetramethylspiro[4.5]decane-2,4-dione
58) 3-Allyl-1,3,8-triaza-1,7,7,9,9-pentamethylspiro[4.5]decane-2,4-dione
59) 3-Glycidyl-1,3,8-triaza-7,7,8,9,9-pentamethylspiro[4.5]decane-2,4-dione
60) 1,3,7,7,8,9,9-Heptamethyl-1,3,8-triazaspiro[4.5]decane-2,4-dione
61) 2-Isopropyl-7,7,9,9-tetramethyl-1-oxa-3,8-diaza-4-oxospiro[4.5]decane
62) 2,2-Dibutyl-7,7,9,9-tetramethyl-1-oxa-3,8-diaza-4-oxospiro[4.5]decane
63) 2,2,4,4-Tetramethyl-7-oxa-3,20-diaza-21-oxodispiro[5.1.11.2]heneicosane
64) 2-Butyl-7,7,9,9-tetramethyl-1-oxa-4,8-diaza-3-oxospiro[4.5]decane and preferably:
65) 8-Acetyl-3-dodecyl-1,3,8-triaza-7,7,9,9-tetramethylspiro[4.5]decane-2,4-dione
or the compounds of the following formulae:

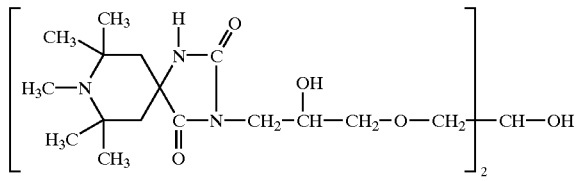

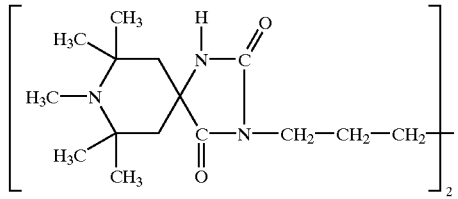

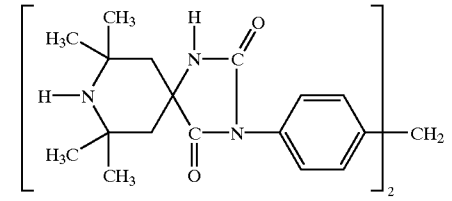

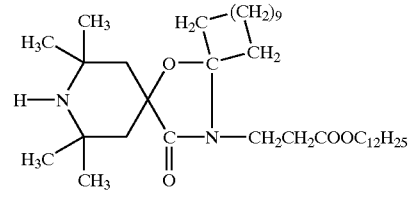

(e') Compounds of the formula XIIg, which in turn are preferred

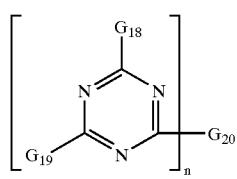
(XIIg)

in which n is the number 1 or 2 and $G_{18}$ is a group of one of the formulae

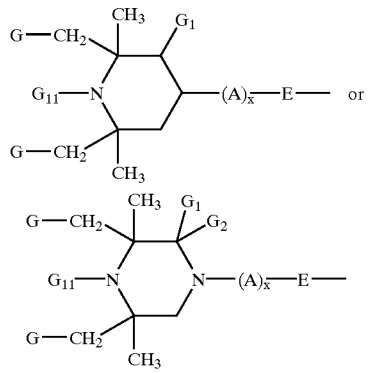

in which

G and $G_{11}$ are as defined under (a'), $G_1$ and $G_2$ are hydrogen, methyl or together are a substituent =O, E is —O— or —$NG_{13}$—, A is $C_2$–$C_6$alkylene or —$(CH_2)_3$—O—, x is the number 0 or 1, $G_{13}$ is hydrogen, $C_1$–$C_{12}$alkyl, $C_2$–$C_5$hydroxyalkyl or $C_5$–$C_7$cycloalkyl, $G_{19}$ is the same as $G_{18}$ or is one of the group —$NG_{21}G_{22}$, —$OG_{23}$, —$NHCH_2OG_{23}$ or —$N(CH_2OG_{23})_2$, $G_{20}$, if n=1, is the same as $G_{18}$ or $G_{19}$ and, if n=2, $G_{20}$ is a group —E—B—E—, in which B is $C_2$–$C_8$alkylene or $C_2$–$C_8$alkylene which is interrupted by 1 or 2 groups —N($G_{21}$)—, $G_{21}$ is $C_1$–$C_{12}$alkyl, cyclohexyl, benzyl or $C_1$–$C_4$hydroxyalkyl or a group of the formula

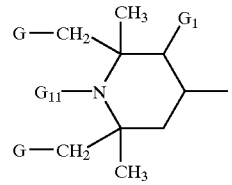

or a group of the formula

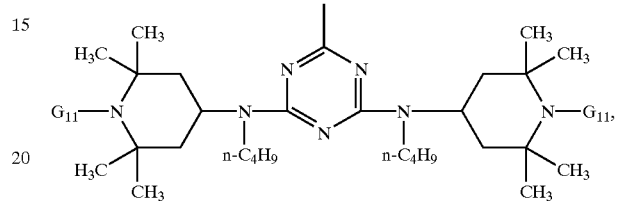

$G_{22}$ is $C_1C_{12}$alkyl, cyclohexyl, benzyl or $C_1$–$C_4$hydroxyalkyl, or $G_{21}$ and $G_{22}$ together are $C_4$–$C_5$alkylene or $C_4$–$C_5$oxaalkylene such as, for example, —$CH_2CH_2OCH_2CH_2$— or a group of the formula —$CH_2CH_2N(G_{11})CH_2CH_2$—, and $G_{23}$ is hydrogen, $C_1$–$C_{12}$alkyl or phenyl.

Any $C_1$–$C_{12}$alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

Any $C_2$–$C_5$hydroxyalkyl substituents are, for example, 2-hydroxyethyl, 2-hydroxypropyl, 3-hydroxypropyl, 2-hydroxybutyl or 4-hydroxybutyl.

If A is $C_2$–$C_6$alkylene then it is, for example, ethylene, propylene, 2,2-dimethylpropylene, tetramethylene or hexamethylene.

If $G_{21}$, and $G_{22}$ together are $C_4$–$C_5$alkylene or oxaalkylene then this is, for example, tetramethylene, pentamethylene or 3-oxapentamethylene.

Examples of polyalkylpiperidine compounds of this class are the compounds of the following formulae:

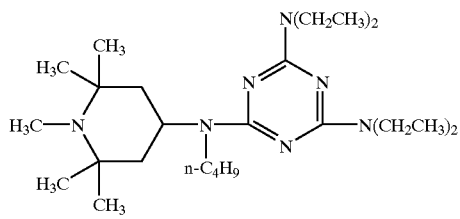
70)

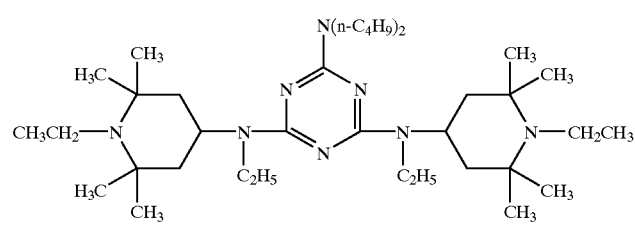
71)

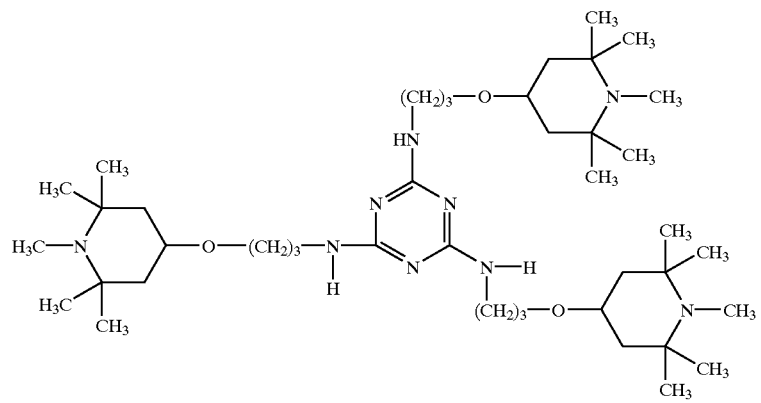
72)
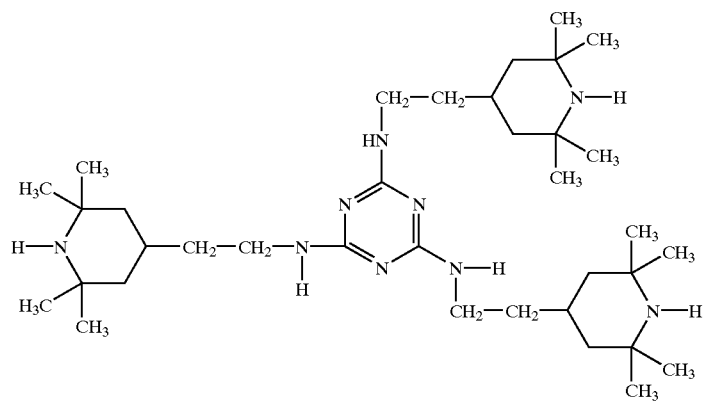
73)
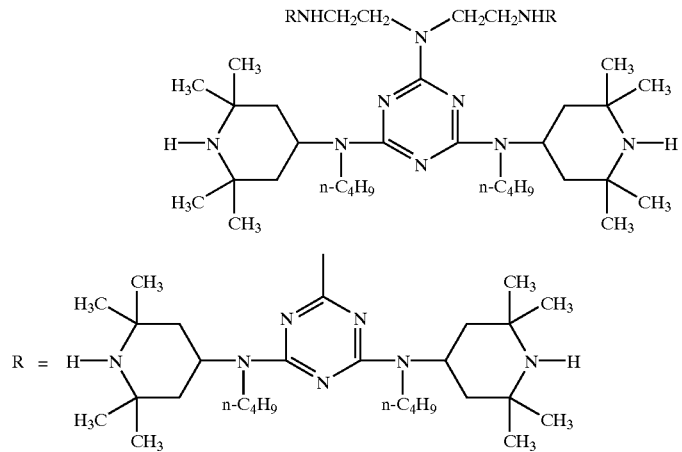
74)
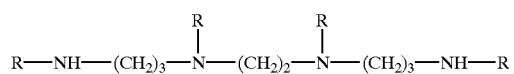
75)

R has the same meaning as in compound 74.

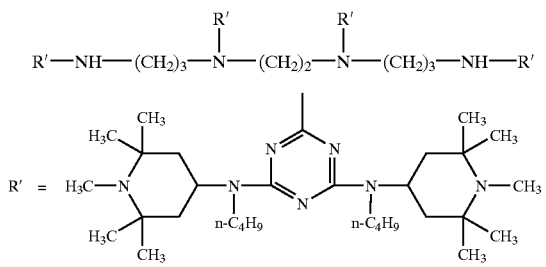
76)

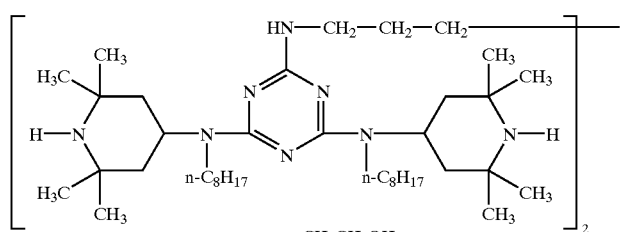
77)

R' has the same meaning as in compound 76.

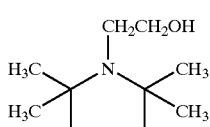
78)

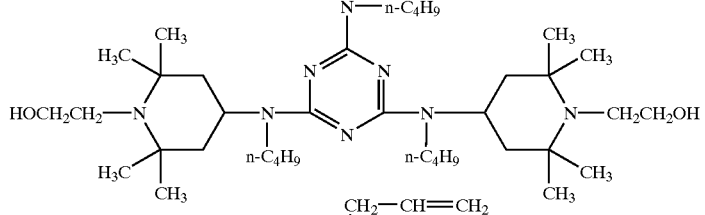
79)

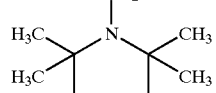
80)

(f) Oligomeric or polymeric compounds whose structural repeating unit contains a 2,2,6,6-tetraalkylpiperidine radical, especially polyesters, polyethers, polyamides, polyamines, polyurethanes, polyureas, polyaminotriazines, poly(meth)acrylates, poly(meth)acrylamides and copolymers thereof which include such radicals.

Examples of 2,2,6,6-polyalkylpiperidine compounds of this class are the compounds of the following formulae, in which m is a number from 2 to about 200.

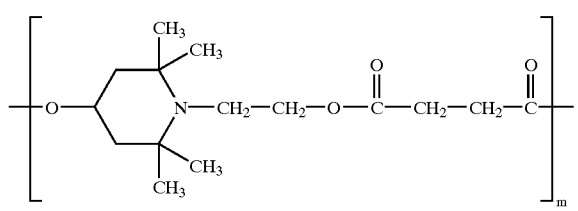
81)
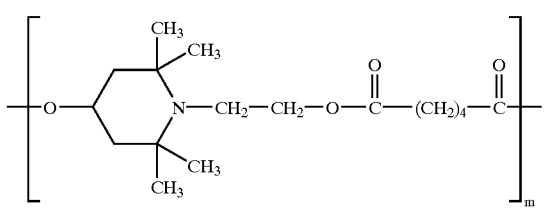
82)
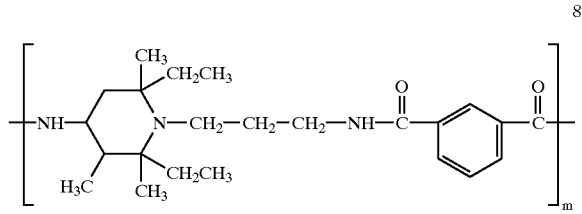
83)
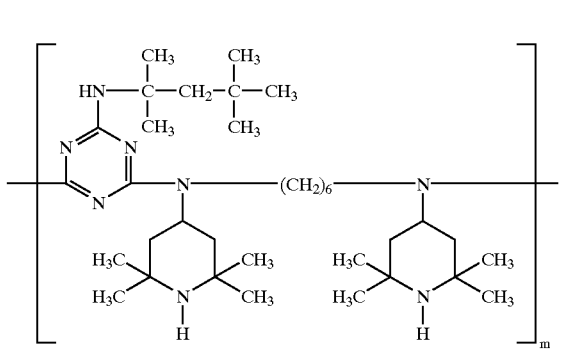
84)
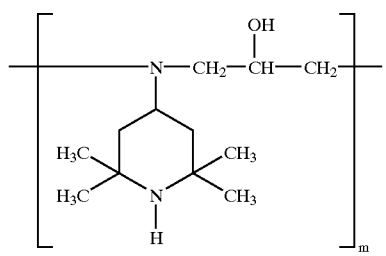
85)
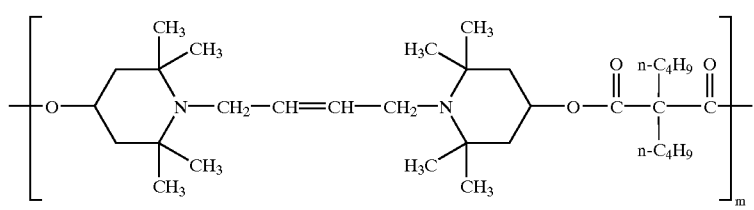
86)
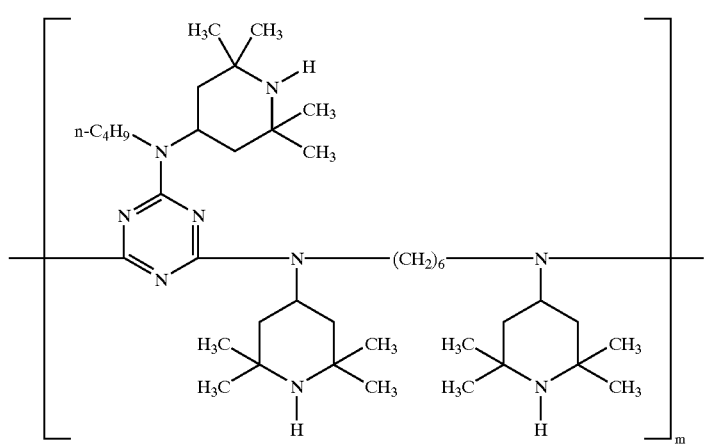
87)

-continued
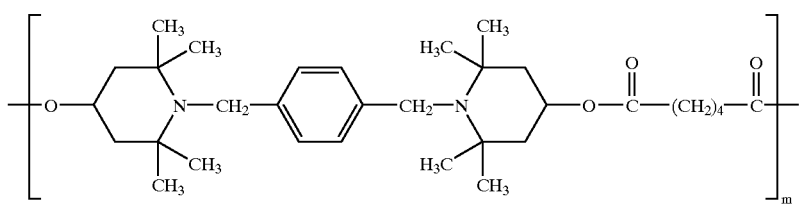
88)
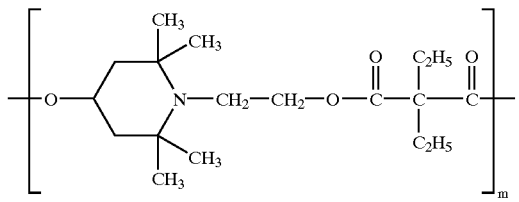
89)
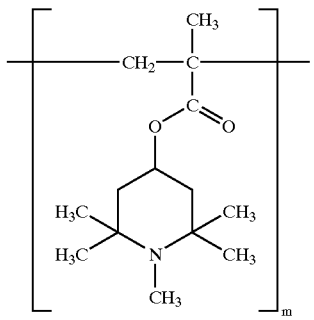
90)
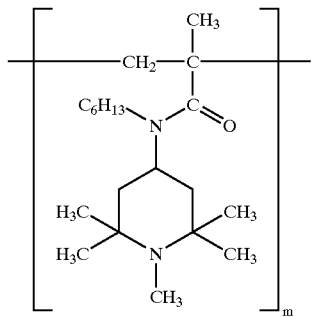
91)
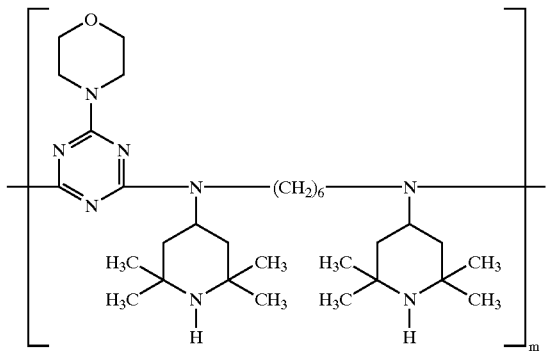
92)
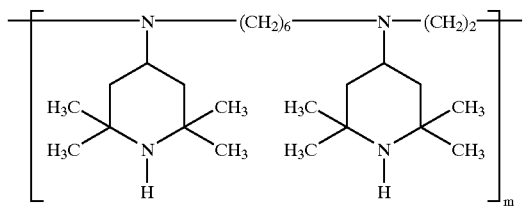
93)
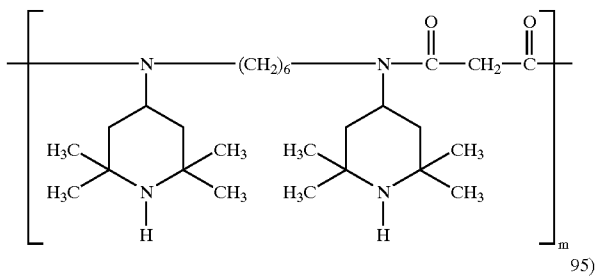
94)
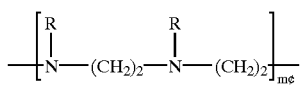
95)
in which R is a radical of the formula
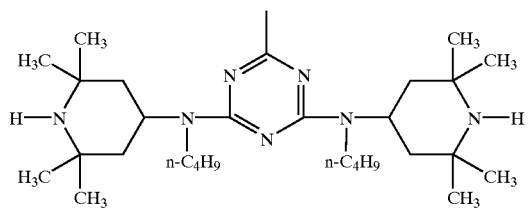
or is a chain branch
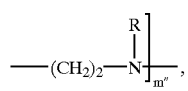,
m' and m" are each an integer from the range from 0 to 200, with the proviso that m'+m"=m.
Further examples of polymeric compounds are reaction products of compounds of the formula

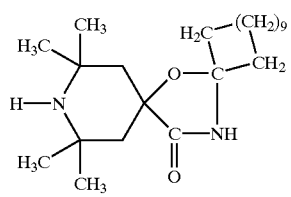

with epichlorohydrin; polyesters of butane-1,2,3,4-tetracarboxylic acid with a bifunctional alcohol of the formula

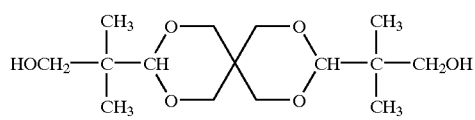

whose carboxyl side chains originating from the tetracarboxylic acid are esterified with 2,2,6,6-tetramethyl-4-hydroxypiperidine; compounds of the formula

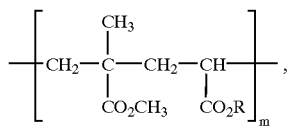

in which about a third of the radicals R are —C$_2$H$_5$ and the others are

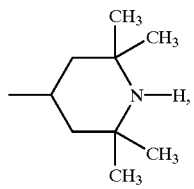

and m is a number from the range from 2 to 200; or copolymers whose repeating unit is composed of two units

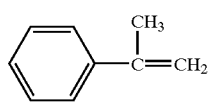

and in each case one unit

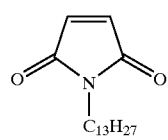

and one unit

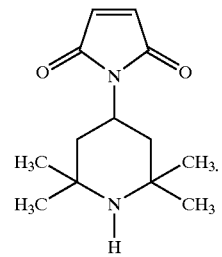

(g') Compounds of the formula XIIIa

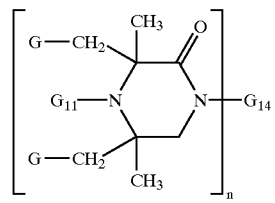

(XIIIa)

in which n is a number 1 or 2 and in which G and G$^{11}$ are as defined under (a') and G$_{14}$ is as defined under (b'), the meanings —CONH—Z and —CH$_2$—CH(OH)—CH$_2$—O—D—O— being excluded for G$_{14}$.

Examples of such compounds are:

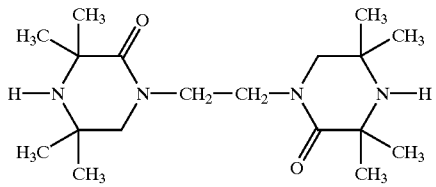

100)

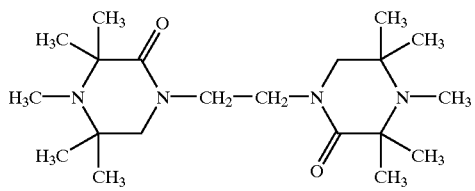

101)

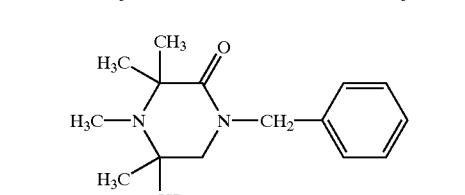

102)

Of particular interest are compositions comprising as component (c) at least one compound of the formula H1, H2, H3, H4, H5, H6, H7, H8 or H9

(H1) Tinuvin®123
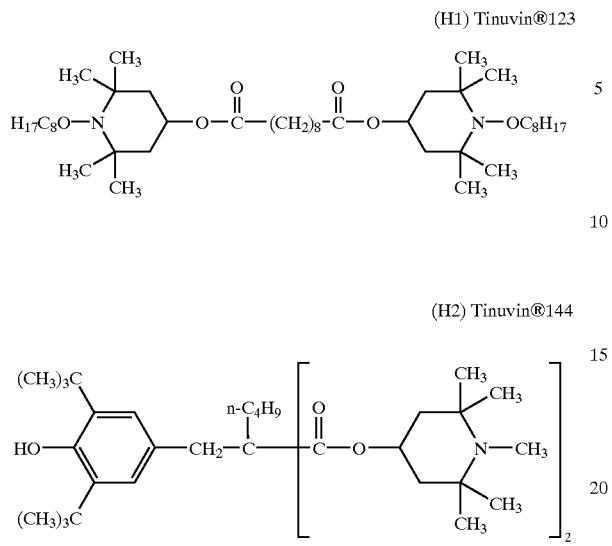
(H2) Tinuvin®144
(H3) Tinuvin®292
(H4) Tinuvin®622
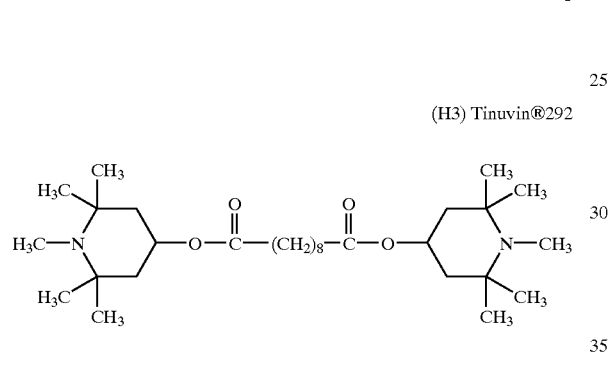
(H5) Chimassorb®944
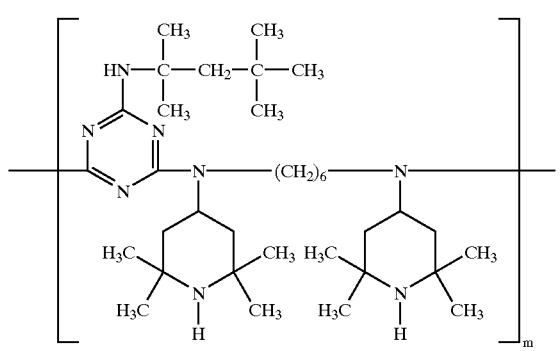
(H6)
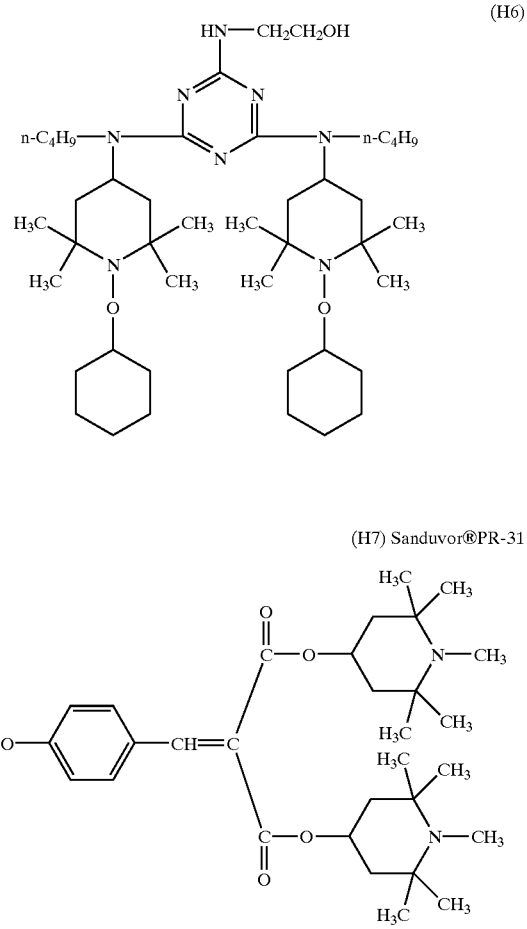
(H7) Sanduvor®PR-31
(H8) Tinuvin®770
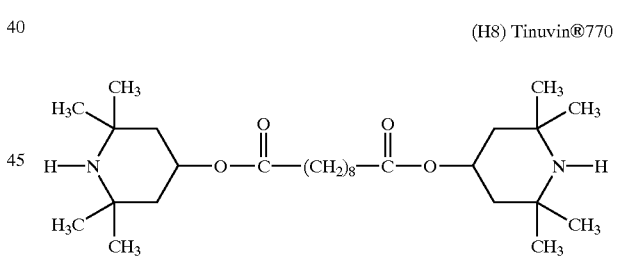
(H9) Chimassornb®119
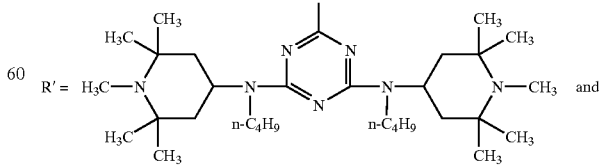
in which
R' = 
and
m is a number from the range from 2 to 200.

Component (c) of the novel composition, and the compounds of the sterically hindered amine type, are known and some are commercially available.

Tinuvin®123, Tinuvin®144, Tinuvin®292, Tinuvin®622, Tinuvin®770, Chimassorb®944 and Chimassorb®119 are protected trade names of Ciba Spezialitätenchemie AG. Sanduvor®PR-31 is a protected trade name of Clariant.

Also of particular interest as component (c) in the novel composition is Chimassorb®119 (Ciba Spezialitätenchemie AG). Chimassorb®119 denotes a condensation product prepared from 2-chloro-4,6-di(4-n-butylamino-1,2,2,6,6-pentamethylpiperidyl)-1,3,5-triazine and 1,2-bis(3-aminopropylamino)ethane.

As component (c) of the novel composition particular preference is given to the addition of those sterically hindered amines whose molecular weight or average molecular weight $M_n$ is in the range from 500 to 10 000, in particular in the range from 1000 to 10,000. Of these, particular emphasis should again be placed on those sterically hindered amines whose molecular weight or average molecular weight $M_n$ is in the range from 1500 to 10 000, for example in the range from 2000 to 7500.

Particular emphasis should be given to those novel compositions which as component (c) comprise two or more compounds of the sterically hindered amine type.

Of particular interest are compositions comprising as component (d) at least one compound from the group of the organic phosphites or phosphonites of the formulae 1, 2, 3, 4, 5, 6 or 7

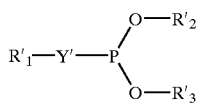 (1)

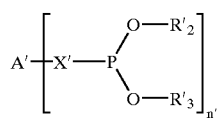 (2)

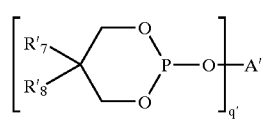 (3)

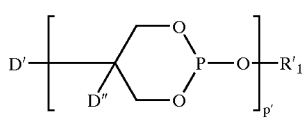 (4)

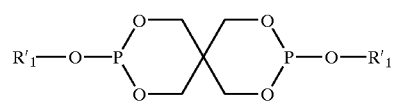 (5)

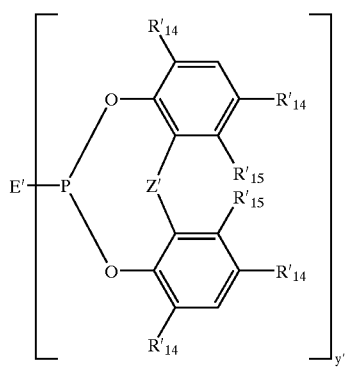 (6)

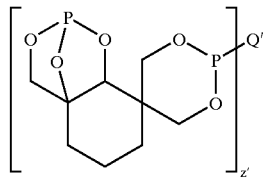 (7)

in which the indices are integral and n' is 2, 3 or 4; p' is 1 or 2; q' is 2 or 3; r' is 4 to 12; y' is 1, 2 or 3; and z' is 1 to 6;

A', if n' is 2, is $C_2$–$C_{18}$alkylene; $C_2$–$C_{12}$alkylene interrupted by oxygen, sulfur or —NR'$_4$—; a radical of the formula

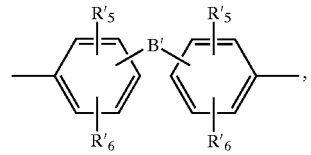

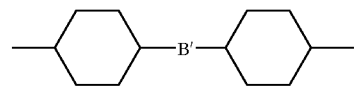

or phenylene;

A', if n' is 3, is a radical of the formula —$C_rH_{2r'-1}$—;

A', if n' is 4, is

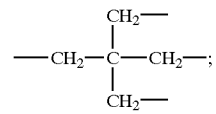

A" is as defined for A' if n' is 2;

B' is a direct bond, —CH$_2$—, —CHR'$_4$—, —CR'$_1$R'$_4$—, sulfur, $C_5$–$C_7$cycloalkylidene, or cyclohexylidene which is substituted by from 1 to 4 $C_1$–$C_4$alkyl radicals in position 3, 4 and/or 5;

D', if p' is 1, is $C_1$–$C_4$alkyl and, if p' is 2, is —CH$_2$OCH$_2$—;

D", if p' is 1, is $C_1$–$C_4$alkyl;

E', if y' is 1, is $C_1$–$C_{18}$alkyl, —OR'$_1$ or halogen;

E', if y is 2, is —O—A"—O—,

E', if y is 3, is a radical of the formula R'$_4$C(CH$_2$O—)$_3$ or N(CH$_2$CH$_2$O—)$_3$;

Q' is the radical of an at least z'-valent alcohol or phenol, this radical being attached via the oxygen atom to the phosphorus atom;

R'$_1$, R'$_2$ and R'$_3$ independently of one another are C$_1$–C$_{18}$alkyl which is unsubstituted or substituted by halogen, —COOR'$_4$, —CN or —CONR'$_4$R'$_4$; C$_2$–C$_{18}$alkyl interrupted by oxygen, sulfur or —NR'$_4$—; C$_7$–C$_9$phenylalkyl; C$_5$–C$_{12}$cycloalkyl, phenyl or naphthyl; naphthyl or phenyl substituted by halogen, 1 to 3 alkyl radicals or alkoxy radicals having a total of 1 to 18 carbon atoms or by C$_7$–C$_9$phenylalkyl; or a radical of the formula

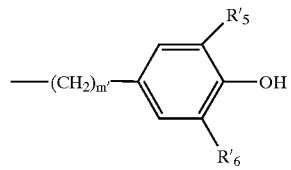

in which m' is an integer from the range 3 to 6;

R'$_4$ is hydrogen, C$_1$–C$_{18}$alkyl, C$_5$–C$_{12}$cycloalkyl or C$_7$–C$_9$phenylalkyl, R'$_5$ and R'$_6$ independently of one another are hydrogen, C$_1$–C$_8$alkyl or C$_5$–C$_6$cycloalkyl, R'$_7$ and R'$_8$, if q' is 2, independently of one another are C$_1$–C$_4$alkyl or together are a 2,3-dehydropentamethylene radical; and R'$_7$ and R'$_8$, if q' is 3, are methyl;

R'$_{14}$ is hydrogen, C$_1$–C$_9$alkyl or cyclohexyl,

R'$_{15}$ is hydrogen or methyl and, if two or more radicals R'$_{14}$ and R'$_{15}$ are present, these radicals are identical or different, X' and Y' are each a direct bond or oxygen, Z' is a direct bond, methylene, —C(R'$_{16}$)$_2$— or sulfur, and R'$_{16}$ is C$_1$–C$_8$alkyl.

Of particular interest are compositions comprising as component (d) a phosphite or phosphonite of the formula 1, 2, 5 or 6, in which n' is the number 2 and y' is the number 1, 2 or 3;

A' is C$_2$–C$_{18}$alkylene, p-phenylene or p-biphenylene,

E', if y' is 1, is C$_1$–C$_{18}$alkyl, —OR'$_1$ or fluorine;

E', if y' is 2, is p-biphenylene,

E', if y' is 3, is N(CH$_2$CH$_2$O—)$_3$,

R'$_1$, R'$_2$ and R'$_3$ independently of one another are C$_1$–C$_{18}$alkyl, C$_7$–C$_9$phenylalkyl, cyclohexyl, phenyl, or phenyl substituted by 1 to 3 alkyl radicals having a total of 1 to 18 carbon atoms;

R'$_{14}$ is hydrogen or C$_1$–C$_9$alkyl,

R'$_{15}$ is hydrogen or methyl;

X' is a direct bond,

Y' is oxygen,

Z' is a direct bond or —CH(R'$_{16}$)—, and

R'$_{16}$ is C$_1$–C$_4$alkyl.

Likewise of interest are compositions comprising as component (d) a phosphite or phosphonite of the formula 1, 2, 5 or 6, in which n' is the number 2 and y' is the number 1 or 3;

A' is p-biphenylene,

E', if y' is 1, is C$_1$–C$_{18}$alkoxy or fluorine,

E', if y' is 3, is N(CH$_2$CH$_2$—)$_3$,

R'$_1$, R'$_2$ and R'$_3$ independently of one another are C$_1$–C$_{18}$alkyl, or phenyl substituted by 2 or 3 alkyl radicals having a total of 2 to 12 carbon atoms;

R'$_{14}$ is methyl or tert-butyl;

R'$_{15}$ is hydrogen;

X' is a direct bond;

Y' is oxygen; and

Z' is a direct bond, methylene or —CH(CH$_3$)—.

Particular preference is given to compositions comprising as component (d) a phosphite or phosphonite of the formula 1, 2 or 6.

Special preference is given to compositions comprising as component (d) at least one compound of the formula VII

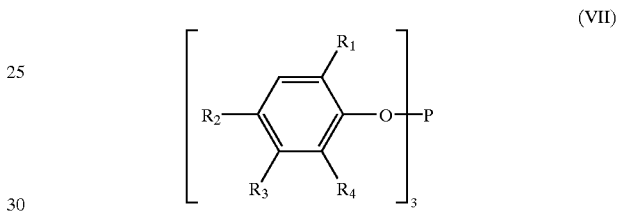

(VII)

in which

R$_1$ and R$_2$ independently of one another are hydrogen, C$_1$–C$_8$alkyl, cyclohexyl or phenyl, and R$_3$ and R$_4$ independently of one another are hydrogen or C$_1$–C$_4$alkyl.

The following compounds are examples of organic phosphites and phosphonites which are particularly suitable as component (d) in the novel compositions.

Triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl)phosphite (Irgafos® 168, Ciba-Geigy), diisodecyl pentaerythritol diphosphite, bis(2,4-di-tert-butylphenyl)pentaerythritol diphosphite (formula D), bis(2,6-di-tert-butyl-4-methylphenyl)pentaerythritol diphosphite (formula E), bisisodecyloxypentaerythritol diphosphite, bis(2,4-di-tert-butyl-6-methylphenyl)pentaerythritol diphosphite, bis(2,4,6-tri-tert-butylphenyl)pentaerythritol diphosphite, tristearyl sorbitol triphosphite, tetrakis(2,4-di-tert-butylphenyl) 4,4'-biphenylene-diphosphonite (Irgafos®P-EPQ, Ciba-Geigy, formula H), 6-isooctyloxy-2,4,8,10-tetra-tert-butyl-12H-dibenzor[d,g]-1,3,2-dioxaphosphocin (formula C), 6-fluoro-2,4,8,10-tetra-tert-butyl-12-methyl-dibenzo[d,g]-1,3,2-dioxaphosphocin (formula A), bis(2,4-di-tert-butyl-6-methylphenyl)methyl phosphite, bis(2,4-di-tert-butyl-6-methylphenyl)ethyl phosphite (formula G).

With particular preference the following phosphites and phosphonites are used:

tris(2,4-di-tert-butylphenyl)phosphite (irgafos®168, Ciba-Geigy), tris(nonylphenyl)phosphite,

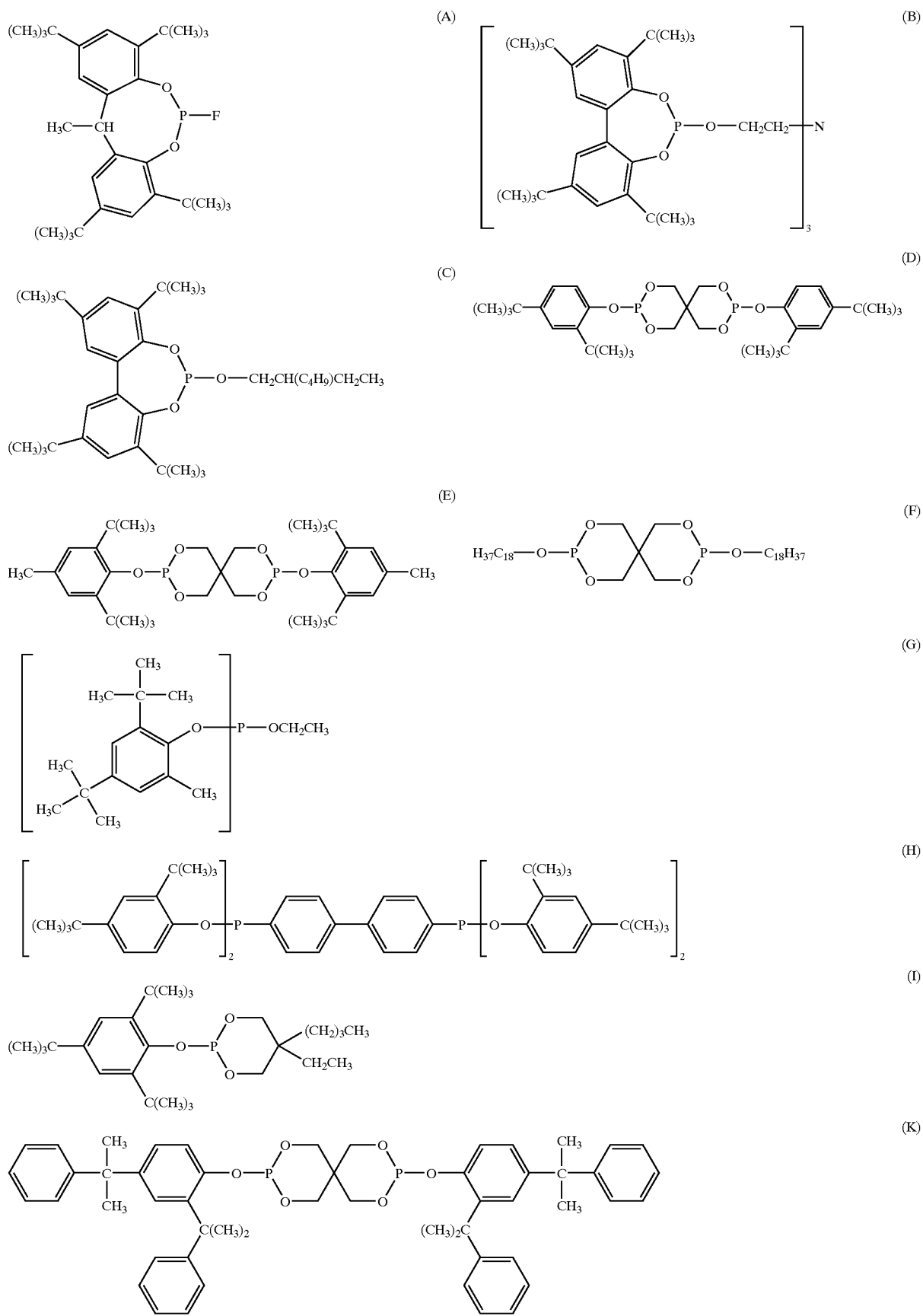

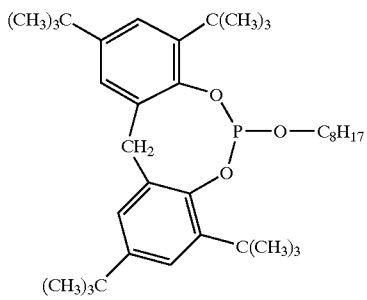
(L)

Very particular preference is given to tris(2,4-di-tert-butylphenyl)phosphite [Irgafos®168, Ciba Spezialitätenchemie AG], bis(2,4-di-tert-butyl-6-methylphenyl)ethyl phosphite [Irgafos®38, Ciba Spezialitätenchemie AG, formula (G)], Ultranox®626 [GE Chemicals, formula (D)], tetrakis(2,4-di-tert-butylphenyl) 4,4'-biphenylene-diphosphonite [Irgafos®P-EPQ, Ciba Spezialitätenchemie AG, formula (H)], Ultranox®641 [GE Chemicals, formula (I)], Doverphos®S9228 [Dover Chemicals, formula (K)] or Mark®HP10 [Adeka Argus, formula (L)].

These organic phosphites and phosphonites are known compounds; many of them are commercially available.

The mixture of components (b) and (c) or (b), (c) and (d) is suitable for stabilizing organic materials against oxidative, thermal or light-induced degradation.

Examples of such materials are:

1. Polymers of monoolefins and diolefins, for example polypropylene, polyisobutylene, polybut-1-ene, poly-4-methylpent-1-ene, polyisoprene or polybutadiene, as well as polymers of cycloolefins, for example of cyclopentene or norbornene; furthermore polyethylene (which optionally can be crosslinked), for example high-density polyethylene (HDPE), high-density and high molecular weight polyethylene (HDPE-HMW), high-density and ultrahigh molecular weight polyethylene (HDPE-UHMW), medium-density polyethylene (MDPE), low-density polyethylene (LDPE), linear low-density polyethylene (LLDPE), (VLDPE) and (ULDPE).

Polyolefins, i.e. polymers of monoolefins exemplified in the preceding paragraph, in particular polyethylene and polypropylene, can be prepared by different, and especially by the following, methods:

a) radical polymerization (normally under high pressure and high temperature)

b) catalytic polymerization using a catalyst that normally contains one or more metals of group IVb, Vb, VIb or VIII. These metals usually have one or more ligands, such as oxides, halides, alcoholates, esters, ethers, amines, alkyls, alkenyls and/or aryls that may be either π- or σ-coordinated. These metal complexes may be in the free form or fixed on carriers, for example on activated magnesium chloride, titanium(III) chloride, alumina or silicon oxide. These catalysts may be soluble or insoluble in the polymerization medium. The catalysts can be active as such in the polymerization or further activators may be used, for example metal alkyls, metal hydrides, metal alkyl halides, metal alkyl oxides or metal alkyloxanes, the metals being elements of groups Ia, IIa and/or IIIa. The activators may be modified, for example, with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene-propylene copolymers, linear low density polyethylene (LLDPE) and mixtures thereof with low density polyethylene (LDPE), propylene-but-1-ene copolymers, propylene-isobutylene copolymers, ethylene-but-1-ene copolymers, ethylene-hexene copolymers, ethylene-methylpentene copolymers, ethylene-heptene copolymers, ethylene-octene copolymers, propylene-butadiene copolymers, isobutylene-isoprene copolymers, ethylene-alkyl acrylate copolymers, ethylene-alkyl methacrylate copolymers, ethylene-vinyl acetate copolymers and their copolymers with carbon monoxide or ethylene-acrylic acid copolymers and their salts (ionomers) as well as terpolymers of ethylene with propylene and a diene such as hexadiene, dicyclopentadiene or ethylidene-norbornene; and also mixtures of such copolymers with one another and with polymers mentioned under 1), for example polypropylene-ethylene-propylene copolymers, LDPE-ethylene-vinyl acetate copolymers, LDPE-ethylene-acrylic acid copolymers, LLDPE-ethylene-vinyl acetate copolymers, LLDPE-ethylene-acrylic acid copolymers and alternating or random polyalkylene-carbon monoxide copolymers and mixtures thereof with other polymers, for example polyamides.

4. Hydrocarbon resins (for example $C_5$–$C_9$) including hydrogenated modifications thereof (e.g. tackifier resins) and mixtures of polyalkylenes and starch.

5. Polystyrene, poly(p-methylstyrene), poly(α-methylstyrene).

6. Copolymers of styrene or α-methylstyrene with dienes or acrylic derivatives, for example styrene-butadiene, styrene-acrylonitrile, styrene-alkyl methacrylate, styrene-butadiene-alkyl acrylate, styrene-butadiene-alkyl methacrylate, styrene-maleic anhydride, styrene-acrylonitrile-methyl acrylate; mixtures of high impact strength of styrene copolymers and another polymer, for example a polyacrylate, a diene polymer or an ethylene-propylene-diene terpolymer, and block copolymers of styrene such as styrene-butadiene-styrene, styrene-isoprene-styrene, styrene-ethylene-butylene-styrene or styrene-ethylene-propylene-styrene.

7. Graft copolymers of styrene or α-methylstyrene, for example styrene on polybutadiene, styrene on polybutadiene-styrene or polybutadiene-acrylonitrile copolymers, styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene, styrene and alkyl acrylates or alkyl methacrylates on polybutadiene, styrene and acrylonitrile on ethylene-propylene-diene terpolymers, styrene and acrylonitrile on polyalkyl acrylates or polyalkyl methacrylates, styrene and acrylonitrile on acrylate-butadiene copolymers, as well as mixtures thereof with the copolymers mentioned under 6), for example the copolymer mixtures known as ABS, MBS, ASA or AES polymers.

8. Halogen-containing polymers such as polychloroprene, chlorinated rubber, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride; as well as copolymers thereof such as vinyl chloride-vinylidene chloride, vinyl chloride-vinyl acetate or vinylidene chloride-vinyl acetate.

9. Polymers derived from $\alpha,\beta$-unsaturated acids and derivatives thereof such as polyacrylates and polymethacrylates, polymethyl methacrylates, impact-modified with butyl acrylate, polyacrylamides and polyacrylonitriles.

10. Copolymers of the monomers mentioned under 9) with each other or with other unsaturated monomers, for example acrylonitrile-butadiene copolymers, acrylonitrile-alkyl acrylate copolymers, acrylonitrile-alkoxyalkyl acrylate copolymers, acrylonitrile-vinyl halide copolymers or acrylonitrile-alkyl methacrylate-butadiene terpolymers.

11. Polymers derived from unsaturated alcohols and amines or the acyl derivatives or acetals thereof, such as polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in section 1.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain comonomers, for example ethylene oxide; polyacetals modified with thermoplastic polyurethanes, acrylates or MBS.

14. Polyphenylene oxides and sulfides, and mixtures thereof with styrene polymers or polyamides.

15. Polyurethanes derived from hydroxyl-terminated polyethers, polyesters and polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, such as polyamide 4, 6, 6/6, 6/10, 6/9, 6/12, 4/6, 12/12, 11 and 12, aromatic polyamides starting from m-xylene, diamine and adipic acid; polyamides prepared from hexamethylenediamine and isophthalic and/or terephthalic acid and with or without an elastomer as modifier, for example poly-2,4,4-trimethylhexamethylene terephthalamide or poly-m-phenylene isophthalaniide. Block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol. Also, polyamides or copolyamides modified with EPDM or ABS; and polyamides condensed during processing (RIM polyamide systems).

17. Polyureas, polyimides, polyamide-imides, polyether imides, polyester imides, polyhydantoins and polybenzimidazoles.

18. Polyesters derived from dicarboxylic acids and dialcohols and/or from hydroxycarboxylic acids or the corresponding lactones, such as polyethylene terephthalate, polybutylene terephthalate, poly-1,4-dimethylolcyclohexane terephthalate, polyhydroxybenzoates, as well as block polyether esters derived from hydroxyl-terminated polyethers; and also polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, urea or melamine on the other hand, such as phenol-formaldehyde resins, urea-formaldehyde resins and melamine-formaldehyde resins.

22. Drying and nondrying alkyd resins.

23. Unsaturated polyester resins derived from copolyesters of saturated and unsaturated dicarboxylic acids with polyhydric alcohols and also vinyl compounds as crosslinking agents, and also halogen-containing modifications thereof of low flammability.

24. Crosslinkable acrylic resins derived from substituted acrylates, for example from epoxy acrylates, urethane acrylates or polyesteracrylates.

25. Alkyd resins, polyester resins and acrylate resins crosslinked with melamine resins, urea resins, isocyanates, isocyanurates, polyisocyanates or epoxy resins.

26. Crosslinked epoxy resins derived from aliphatic, cycloaliphatic, heterocyclic or aromatic glycidyl compounds, for example products of bisphenol A diglycidyl ethers; bisphenol F diglycidyl ethers, which are crosslinked by means of customary curing agents such as anhydrides or amines, with or without accelerators.

27. Natural polymers such as cellulose, natural rubber, gelatin and derivatives thereof which have been chemically modified in a polymer-homologous manner, for example cellulose acetates, cellulose propionates and cellulose butyrates, or the cellulose ethers such as methyl cellulose; as well as rosins and derivatives.

28. Blends (polyblends) of the aforementioned polymers, for example PP/EPDM, poly-amide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PU, PC/thermoplastic PU, POM/acrylate, POM/MBS, PPO/HIPS, PPO/PA 6.6 and copolymers, PA/HDPE, PA/PP, PA/PPO, PBT/PC/ABS or PBT/PET/PC.

29. Natural and synthetic organic substances which constitute pure monomeric compounds or mixtures thereof, for example mineral oils, animal or vegetable fats, oils and waxes, or oils, waxes and fats based on synthetic esters (e.g. phthalates, adipates, phosphates or trimellitates), and also blends of synthetic esters with mineral oils in arbitrary weight ratios, as are used, for example, as spinning preparations, and aqueous emulsions thereof.

30. Aqueous emulsions of natural or synthetic rubbers, for example natural rubber latex or latices of carboxylated styrene-butadiene copolymers.

The mixture of components (b) and (c) or (b), (c) and (d) is likewise used for polyurethane production, especially for preparing flexible polyurethane foams. In this context the novel compositions and the products produced therefrom are effectively protected against degradation. In particular, scorching during foam production is avoided.

The polyurethanes are obtained, for example, by reacting polyethers, polyesters and polybutadienes which contain terminal hydroxyl groups with aliphatic or aromatic polyisocyanates.

Polyethers having terminal hydroxyl groups are known and are prepared, for example, by polymerizing epoxides such as ethylene oxide, propylene oxide, butylene oxide, tetrahydrofuran, styrene oxide or epichlorohydrin with themselves, for example in the presence of $BF_3$, or by addition reaction of these epoxides, alone or as a mixture or in succession, with starting components containing reactive hydrogen atoms, such as water, alcohols, ammonia or amines, for example ethylene glycol, propylene 1,3- and 1,2-glycol, trimethylolpropane, 4,4'-dihydroxydiphenylpropane, aniline, ethanolamine or ethylenediamine. Sucrose polyethers are also suitable in accordance with the invention. In many cases preference is given to those polyethers which predominantly (up to 90% by weight, based on all the OH groups present in the polyether) contain primary; OH groups. Furthermore, polyethers modified by vinyl polymers, as are formed, for example, by polymerizing styrene and acrylonitrile in the presence of polyethers, are suitable, as are polybutadienes containing OH groups.

These compounds generally have molecular weights of 40 and are polyhydroxy compounds, especially compounds containing from two to eight hydroxyl groups, especially those of molecular weight from 800 to 10 000, preferably from 1000 to 6000, for example polyethers containing at least 2, generally 2 to 8, but preferably 2 to 4, hydroxyl groups, as are known for the preparation of homogeneous polyurethanes and cellular polyurethanes.

It is of course possible to employ mixtures of the above compounds containing at least two isocyanate-reactive hydrogen atoms, in particular with a molecular weight of 400–10 000.

Suitable polyisocyanates are aliphatic, cycloaliphatic, araliphatic, aromatic and heterocyclic polyisocyanates, for example ethylene diisocyanate, 1,4-tetramethylene diisocyanate, 1,6-hexamethylene diisocyanate, 1,12-dodecane diisocyanate, cyclobutane 1,3-diisocyanate, cyclohexane 1,3- and -1,4-diisocyanate and also any desired mixtures of these isomers, 1-isocyanato-3,3,5-trimethyl-5-isocyanatomethylcyclohexane, 2,4- and 2,6-hexahydrotolylene diisocyanate and also any desired mixtures of these isomers, hexahydro-1,3- and/or -1,4-phenylene diisocyanate, perhydro-2,4'- and/or -4,4'-diphenylmethane-diisocyanate, 1,3- and 1,4-phenylene diisocyanate, 2,4- and 2,6-tolylene diisocyanate, and also any desired mixtures of these isomers, diphenylmethane 2,4'- and/or -4,4'-diisocyanate, naphthylene 1,5-diisocyanate, triphenylmethane 4,4',4"-triisocyanate, polyphenyl-polymethylene polyisocyanates as are obtained by aniline-formaldehyde condensation followed by phosgenization, m- and p-isocyanatophenylsulfonyl isocyanates, perchlorinated aryl polyisocyanates, polyisocyanates containing carbodiimide groups, polyisocyanates containing allophanate groups, polyisocyanates containing isocyanurate groups, polyisocyanates containing urethane groups, polyisocyanates containing acylated urea groups, polyisocyanates containing biuret groups, polyisocyanates containing ester groups, reaction products of the abovementioned isocyanates with acetals, and polyisocyanates containing polymeric fatty acid radicals.

It is also possible to employ the isocyanate group-containing distillation residues, as they are or dissolved in one or more of the abovementioned polyisocyanates, which are obtained in the course of the industrial preparation of isocyanates. It is additionally possible to use any desired mixtures of the abovementioned polyisocyanates.

Particular preference is given in general to the polyisocyanates which are readily obtainable industrially, for example 2,4- and 2,6-tolylene diisocyanate and any desired mixtures of these isomers ("TDI"), polyphenyl-polymethylene-polyisocyanates as prepared by aniline-formaldehyde condensation followed by phosgenization ("crude MDI"), and polyisocyanates containing carbodiimide, urethane, allophanate, isocyanurate, urea or biuret; groups ("modified polyisocyanates").

The organic materials to be protected are preferably natural, semisynthetic or preferably synthetic polymers. Particular preference is given to thermoplastic polymers, especially polyolefins, in particular polyethylene and polypropylene or copolymers thereof with mono- and diolefins. Particular preference is given to a polyolefin fibre, especially an essentially phenol-free polyolefin fibre.

The term essentially phenol-free polyolefin fibre denotes that the amount of phenolic antioxidants is less than 0.02% based on the weight of the polyolefin fibre to be stabilized. These small amounts of phenolic antioxidants are added by the polyolefin manufacturers during preparation in order to provide initial stabilization of the polyolefins.

Particular emphasis is to be placed on the action of the novel components (b) and (c) or (b), (c) and (d) against thermal and oxidative degradation, especially under thermal stress as occurs during the processing of thermoplastics. The novel components (b) and (c) or (b), (c) and (d) are therefore outstandingly suitable for use as in-process stabilizers.

The mixture of components (b) and (c) or (b), (c) and (d) is also suitable for stabilizing polyolefins which are in long-term contact with extracting media.

Component (b) is preferably added to the organic material to be stabilized in an amount of from 0.0005 to 5%, in particular from 0.001 to 2%, for example from 0.01 to 2%, based on the weight of the organic material to be stabilized.

Components (c) and (d) are judiciously added to the organic material to be stabilized in an amount of from 0.01 to 10%, for example from 0.01 to 5%, preferably from 0.025 to 3% and, in particular, from 0.025 to 1%, based on the weight of the organic material to be stabilized.

In addition to components (a), (b), (c) and (d) the novel compositions may comprise further costabilizers (additives) such as, for example, the following:

1. Antioxidants 1.1. Alkylated monophenols, for example 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, linear or sidechain-branched nonylphenols such as 2,6-di-nonyl-4-methylphenol, 2,4-dimethyl-6-(1'-methylundec-1'-yl)-phenol, 2,4-dimethyl-6-(1'-methylheptadec-1'-yl)-phenol, 2,4-dimethyl-6-(1'-methyl-tridec-1'-yl)phenol and mixtures thereof.

1.2. Alkyithiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-didodecyl-thiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl)adipate.

1.4 Tocopherols, for example α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclo-hexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybensyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodeclmercaptobutane, 1,1,5,5-tetra-(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl 4-hydroxy-3,5-dimethylbenzylmercaptoacetate, tridecyl 4-hydroxy-3,5-di-tert-butylbenzylmercaptoacetate, tris(3,5-di-tert-butyl-4-hydroxybenzyl)-amine, bis(4-tert-butyl-3-hydroxy-2,6-dimethylbenzyl)dithioterephthalate, bis(3,5-di-tert-butyl-4-hydroxybenzyl)sulfide, isooctyl 3,5-di-tert-butyl-4-hydroxybenzylmercaptoacetate.

1.8. Hydroxybenzylated malonates, for example dioctadecyl 2,2-bis(3,5-di-tert-butyl-2-hydroxybenzyl)malonate, dioctadecyl 2-(3-tert-butyl-4-hydroxy-5-methylbenzyl) malonate, didodecyl mercaptoethyl-2,2-bis(3,5-di-tert-butyl-4-hydroxybenzyl)malonate, di-[4-(1,1,3,3-tetramethylbutyl)phenyl] 2,2-bis(3,5-di-tert-butyl-4-hydroxybenzyl)malonate.

1.9. Aromatic hydroxybenzyl compounds, for example 1,3,5-tris(3,5-di-tert-butyl-4-hydroxylbenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bisoctylmercapto-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(5-di-tert-butyl-4-hydroxyphenylpropionyl)hexahydro-1,3,5-triazine, 1,3,5-tris(3,5-dicyclohexyl-4-hydroxybenzyl)isocyanurate.

1.11. Benzylphosphonates, for example dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate, dioctadecyl 5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis-(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis (3,5-di-tert-butyl-4-hydroxyphenylpropionyl) trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard® XL-1 from Uniroyal).

1.18. Ascorbic acid (vitamin C)

1.19. Aminic antioxidants, for example N,N'-diisopropyl-p-phenylenediamine, N,N'-di-sec-butyl-p-phenylenediamine, N,N'-bis(1,4-dimethyl-pentyl)-p-phenylenediamine, N,N'-bis(1-ethyl-3-methyl-pentyl)-p-phenylenediamine, N,N'-bis(1-methyl-heptyl)-p-phenylenediamine, N,N'-dicyclohexyl-p-phenylenediamine, N,N'-diphenyl-p-phenylenediamine, N,N'-di-(naphthyl-2)-p-phenylenediamine, N-isopropyl-N'-phenyl-p-phenylenediamine, N-(1,3-dimethyl-butyl)-N'-phenyl-p-phenylenediamine, N-(1-methyl-heptyl)-N'-phenyl-p-phenylenediamine, N-cyclohexyl-N'-phenyl-p-phenylenediamine, 4-(p-toluenesulfonamido)

diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, di-(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diamino-diphenylmethane, 1,2-di[(2-methyl-phenyl)amino]ethane, 1,2-di(phenylamino)propane, (o-tolyl)biguanide, di-[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyl-diphenylamines, mixtures of mono- and dialkylated tert-butyldiphenylamines, 2,3-dihydro-3,3-dimethyl-4H-1,4-benzothiazine, phenothiazine, a mixture of mono- and dialkylated tert-butyl/tert-octyl-phenothiazines, a mixture of mono- and dialkylated tert-octyl-phenothiazines, N-allylphenothiazine, N,N,N',N'-tetraphenyl-1,4-diaminobut-2-ene, N,N-bis(2,12,6,6-tetramethylpiperidin-4-yl)hexamethylenediamine, bis(2,2,6,6-tetramethylpiperidin-4-yl) sebacate, 2,2,6,6-tetramethylpiperidin-4-one and 2,2,6,6-tetramethylpiperidin-4-ol.

2. UV-absorbers and light stabilizers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2-hydroxyphenyl)-5-chlorobenzotriazole, 2-(3-tert-butyl-2'-hydroxy-5'-methylphenyl)-5-chlorobenzotriazole, 2-(3'-sec-butyl-5tert-butyl-2'hydroxyphenyl)benzotriazole, 2-(2'-hydroxy-4'-octoxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzatriazole, 2-(3-dodecyl-2-hydroxy-5-methylphenyl)benzotriazole, 2-(3-tert-butyl-2-hydroxy-5-(2-isooctyloxycarbonylethyl)phenylbenzotriazole, 2,2'-methylenebis[4-(1,1,3,3-tetramethylbutyl)-6-benzotriazol-2-ylphenol]; the transesterification product of 2-[3'-tert-butyl-5'-(2-methoxy-carbonylethyl)-2'-hydroxyphenyl] benzotriazole with polyethylene glycol 300;

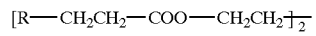

where R=3'-tert-butyl-4'-hydroxy-5'-2H-benzotriazol-2-ylphenyl; 2-[2'-hydroxy-3'-(α,α-dimethylbenzyl)-5'-(1,1,3,3-tetramethylbutyl)phenyl]benzotriazole; 2-[2'-hydroxy-3'-(1,1,3,3-tetramethylbutyl)-5'-(α,α-dimethylbenzyl)phenyl]benzotriazole.

2.2. 2-Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivative.

2.3. Esters of substituted or unsubstituted benzoic acids, for example 4-tert-butyl-phenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate or isooctyl α-cyano-β,β-diphenylacrylate, methyl α-carbomethoxycinnamate, methyl α-cyano-β-methyl-p-methoxy-cinnamate or butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of monoalkyl esters, such as of the methyl or ethyl ester, of 4-hydroxy-3,5-di-tert-butylbenzylphosphonic acid, nickel complexes of ketoximes, e.g. of 2-hydroxy-4-methylphenyl undecyl ketoxime, nickel complexes of 1-phenyl-4-lauroyl-5-hydroxypyrazole, with or without additional ligands.

2.6. Sterically hindered amines, for example bis(2,2,6,6-tetramethylpiperidin-4-yl) sebacate, bis(2,2,6,6-tetramethylpiperidin-4-yl) succinate, bis(1,2,2,6,6-pentamethylpiperidin-4-yl) sebacate, bis(1-octyloxy-2,2,6,6-tetramethylpiperidin-4-yl) sebacate, bis(1,2,2,6,6-pentamethylpiperidyl) n-butyl-3,5-di-tert-butyl-4-hydroxybenzylmalonate, the condensate of 1-hydroxyethyl-2,2,6,6-tetramethyl-4-hydroxypiperidine and succinic acid, the linear or cyclic condensates of N,N'-bis(2,2,6,6-tetramethyl-4-piperidyl)hexamethylenediamine and 4-tert-octylamino-2,6-dichloro-1,3,5-s-triazine, tris(2,2,6,6-tetramethyl-4-piperidyl) nitrilotriacetate, tetrakis(2,2,6,6-tetramethyl-4-piperidyl) 1,2,3,4-butanetetraoate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl) sebacate, bis(1-octyloxy-2,2,6,6-tetramethylpiperidyl) succinate, the linear or cyclic condensates of N,N'-bis-(2,2,6,6-tetramethyl-4-piperidyl)hexamethylenediamine and 4-morph'olino-2,6-dichloro-1,3,5-triazine, the condensate of 2-chloro-4,6-di(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, the condensate of N,N'-bis(2,2,6,6-tetramethyl-4-piperidyl)-hexamethylenediamine and 4-cyclohexylamino-2,6-dichloro-1,3,5-triazine, the condensate of 1,2-bis(3-aminopropylamino)ethane and 2,4,6-trichloro-1,3,5-triazine and also 4-butylamino-2,2,6,6-tetramethylpiperidine (CAS Reg. No. [136504-96-6]); N-(2, 2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4.5]decane, the reaction product of 7,7,9,9-tetramethyl-2-cycloundecyl-1-oxa-3,8-diaza-4-oxospiro[4.5]decane and epichlorohydrin, 1,1-bis(1,2,2,6,6-pentamethyl-4-piperidyloxycarbonyl)-2-(4-methoxyphenyl)ethene, N,N'-bisformyl-N,N'-bis(2,2,6,6-tetramethyl-4-piperidyl)-hexamethylenediamine, the diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, the reaction product of maleic anhydride-α-olefin copolymer and 2,2,6,6-tetramethyl-4-aminopiperidine or 1,2,2,6,6-pentamethyl-4-aminopiperidine.

2.7. Oxaldiamides, for example 4,4'-dioctyloxyoxanilide, 2,2'-diethoxy-oxanilide, 2,2'-dioctyloxy-5,5'-di-tert-butoxanilide, 2,2'-didodecyloxy-5,5'-di-tert-butyloxanilide, 2-ethoxy-2'-ethyloxanilide, N,N'-bis(3-dimethylaminopropyl)oxalamide, 2-ethoxy-5-tert-butyl-2'-ethyloxanilide and its mixture with 2-ethoxy-2'-ethyl-5,4'-di-tert-butoxanilide and mixtures of o- and p-methoxy and of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropyloxy)phenyl]-4,6-bis(2,4-dimethylphenyl)-1,3,5-triazine, 2-[2-hydroxy-4-(2-hydroxy-3-octyloxypropyloxy)phenyl]-4,6-bis(2,4-dimethylphenyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example, N,N'-diphenyloxalamide, N-salicylal-N'-salicyloyl hydrazine, N,N'-bis(salicyloyl)hydrazine, N,N'-bis(3,5-di-tert-butyl-4-hydroxyphenyl-propionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl) oxalyl dihydrazide, N,N'-bis(salicyloyl)thiopropionyl dihydrazide.

4.Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)pentaerythritol diphosphite, bisisodecyloxypentaerythritol diphosphite, bis(2,4-di-tert-butyl-6-methylphenyl)pentaerythritol diphosphite, bis(2,4,6-tri-tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenzo[d,g]-1,3,2-dioxaphosphocin, 6-fluoro-2,4,8,10-tetra-tert-butyl-12-methyl-dibenzo[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 2,2',2"-nitrilo[triethyl-tris-(3,3',5,5"tetra-tert-butyl-1,1'-biphenyl-2,2'-diyl)phosphite], 2-ethylhexyl-(3,3',5,5'-tetra-tert-butyl-1,1'-biphenyl-2,2'-diyl)phosphite.

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine from hydrogenated tallow fatty amines.

6. Nitrones, for example N-benzyl alpha-phenyl nitrone, N-ethyl alpha-methyl nitrone, N-octyl alpha-heptyl nitrone, N-lauryl alpha-undecyl nitrone, N-tetradecyl alpha-tridecyl nitrone, N-hexadecyl alpha-pentadecyl nitrone, N-octadecyl alpha-heptadecyl nitrone, N-hexadecyl alpha-heptadecyl nitrone, N-octadecyl alpha-pentadecyl nitrone, N-heptadecyl alpha-heptadecyl nitrone, N-octadecyl alpha-hexadecyl-nitrone, and nitrones derived from N,N-dialkylhydroxylamines prepared from hydrogenated tallow fatty amines.

7. Thiosynergists, for example dilauryl thiodiproprionate or distearyl thiodipropionate.

8. Peroxide scavengers, for example esters of β-thiodipropionic acid, for example the lauryl, stearyl, myristyl or tridecyl esters, mercaptobenzimidazole, the zinc salt of 2-mercaptobenzimidazole, zinc dibutyldithiocarbamate, dioctadecyl disulfide, pentaerythritol tetrakis(β-dodecylmercapto)propionate.

9. Polyamide stabilizers, for example copper salts in combination with iodides and/or phosphorus compounds and salts of divalent manganese.

10. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate, potassium palmitate, antimony pyrocatecholate or zinc pyrocatecholate.

11. Nucleating agents, for example inorganic substances, such as talc, metal oxides such as titanium dioxide or magnesium oxide, phosphates, carbonates or sulfates of, preferably, alkaline earth metals; organic compounds such as mono- or polycarboxylic acids and their salts, such as 4-tert-butylbenzoic acid, adipic acid, diphenyl acetic acid, sodium succinate or sodium benzoate; and polymeric compounds, for example ionic copolymers (ionomers).

12. Fillers and reinforcing agents, for example calcium carbonate, silicates, glass fibres, glass beads, talc, kaolin, mica, barium sulfate, metal oxides and hydroxides., carbon black, graphite, wood flour and flours or fibres of other natural products, and synthetic fibres.

13. Other additives, for example plasticizers, lubricants, emulsifiers, pigments, rheological additives, catalysts, levelling assistants, optical brighteners, flameproofing agents, antistatic agents, blowing agents.

The costabilizers are added, for example, in concentrations of from 0.01 to 10%, based on the overall weight of the organic material to be stabilized.

The fillers and reinforcing agents (item 12 in the list), for example talc, calcium carbonate, mica or kaolin, are added to the polyolefins in concentrations, for example,:of from 0.01 to 40%, based on the overall weight of the polyolefins to be stabilized.

The fillers and reinforcing agents (item 12 in the list), for example metal hydroxides, especially aluminium hydroxide or magnesium hydroxide, are added to the polyolefins in concentrations, for example, of from 0.01 to 60%, based on the overall weight of the polyolefins to be stabilized.

Carbon black as filler is added to the polyolefins in concentrations, judiciously, of from 0.01 to 5%, based on the overall weight of the polyolefins to be stabilized.

Glass fibers as reinforcing agents are added to the polyolefins in concentrations, judiciously, of from 0.01 to 20%, based on the overall weight of the polyolefins to be stabilized.

Further preferred compositions comprise in addition to components (a) to (d) further additives as well, especially alkaline earth metal salts of higher fatty acids, for example calcium stearate.

As a conventional stabilizer combination for processing polymeric organic materials, for example polyolefins, to form corresponding mouldings, the combination of a phenolic antioxidant with a secondary antioxidant based on an organic phosphite or phosphonite is recommended. Depending on the particular substrate and process, however, many polyolefin processors are forced to operate processes in the high-temperature region above about 280° C. By virtue of the incorporation of a novel processing stabilizer mixture of components (b) and (c) or (b), (c) and (d), which is specially suitable for high-temperature applications, in particular in the temperature range above 300° C., industrial materials and mouldings, based for instance on high-density polyethylene, for example pipes and their technical variants (fittings), can be produced at a greater rate and with fewer rejects. Another advantage of this stabilizer mixture is that it can be employed in very small amounts. This leads to a reduction in the overall concentration of antioxidant relative to conventional stabilizer mixtures. Thus the use of a low concentration of a stabilizer of the benzofuran-2-one type [component (b)] allows a reduction in the overall concentration of stabilizer by about a third in polyolefins, for example, which simultaneously represent an economic advantage.

The incorporation of components (b) and (c) or (b), (c) and (d), and further additives if desired, into the polymeric, organic material is carried out by known methods, for example prior to or during shaping or else by applying the dissolved or dispersed stabilizer mixture to the polymeric organic material, with or without subsequent evaporation of the solvent. The stabilizer mixture of components (b) and (c) or (b), (c) and (d) with or without further additives, can also be added in the form of a master batch, which contains these components in a concentration, for example, of from 2.5 to 25% by weight, to the materials that are to be stabilized.

The stabilizer mixture of components (b) and (c) or (b), (c) and (d), with or without further additives, can also be added before or during polymerization or prior to crosslinking.

The stabilizer mixture of components (b) and (c) or (b), (c) and (d), with or Without further additives, can be incorporated in pure form or encapsulated in waxes, oils or polymers into the organic material that is to be stabilized.

The stabilizer mixture of components (b) and (c) or (b), (c) and (d), with or without further additives, can also be sprayed onto the polymer that is to be stabilized. It is able to dilute other additives (for example the conventional additives indicated above) or their melts so that they too can be sprayed together with these additives onto the polymer that is to be stabilized. Addition by spraying on during the deactivation of the polymerization catalysts is particularly advantageous, it being possible to carry out spraying using, for example, the steam used for deactivation.

In the case of spherically polymerized polyolefins it may, for example, be advantageous to apply the stabilizer mixture of components (b) and (c) or (b), (c) and (d), with or without other additives, by spraying.

The materials stabilized in this way can be employed in a wide variety of forms, for example as films, fibres, tapes, moulding compositions, as profiles or as binders for coating materials, especially powder coatings, adhesives or putties.

The polyolefins stabilized in this way can likewise be employed in a wide variety of forms, especially as thick-layer polyolefin mouldings which are in long-term contact with extractive media, such as, for example, pipes for liquids or gases, films, fibres, geomembranes, tapes, profiles or tanks.

The preferred thick-layer polyolefin mouldings have a layer thickness of from 1 to 50 mm, in particular from 1 to 30 mm, for example from 2 to 10 mm.

As already mentioned, the organic materials to be protected are preferably organic, especially synthetic, polymers. In this context, thermoplastic materials are protected with particular advantage. Attention should be drawn above all in this context to the outstanding activity of the novel stabilizer mixture of components (b) and (c) or (b), (c) and (d) as in-process stabilizers (heat stabilizers). For this purpose they are advantageously added to the polymer prior to or during its processing. However, other polymers too (for example elastomers) or lubricants or hydraulic fluids can be stabilized against degradation, for example light-induced or thermooxidative degradation. Elastomers can be taken from the above listing of possible organic materials.

The lubricants and hydraulic fluids in question are based, for example, on mineral oils or synthetic oils or on mixtures thereof. The lubricants are familiar to the skilled worker and are described in the relevant technical literature, for example in Dieter Klamann, "Schmierstoffe und verwandte Produkte" (Verlag Chemie, Weinheim, 1982), in Schewe-Kobek, "Das Schmiermittel-Taschenbuch" (Dr. Alfred Hüthig-Verlag, Heidelberg, 1974) and in "Ullmanns Enzyklopädie der technischen Chemie", Vol.13, pages 85–94 (Verlag Chemie, Weinheim, 1977).

A preferred embodiment of the present invention is therefore the use of components (b) and (c) or (b), (c) and (d) as stabilizers, especially in-process stabilizers (thermal stabilizers), for organic materials, especially thermoplastic polymers, against oxidative, thermal or light-induced degradation.

The present invention also relates to a stabilizer mixture comprising (i) at least one compound of the benzofuran-2-one type and (ii) at least one compound from the group of the sterically hindered amines.

The present invention likewise relates to a stabilizer mixture comprising (i) at least one compound of the benzofuran-2-one type, (ii) at least one compound from the group of the sterically hindered amines, and (iii) at least one compound from the group of the organic phosphites or phosphonites.

Preference is also given to stabilizer mixtures in which the weight ratio of the components (i):(ii) is from 100:1 to 0.01:100, in particular from 5:1 to 0.01:10.

Preference is likewise given to stabilizer mixtures in which the weight ratio of the components (i):(ii):(iii) is from 100:1:0.01 to 0.01:1:100, in particular from 5:1:0.1 to 0.01:1:10.

The novel stabilizer mixtures of components (b) and (c) or (b), (c) and (d) feature excellent stability to hydrolysis and advantageous colour behaviour, i.e. little discoloration of the organic materials during processing.

Organic materials which are stabilized with the components of the present invention are particularly well protected against light-induced degradation.

The present invention also relates to a process for stabilizing an organic material against oxidative, thermal or light-induced degradation, which comprises incorporating in or applying to said material at least one each of components (b) and (c) or of components (b), (c) and (d).

Preference is given to a process for stabilizing polyolefins that are in long-term contact with extractive media, where the polyolefins are thick-layer polyolefin mouldings and have a layer thickness of from 1 to 50 mm, in particular from 1 to 30 mm, for example from 2 to 10 mm, which comprises incorporating in or applying to said polyolefins at least one each of components (b) and (c) or of (b), (c) and (d).

Also of particular interest is a process for stabilizing thick-layer polyolefin mouldings that are in long-term contact with extractive media, wherein the thick-layer polyolefin mouldings are pipes or geomembranes, which comprises incorporating in or applying to said mouldings at least one each of components (b) and (c) or of (b), (c) and (d).

The term geomembranes refers to films which are employed, for example, in landfill sites and are required to have a service life of up to 300 years.

Extractive media are, for example, liquid or gaseous inorganic or organic materials.

Examples of gaseous inorganic materials are oxygen; nitrogen; oxides of nitrogen; for example NO, laughing gas or $NO_2$; oxides of sulfur, for example sulfur dioxide; halogens, for example fluorine or chlorine; Brbnstedt acids, for example hydrofluoric acid, hydrochloric acid, hydrobromic acid, hydroiodic acid or hydrocyanic acid; or bases, for example ammonia.

Examples of gaseous organic materials are $C_1$–$C_4$alkanes, for example methane, ethane, propane or butane; carbon monoxide; carbon dioxide; or phosgene.

Examples of liquid inorganic materials are water, chlorinated drinking water or aqueous salt solutions, for example sodium chloride solution (brine) or sodium sulfate solution; bromine; acid halides, e.g. titanium tetrachloride, thionyl chloride, nitrosyl chloride or trimethylsilyl chloride; alkalis, for example aqueous sodium hydroxide (NaOH), aqueous potassium hydroxide (KOH), aqueous ammonia solution, aqueous sodium bicarbonate, solution or aqueous sodium carbonate solution.

Examples of liquid organic materials are organic solvents or liquid organic reagents.

Examples of organic solvents are aliphatic hydrocarbons, for example pentane, hexane, heptane, octane, petroleum spirit, nonane or decane; alcohols, for example methanol, ethanol, isopropanol, butanol, pentanol, amyl alcohol, cyclohexanol, pentaerythritol, ethylene glycol, ethylene diglycol, methylcellosolve, polyethylene glycol or glycerol; ketones, for example acetone, diethyl ketone, methyl ethyl ketone, diphenyl ketone or cyclohexanone; ethers, for example diethyl ether, dibutyl ether, tetrahydrofuran or dioxane; aromatic hydrocarbons, for example benzene, toluene or xylene; heterocyclic solvents, for example furan, pyridine, 2,6-lutidine or thiophene; dipolar aprotic solvents, for example dimethylformamide, diethylacetamide or acetonitrile; or surfactants.

For the purposes of the present invention, extractive media are also mixtures and solutions, especially aqueous mixtures, emulsions or solutions, of liquid or gaseous inorganic and organic materials as listed above.

Of particular interest are those extractive media which are important in the chemical industry or in landfill sites.

A preferred embodiment of the present invention is therefore also the use of a stabilizer mixture of components (b) and (c) or of (b), (c) and (d), with or without further additives, for improving the stability of polyolefins that are in long-term contact with extractive media.

The preferred components (b) and (c) or (b), (c) and (d) for use as stabilizers, the process for stabilizing and the stabilizer mixture, are the same as those described for the compositions with an organic material.

The examples which follow illustrate the invention in more detail. Parts and percentages are by weight.

EXAMPLE 1

Stabilizing Polypropylene Fibres Processed at 250° C.

2.0 kg of polypropylene powder (B 10 FB® from Polychim S.A., France), which has a melt index of 12.0 g/dmin measured in accordance with DIN 53735 at 230° C. and 2.16 kg, is homogenized with 0.05% of calcium stearate and with the stabilizers indicated in Tables 1 and 2 for 2 minutes in a high-speed mixer. This mixture is extruded at 60 revolutions per minute in an extruder having a barrel diameter of 20 mm and a length of 400 mm, the three heating zones being set at the following temperatures: 200, 220 and 220° C. The extrudate is passed through a water bath for cooling and then granulated. These granules are processed to give a multifilament fibre. This is done using a single-screw extruder with a melt pump and a 37-hole spinning head. The maximum processing temperature is 250° C.

A portion of the unstretched fibre thus obtained is pressed for 6 minutes at 230° C. to form a sheet with a thickness of 2 mm. The melt index (MFI, melt flow index) of this sheet is measured in accordance with DIN 53735 at 230° C. and 2.16 kg. A large increase in the melt index denotes severe chain degradation and thus poor stabilization. The results are compiled in Table 1.

Another portion of the unstretched fibre thus obtained is treated with a lubricant (Limanol®P 25, Schill und Seilacher, Böblingen, Germany) and subjected to preliminary drawing. This preliminary drawing leads to a fibre strand having a linear density of 416 g/90 m. This means that a fibre strand 90 m in length has a weight of 416 g. In a further operation, this fibre strand is again drawn at 120° C. by a factor of 3.2 using a drawing apparatus. This leads to a fibre strand having a linear density of 130 g/90 m.

A portion of this fibre strand is used to produce a knitted tube. The yellowness index ($YI_1$) of this knitted tube is determined in accordance with ASTM D 1925-77. Low $YI_1$ values denote little discoloration, high $YI_1$ values severe discoloration of the samples. The results are compiled in Table 1. This knitted tube is exposed in the presence of from 4 to 6 ppm nitrogen dioxide ($NO_2$) at 40° C. and 87% relative atmospheric humidity for 48 hours in accordance with AATCC 164. The yellowness index ($YI_2$) of this exposed knitted tube is determined in accordance with ASTM D 1925-77. Low $YI_2$ values denote little discoloration, high $YI_2$ values severe discoloration of the samples. The results are compiled in Table 1.

Another portion of the fibre strand is used to carry out an oven ageing test at 100° C. In this test, a measurement is made, in days, of the time taken for the fibre strand to tear under the test conditions. The longer the period before tearing of the fibre strand, the better the stabilization. The results are compiled in Table 2.

Another portion of the unstretched fibre is pressed for 6 minutes at 230° C. to form a thin film with a thickness of 0.10 mm. This film is subjected to a Xenon test in accordance with DIN 53387. In this test, the film is exposed in a Xenon 1200 weathering apparatus until a carbonyl index of 0.25 is observed in the wavelength range from 1760 to 1680 $cm^{-1}$. The larger the number, the better the stabilization. The results are compiled in Table 2.

TABLE 1

| Example | Stabilizers | $YI_1$ after spinning | $YI_2$ after $NO_2$ exposure | MFI after spinning |
|---|---|---|---|---|
| 1a[a)] | — | −0.5 | 0.8 | 73.0 |
| 1b[b)] | 0.05% Compound (101)[c)] 0.05% Tinuvin ® 622[d)] | −0.6 | 2.7 | 18.7 |
| 1c[b)] | 0.05% Compound (101)[c)] 0.05% Chimassorb ® 944[e)] | −0.2 | 4.2 | 17.7 |
| 1d[b)] | 0.05% Compound (101)[c)] 0.05% Chimassorb ® 119[f)] | −0.7 | 3.4 | 19.6 |
| 1e[b)] | 0.05% Compound (101)[c)] 0.05% Tinuvin ® 622[d)] 0.05% Irgafos ® 168[g)] | −0.9 | 1.0 | 15.9 |
| 1f[b)] | 0.05% Compound (101)[c)] 0.05% Tinuvin ® 622[d)] 0.05% Irgafos ® 12[h)] | −0.5 | 1.3 | 15.6 |
| 1g[b)] | 0.05% Compound (101)[c)] 0.05% Tinuvin ® 622[d)] 0.05% Irgafos ® 38[i)] | −0.2 | 2.0 | 15.2 |
| 1h[b)] | 0.05% Compound (101)[c)] 0.05% Chimassorb ® 944[e)] 0.05% Irgafos ® 12[h)] | −0.5 | 2.4 | 15.5 |
| 1i[b)] | 0.05% Compound (101)[c)] 0.05% Chimassorb ® 944[e)] 0.05% Irgafos ® 38[i)] | −0.6 | 2.4 | 15.7 |
| 1j[b)] | 0.05% Compound (101)[c)] 0.05% Chimassorb ® 119[f)] 0.05% Irgafos ® 168[g)] | −0.2 | 2.5 | 16.2 |
| 1k[b)] | 0.05% Compound (101)[c)] 0.05% Chimassorb ® 119[f)] 0.05% Irgafos ® 12[h)] | −0.4 | 1.8 | 15.5 |
| 1l[b)] | 0.05% Compound (101)[c)] 0.05% Chimassorb ® 119[f)] 0.05% Irgafos ® 38[i)] | −0.4 | 1.4 | 16.3 |

Footnotes a) to i) are given after Table 9 (Example 5).

TABLE 2

| Example | Stabilizers | Oven ageing (days) | Xenon test (hours) |
|---|---|---|---|
| 1a[a)] | — | 1 | 230 |
| 1b[b)] | 0.05% Compound (101)[c)] 0.05% Tinuvin ® 622[d)] | 11 | 1580 |
| 1c[b)] | 0.05% Compound (101)[c)] 0.05% Chimassorb ® 944[e)] | 12 | 1275 |
| 1d[b)] | 0.05% Compound (101)[c)] 0.05% Chimassorb ® 119[f)] | 12 | 1630 |
| 1e[b)] | 0.05% Compound (101)[c)] 0.05% Tinuvin ® 622[d)] 0.05% Irgafos ® 168[g)] | 10 | 1460 |
| 1f[b)] | 0.05% Compound (101)[c)] 0.05% Tinuvin ® 622[d)] 0.05% Irgafos ® 12[h)] | 10 | 1090 |
| 1g[b)] | 0.05% Compound (101)[c)] 0.05% Tinuvin ® 622[d)] 0.05% Irgafos ® 38[i)] | 11 | 1560 |
| 1h[b)] | 0.05% Compound (101)[c)] 0.05% Chimassorb ® 944[e)] 0.05% Irgafos ® 12[h)] | 12 | 1210 |
| 1i[b)] | 0.05% Compound (101)[c)] 0.05% Chimassorb ® 944[e)] 0.05% Irgafos ® 38[i)] | 14 | 1260 |
| 1j[b)] | 0.05% Compound (101)[c)] 0.05% Chimassorb ® 119[f)] 0.05% Irgafos ® 168[g)] | 13 | 1830 |
| 1k[b)] | 0.05% Compound (101)[c)] 0.05% Chimassorb ® 119[f)] 0.05% Irgafos ® 12[h)] | 12 | 1430 |
| 1l[b)] | 0.05% Compound (101)[c)] 0.05% Chimassorb ® 119[f)] 0.05% Irgafos ® 38[i)] | 13 | 1760 |

Footnotes a) to i) are given after Table 9 (Example 5).

EXAMPLE 2

Stabilizing Polypropylene Fibres Processed at 300° C.

2.0 kg of polypropylene powder (B 10 FB® from Polychim S.A., France), which has a melt index of 12.0 g/dmin measured in accordance with DIN 53735 at 230° C. under 2.16 kg, is homogenized with 0.05% of calcium stearate and with the stabilizers indicated in Tables 3 and 4 for 2 minutes in a high-speed mixer. This mixture is extruded at 60 revolutions per minute in an extruder having a barrel diameter of 20 mm and a length of 400 mm, the three heating zones being set at the following temperatures: 200, 220 and 220° C. The extrudate is passed through a water bath for cooling and then granulated. These granules are processed to give a multifilament fibre. This is done using a single-screw extruder with a melt pump and a 37-hole spinning head. The maximum processing temperature is 300° C.

A portion of the unstretched fibre thus obtained is pressed for 6 minutes at 230° C. to form a sheet with a thickness of 2 mm. The melt index (MFI, melt flow index) of this sheet is measured in accordance with DIN 53735 at 230° C. and 2.16 kg. A large increase in the melt index denotes severe chain degradation and thus poor stabilization. The results are compiled in Table 3.

Another portion of the unstretched fibre thus obtained is treated with a lubricant (Limanol®P 25, Schill und Seilacher, Böblingen, Germany) and subjected to preliminary drawing. This preliminary drawing leads to a fibre strand having a linear density of 416 g/90 m. This means that a fibre strand 90 m in length has a weight of 416 g. In a further operation, this fibre strand is again drawn at 120° C. by a factor of 3.2 using a drawing apparatus. This leads to a fibre strand having a linear density of 130 g/90 m.

A portion of this fibre strand is used to produce a knitted tube. The yellowness index ($YI_1$) of this knitted tube is determined in accordance with ASTM D 1925-77. Low $YI_1$ values denote little discoloration, high $YI_1$ values severe discoloration of the samples. The results are compiled in Table 3. This knitted tube is exposed in the presence of from 4 to 6 ppm nitrogen dioxide ($NO_2$) at 40° C. and 87% relative atmospheric humidity for 48 hours in accordance with AATCC 164. The yellowness index ($YI_2$) of this exposed knitted tube is determined in accordance with ASTM D 1925-77. Low $YI_2$ values denote little discoloration, high $YI_2$ values severe discoloration of the samples. The results are compiled in Table 3.

Another portion of the fibre strand is used to carry out an oven ageing test at 100° C. In this test, a measurement is made, in days, of the time taken for the fibre strand to tear under the test conditions. The longer the period before tearing of the fibre strand, the better the stabilization. The results are compiled in Table 4.

Another portion of the unstretched fibre is pressed for 6 minutes at 230° C. to form a thin film with a thickness of 0.10 mm. This film is subjected to a Xenon test in accordance with DIN 53387. In this test, the film is exposed in a Xenon 1200 weathering apparatus until a carbonyl index of 0.25 is observed in the wavelength range from 1760 to 1680 cm$^{-1}$. The larger the number, the better the stabilization. The results are compiled in Table 4.

TABLE 3

| Example | Stabilizers | $YI_1$ after spinning | $YI_2$ after $NO_2$ exposure | MFI after spinning |
|---|---|---|---|---|
| 2a[a)] | — | 0.2 | 1.2 | 112.0 |
| 2b[b)] | 0.100% Compound (101)[c)]<br>0.050% Tinuvin ® 622[d)] | 1.2 | 4.6 | 34.7 |
| 2c[b)] | 0.100% Compound (101)[c)]<br>0.050% Chimassorb ® 944[e)] | 1.6 | 5.4 | 31.7 |
| 2d[b)] | 0.100% Compound (101)[c)]<br>0.050% Chimassorb ® 119[f)] | 0.5 | 4.1 | 31.9 |
| 2e[b)] | 0.075% Compound (101)[c)]<br>0.050% Tinuvin ® 622[d)]<br>0.075% Irgafos ® 168[g)] | 0.7 | 4.7 | 34.3 |
| 2f[b)] | 0.075% Compound (101)[c)]<br>0.050% Tinuvin ® 622[d)]<br>0.075% Irgafos ® 12[h)] | 1.1 | 4.8 | 32.9 |
| 2g[b)] | 0.075% Compound (101)[c)]<br>0.050% Tinuvin ® 622[d)]<br>0.075% Irgafos ® 38[i)] | 1.4 | 4.1 | 29.6 |
| 2h[b)] | 0.075% Compound (101)[c)]<br>0.050% Chimassorb ® 944[e)]<br>0.075% Irgafos ® 168[g)] | 1.5 | 6.6 | 38.5 |
| 2i[b)] | 0.075% Compound (101)[c)]<br>0.050% Chimassorb ® 944[e)]<br>0.075% Irgafos ® 12[h)] | 1.4 | 4.9 | 32.1 |
| 2j[b)] | 0.075% Compound (101)[c)]<br>0.050% Chimassorb ® 944[e)]<br>0.075% Irgafos ® 38[i)] | 1.7 | 4.4 | 31.6 |
| 2k[b)] | 0.075% Compound (101)[c)]<br>0.050% Chimassorb ® 119[f)]<br>0.075% Irgafos ® 168[g)] | 1.4 | 4.6 | 33.9 |
| 2l[b)] | 0.075% Compound (101)[c)]<br>0.050% Chimassorb ® 119[f)]<br>0.075% Irgafos ® 12[h)] | 1.3 | 4.8 | 29.5 |
| 2m[b)] | 0.075% Compound (101)[c)]<br>0.050% Chimassorb ® 119[f)]<br>0.075% Irgafos ® 38[i)] | 0.9 | 4.9 | 28.5 |

Footnotes a) to i) are given after Table 9 (Example 5).

TABLE 4

| Example | Stabilizers | Oven ageing (days) | Xenon test (hours) |
|---|---|---|---|
| 2a[a)] | — | 1 | 190 |
| 2c[b)] | 0.100% Compound (101)[c)]<br>0.050% Chimassorb ® 944[e)] | 39 | 1330 |
| 2d[b)] | 0.100% Compound (101)[c)]<br>0.050% Chimassorb ® 119[f)] | 37 | 1590 |
| 2h[b)] | 0.075% Compound (101)[c)]<br>0.050% Chimassorb ® 944[e)]<br>0.075% Irgafos ® 168[g)] | 39 | 1300 |
| 2j[b)] | 0.075% Compound (101)[c)]<br>0.050% Chimassorb ® 944[e)]<br>0.075% Irgafos ® 38[i)] | 39 | 1230 |
| 2k[b)] | 0.075% Compound (101)[c)]<br>0.050% Chimassorb ® 119[f)]<br>0.075% Irgafos ® 168[g)] | 37 | 1650 |
| 2m[b)] | 0.075% Compound (101)[c)]<br>0.050% Chimassorb ® 119[f)]<br>0.075% Irgafos ® 38[i)] | 37 | 1720 |

Footnotes a) to i) are given after Table 9 (Example 5).

EXAMPLE 3

Stabilizing Polypropylene Fibres Processed at 300° C.

2.0 kg of polypropylene powder (Moplen® FL F 20 from Himont, Italy), which has a melt index of 10.4 g/dmin measured in accordance with DIN 53735 at 230° C. under 2.16 kg, is homogenized with 0.05% of calcium stearate, 0.03% of DHT 4 A® (Kyowa Chemical Industry Co. Ltd., [$Mg_{4.5}Al_2(OH)_{13}CO_3.3.5\ H_2O$]) and with the stabilizers indicated in Tables 5 and 6 for 2 minutes in a high-speed mixer. This mixture is extruded at 60 revolutions per minute in an extruder having a barrel diameter of 20 mm and a length of 400 mm, the three heating zones being set at the following temperatures: 200, 220 and 220° C. The extrudate is passed through a water bath for cooling and then granulated. These granules are processed to give a multifilament fibre. This is done using a single-screw extruder with a melt pump and a 37-hole spinning head. The maximum processing temperature is 300° C.

A portion of the unstretched fibre thus obtained is pressed for 6 minutes at 230° C. to form a sheet with a thickness of 2 mm. The melt index (MFI, melt flow index) of this sheet is measured in accordance with DIN 53735 at 230° C. and 2.16 kg. A large increase in the melt index denotes severe chain degradation and thus poor stabilization. The results are compiled in Tables 5 and 6.

Another portion of the unstretched fibre thus obtained is treated with a lubricant (Limanol®P 25, Schill und Seilacher, Böblingen, Germany) and subjected to preliminary drawing. This preliminary drawing leads to a fibre strand having a linear density of 416 g/90 m. This means that a fibre strand 90 m in length has a weight of 416 g. In a further operation, this fibre strand is again drawn at 120° C. by a factor of 3.2 using a drawing apparatus. This leads to a fibre strand having a linear density of 130 g/90 m. This fibre strand is used to produce a knitted tube. The yellowness index ($YI_1$) of this knitted tube is determined in accordance with ASTM D 1925-77. Low $YI_1$ values denote little discoloration, high $YI_1$ values severe discoloration of the samples. The results are compiled in Tables 5 and 6. This knitted tube is exposed in the presence of from 4 to 6 ppm nitrogen dioxide ($NO_2$) at 40° C. and 87% relative atmospheric humidity for 48 hours in accordance with AATCC 164. The yellowness index ($YI_2$) of this exposed knitted tube is determined in accordance with ASTM D 1925-77. Low $YI_2$ values denote little discoloration, high $YI_2$ values severe discoloration of the samples. The results are compiled in Tables 5 and 6.

TABLE 5

| Example | Stabilizers | YI$_1$ after spinning | YI$_2$ after NO$_2$ exposure | MFI after spinning |
|---|---|---|---|---|
| 3a[a)] | — | 1.8 | 3.2 | 118.0 |
| 3b[b)] | 0.10% Compound (102)[k)] 0.20% Chimassorb ® 944[e)] | 5.6 | 12.4 | 24.9 |
| 3c[b)] | 0.10% Compound (103)[l)] 0.20% Chimassorb ® 944[e)] | 11.6 | 13.3 | 22.4 |
| 3d[b)] | 0.10% Compound (104)[m)] 0.20% Chimassorb ® 944[e)] | 6.6 | 13.2 | 34.6 |

Footnotes a) to m) are given after Table 9 (Example 5).

TABLE 6

| Example | Stabilizers | YI$_1$ after spinning | YI$_2$ after NO$_2$ exposure | MFI after spinning |
|---|---|---|---|---|
| 3a[a)] | — | 1.2 | 3.0 | 113.0 |
| 3e[b)] | 0.10% Compound (102)[k)] 0.20% Chimassorb ® 119[f)] | 4.6 | 9.8 | 23.9 |
| 3f[b)] | 0.10% Compound (103)[l)] 0.20% Chimassorb ® 119[f)] | 5.1 | 6.5 | 22.1 |
| 3g[b)] | 0.10% Compound (104)[m)] 0.20% Chimassorb ® 119[f)] | 4.2 | 9.1 | 31.5 |

Footnotes a) to m) are given after Table 9 (Example 5).

EXAMPLE 4

Stabilizing Polypropylene Fibres Processed at 290° C.

2.0 kg of polypropylene powder (Moplen® FL F 20 from Himont, Italy), which has a melt index of 10.4 g/dmin measured in accordance with DIN 53735 at 230° C. under 2.16 kg, is homogenized with 0.05% of calcium stearate and with the stabilizers indicated in Tables 7 and 8 for 2 minutes in a high-speed mixer. This mixture is extruded at 60 revolutions per minute in an extruder having a barrel diameter of 20 mm and a length of 400 mm;, the three heating zones being set at the following temperatures: 200, 220 and 220° C. The extrudate is passed through a water bath for cooling and then granulated. These granules are processed to give a multifilament fibre. This is done using a single-screw extruder with a melt pump and a 37-hole spinning head. The maximum processing temperature is 290° C.

A portion of the unstretched fibre thus obtained is pressed for 6 minutes at 230° C. to form a sheet with a thickness of 2 mm. The melt index (MFI, melt flow index) of this sheet is measured in accordance with DIN 53735 at 230° C. and 2.16 kg. A large increase in the melt index denotes severe chain degradation and thus poor stabilization. The results are compiled in Tables 7 and 8.

Another portion of the unstretched fibre thus obtained is treated with a lubricant (Limanol®P 25, Schill und Seilacher, Böblingen, Germany) and subjected to preliminary drawing. This preliminary drawing leads to a fibre strand having a linear density of 416 g/90 m. This means that a fibre strand 90 m in length has a weight of 416 g. In a further operation, this fibre strand is again drawn at 120° C. by a factor of 3.2 using a drawing apparatus. This leads to a fibre strand having a linear density of 130 g/90 m. This fibre strand is used to produce a knitted tube. The yellowness index (YI$_1$) of this knitted tube is determined in accordance with ASTM D 1925-77. Low YI$_1$ values denote little discoloration, high YI$_1$ values severe discoloration of the samples. The results are compiled in Tables 7 and 8. This knitted tube is exposed in the presence of from 4 to 6 ppm nitrogen dioxide (NO$_2$) at 40° C. and 87% relative atmospheric humidity for 48 hours in accordance with AATCC 164. The yellowness index (YI$_2$) of this exposed knitted tube is determined in accordance with ASTM D 1925-77. Low YI$_2$ values denote little discoloration, high YI$_2$ values severe discoloration of the samples. The results are compiled in Tables 7 and 8.

TABLE 7

| Example | Stabilizers | YI$_1$ after spinning | YI$_2$ after NO$_2$ exposure | MFI after spinning |
|---|---|---|---|---|
| 4a[a)] | — | 1.7 | 2.8 | 123.0 |
| 4b[b)] | 0.050% Compound (105)[n)] 0.300% Chimassorb ® 944[e)] | 6.8 | 7.3 | 48.9 |
| 4c[b)] | 0.050% Compound (106)[o)] 0.300% Chimassorb ® 944[e)] | 4.8 | 8.9 | 50.1 |
| 4d[b)] | 0.015% Compound (102)[k)] 0.300% Chimassorb ® 944[e)] | 3.7 | 8.2 | 51.7 |
| 4e[b)] | 0.050% Compound (102)[k)] 0.300% Chimassorb ® 944[e)] | 5.2 | 8.9 | 44.2 |
| 4f[b)] | 0.100% Compound (102)[k)] 0.300% Chimassorb ® 944[e)] | 5.9 | 10.5 | 38.8 |
| 4g[b)] | 0.050% Compound (107)[p)] 0.300% Chimassorb ® 944[e)] | 4.9 | 9.9 | 45.8 |
| 4h[b)] | 0.015% Compound (102)[k)] 0.300% Chimassorb ® 944[e)] 0.085% Irgafos ® 168[g)] | 4.5 | 7.2 | 51.3 |
| 4i[b)] | 0.050% Compound (102)[k)] 0.300% Chimassorb ® 944[e)] 0.050% Irgafos ® 168[g)] | 5.7 | 8.7 | 45.8 |

Footnotes a) to p) are given after Table 9 (Example 5).

TABLE 8

| Example | Stabilizers | YI$_1$ after spinning | YI$_2$ after NO$_2$ exposure | MFI after spinning |
|---|---|---|---|---|
| 4a[a)] | — | 1.8 | 3.1 | 119.0 |
| 4j[b)] | 0.050% Compound (105)[n)] 0.300% Chimassorb ® 119[f)] | 3.4 | 6.3 | 43.3 |
| 4k[b)] | 0.050% Compound (106)[o)] 0.300% Chimassorb ® 119[f)] | 3.0 | 6.6 | 44.8 |
| 4l[b)] | 0.015% Compound (102)[k)] 0.300% Chimassorb ® 119[f)] | 3.5 | 6.6 | 53.8 |
| 4m[b)] | 0.050% Compound (102)[k)] 0.300% Chimassorb ® 119[f)] | 2.9 | 7.3 | 47.0 |
| 4n[b)] | 0.100% Compound (102)[k)] 0.300% Chimassorb ® 119[f)] | 4.2 | 8.8 | 31.6 |
| 4o[b)] | 0.050% Compound (107)[p)] 0.300% Chimassorb ® 119[f)] | 3.0 | 7.0 | 42.0 |
| 4p[b)] | 0.015% Compound (102)[k)] 0.300% Chimassorb ® 119[f)] 0.085% Irgafos ® 168[g)] | 2.9 | 6.8 | 46.0 |
| 4q[b)] | 0.050% Compound (102)[k)] 0.300% Chimassorb ® 119[f)] 0.050% Irgafos ® 168[g)] | 3.1 | 7.7 | 44.9 |

Footnotes a) to p) are given after Table 9 (Example 5).

EXAMPLE 5

Stabilizing Polypropylene Fibres Processed at 270° C.

2.0 kg of polypropylene powder (Profax® 6301 from Himont, Canada), which has a melt index of 10.4 g/dmin measured in accordance with DIN 53735 at 230° C. under 2.16 kg, is homogenized with 0.05% of calcium stearate, 0.03% of DHT 4A® (Kyowa Chemical Industry Co. Ltd., [$Mg_{4.5}Al_2(OH)_{13}CO_3 \cdot 3.5\ H_2O$]) and with the stabilizers indicated in Table 9 for 2 minutes in a high-speed mixer. This mixture is extruded at 60 revolutions per minute in an extruder having a barrel diameter of 20 mm and a length of 400 mm, the three heating zones being set at the following temperatures: 200, 220 and 220° C. The extrudate is passed through a water bath for cooling and then granulated. These granules are processed to give a multifilament fibre. This is done using a single-screw extruder with a melt pump and a 37-hole spinning head. The maximum processing temperature is 270° C.

A portion of the unstretched fibre thus obtained is pressed for 6 minutes at 230° C. to form a sheet with a thickness of 2 mm. The melt index (MFI, melt flow index) of this sheet is measured in accordance with DIN 53735 at 230° C. and 2.16 kg. A large increase in the melt index denotes severe chain degradation and thus poor stabilization. The results are compiled in Table 9.

Another portion of the unstretched fibre thus obtained is treated with a lubricant (Limanol®P 25, Schill und Seilacher, Böblingen, Germany) and subjected to preliminary drawing. This preliminary drawing leads to a fibre strand having a linear density of 416 g/90 m. This means that a fibre strand 90 m in length has a weight of 416 g. In a further operation, this fibre strand is again drawn at 120° C. by a factor of 3.2 using a drawing apparatus. This leads to a fibre strand having a linear density of 130 g/90 m. This fibre strand is used to produce a knitted tube. The yellowness index ($YI_1$) of this knitted tube is determined in accordance with ASTM D 1925-77. Low $YI_1$ values denote little discoloration, high $YI_1$ values severe discoloration of the samples. The results are compiled in Table 9. This knitted tube is exposed in the presence of from 4 to 6 ppm nitrogen dioxide ($NO_2$) at 40° C. and 87% relative atmospheric humidity for 48 hours in accordance with AATCC 164. The yellowness index ($YI_2$) of this exposed knitted tube is determined in accordance with ASTM D 1925-77. Low $YI_2$ values denote little discoloration, high $YI_2$ values severe discoloration of the samples. The results are compiled in Table 9.

TABLE 9

| Example | Stabilizers | $YI_1$ after spinning | $YI_2$ after $NO_2$ exposure | MFI after spinning |
|---|---|---|---|---|
| 5a[a] | — | 1.3 | 2.9 | 71.0 |
| 5b[b] | 0.10% Compound (105)[n] 0.30% Chimassorb ® 944[e] | 2.9 | 9.6 | 25.6 |
| 5c[b] | 0.20% Compound (105)[n] 0.30% Chimassorb ® 944[e] | 4.4 | 13.0 | 22.6 |
| 5d[b] | 0.10% Compound (108)[q] 0.30% Chimassorb ® 119[f] | 4.4 | 10.7 | 27.7 |
| 5e[b] | 0.20% Compound (108)[q] 0.30% Chimassorb ® 119[f] | 4.5 | 12.0 | 20.6 |
| 5f[b] | 0.05% Compound (105)[n] 0.30% Chimassorb ® 944[e] 0.05% Irgafos ® 168[g] | 4.4 | 11.5 | 33.0 |
| 5g[b] | 0.10% Compound (105)[n] 0.30% Chimassorb ® 944[e] 0.10% Irgafos ® 168[g] | 4.3 | 12.0 | 22.1 |
| 5h[b] | 0.05% Compound (105)[n] 0.30% Chimassorb ® 944[e] 0.05% Irgafos ® P-EPQ[r] | 4.3 | 11.5 | 31.3 |

TABLE 9-continued

| Example | Stabilizers | $YI_1$ after spinning | $YI_2$ after $NO_2$ exposure | MFI after spinning |
|---|---|---|---|---|
| 5i[b] | 0.10% Compound (105)[n] 0.30% Chimassorb ® 944[e] 0.10% Irgafos ® P-EPQ[r] | 4.7 | 14.6 | 21.2 |
| 5j[b] | 0.05% Compound (108)[n] 0.30% Chimassorb ® 119[f] 0.05% Irgafos ® 168[g] | 3.3 | 9.1 | 37.6 | a) Comparison examples.

b) Examples according to the invention.

c) Compound (101) is a mixture of about 85 parts by weight of the compound of the formula Va and about 15 parts by weight of the compound of the formula Vb.

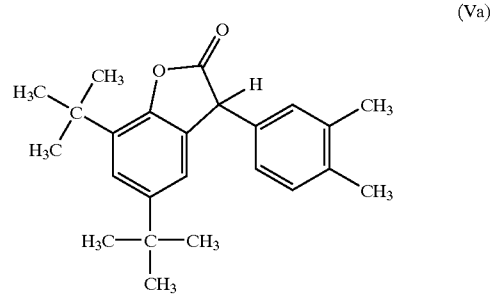

(Va)

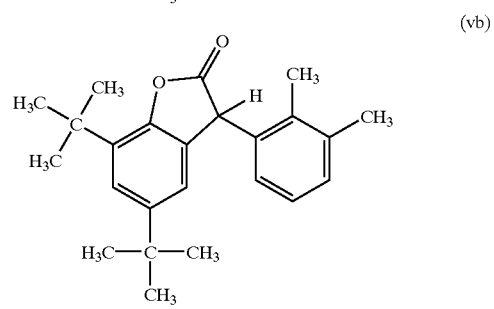

(vb)

d) Tinuvin®622 (Ciba Spezialitätenchemie AG) is a compound of the formula H4 in which the average molecular weight is about 3000.

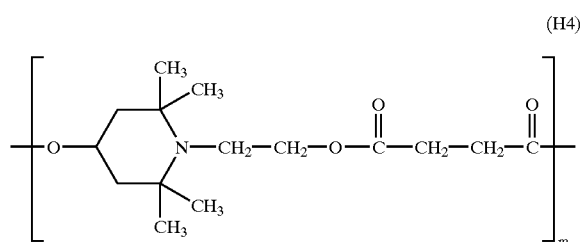

(H4)

e) Chimassorb®944 (Ciba Spezialitätenchemie AG) denotes linear or cyclic condensation products prepared from N,N'-bis(2,2,6,6-tetramethyl-4-piperidyl) hexamethyiendiamine and 4-tert-octylamino-2,6-dichloro-1,3,5-triazine and is a compound of the formula H5 in which the average molecular weight is about 2500.

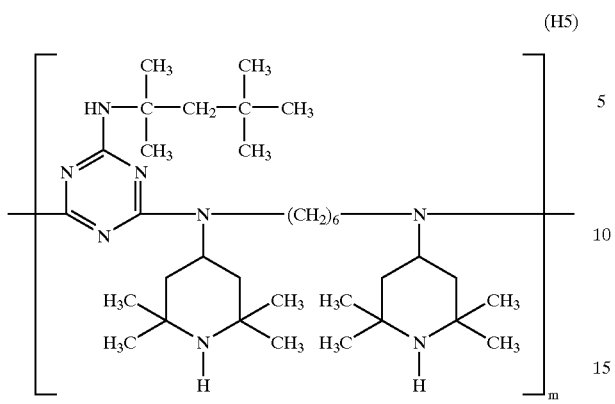

f) Chimassorb®119 (Ciba Spezialitätenchemie AG) denotes condensation products prepared from 2-chloro-4,6-di(4-n-butylamino-1,2,2,6,6-pentamethylpiperidyl)-1,3,5-triazine and 1,2-bis(3-aminopropylamino)ethane and is a compound of the formula H9

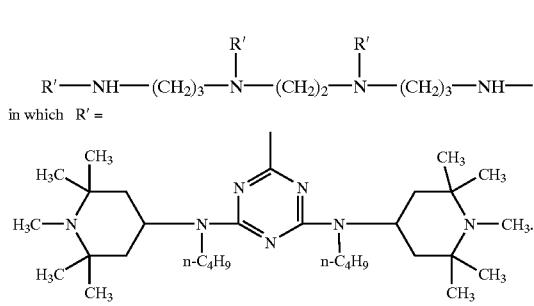

g) Irgafos®168 (Ciba Spezialitätenchemie AG) is tris(2,4-di-tert-butylphenyl)phosphite.

h) Irgafos®12 (Ciba Spezialitätenchemie AG) is a compound of the formula B.

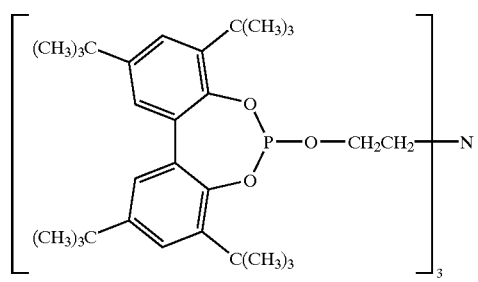

i) Irgafos®38 (Ciba Spezialitätenchemie AG) is a compound of the formula G.

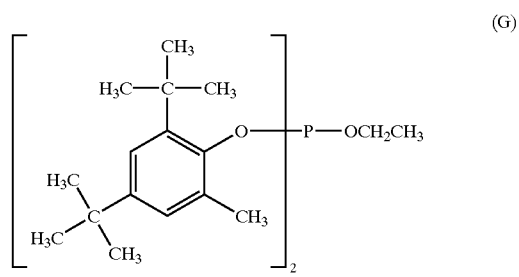

k) Compound (102) is a compound of the formula Vc.

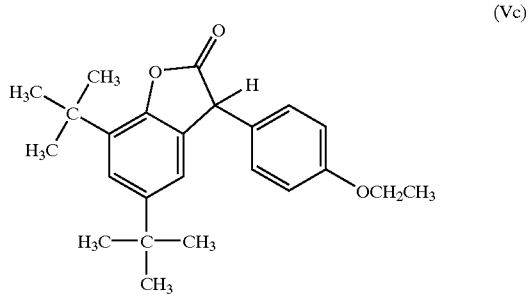

l) Compound (103) is a compound of the formula Vd.

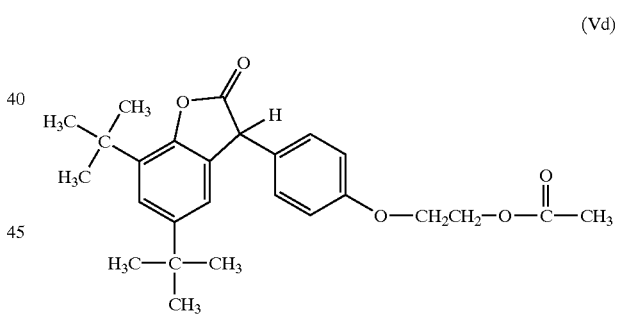

m) Compound (104) is a compound of the formula Ve.

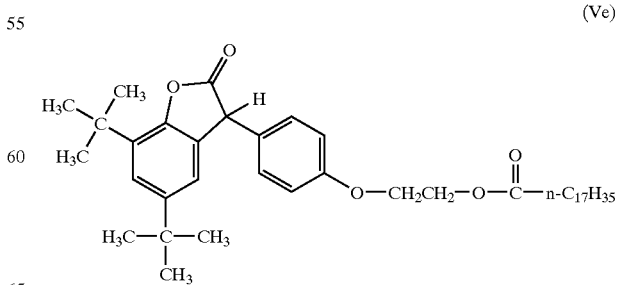

n) Compound (105) is a compound of the formula Vf.

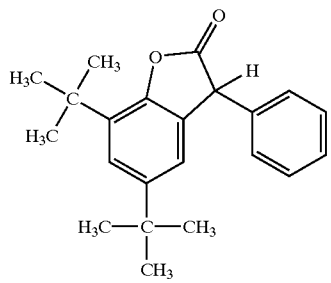

o) Compound (106) is a compound of the formula Vg.

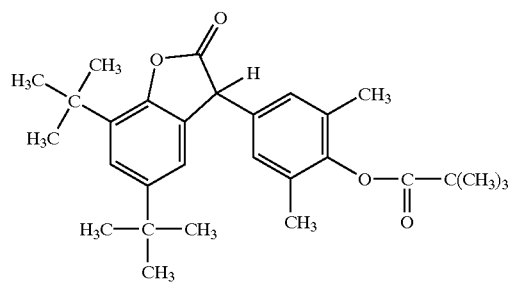

p) Compound (107) is a compound of the formula Vh.

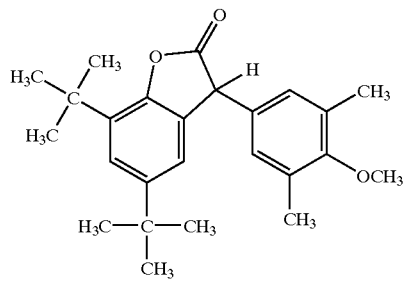

q) Compound (108) is a compound of the formula Vi.

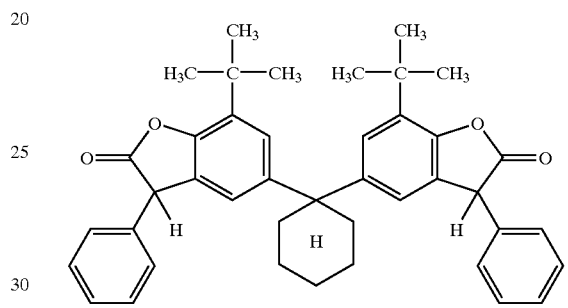

r) Irgafos®P-EPQ (Ciba Spezialitätenchemie AG) is a compound of the formula H.

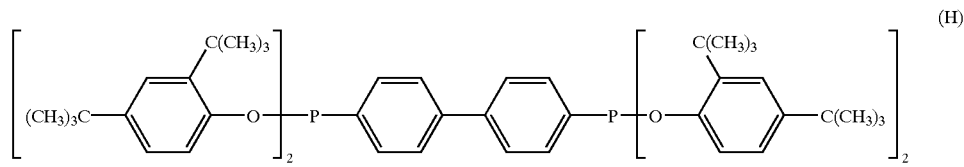

What is claimed is:

1. A composition comprising a) a polyolefin subject to oxidative, thermal or light-induced degradation, b) from 0.0005 to 5% based on the weight of component (a) of at least one compound of the formula V

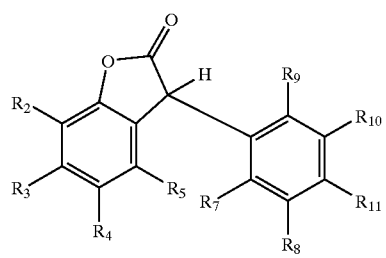

in which
$R_2$ is hydrogen or $C_1$–$C_6$alkyl,
$R_3$ is hydrogen,
$R_4$ is hydrogen, $C_1$–$C_6$alkyl or a radical of the formula IIIa

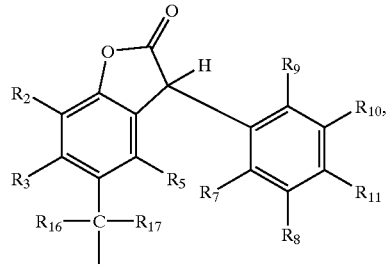

(IIIa)

$R_5$ is hydrogen,
$R_7$, $R_8$, $R_9$, $R_{10}$ and $R_{11}$ independently of one another are hydrogen, $C_1$–$C_4$alkyl, $C_1$–$C_4$alkoxy, $C_2$–$C_6$alkanoyloxy or

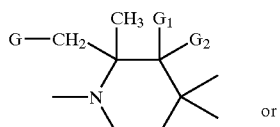

with the proviso that at least two of the radicals $R_7$, $R_8$, $R_9$, $R_{10}$ or $R_{11}$ are hydrogen,
$R_{16}$ and $R_{17}$, together with the C atom to which they are attached, form a cyclohexylidene ring which is unsubstituted or substituted by $C_1$–$C_4$alkyl;
$R_{20}$, $R_{21}$ and $R_{22}$ are hydrogen, and
$R_{23}$ is hydrogen or $C_1$–$C_{18}$alkanoyl, and
c) from 0.01 to 10% based on the weight of component (a) of at least one compound having at least one sterically hindered amine radical of the formula XII or XIII

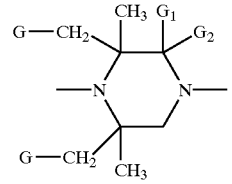

(XII)

or (XIII)

in which
G is hydrogen or methyl, and
$G_1$ and $G_2$ are hydrogen, methyl or together are oxygen, and with the proviso that the sterically hindered amine compound does not additionally contain a phosphite or phosphonite moiety.

2. A composition according to claim 1, additionally comprising
d) from 0.01 to 10% based on the weight of component (a) of at least one compound selected from the group consisting of the organic phosphites or phosphonites, and with the proviso that the an organic phosphite or phosphonite compound does not additionally contain a sterically hindered amine radical.

3. A composition according to claim 1, in which component (c) is a compound of the formula H1, H2, H3, H4, H5, H6, H7, H8 or H9

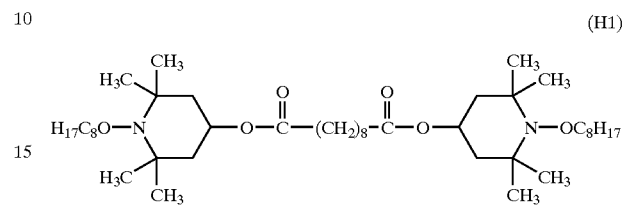

(H1)

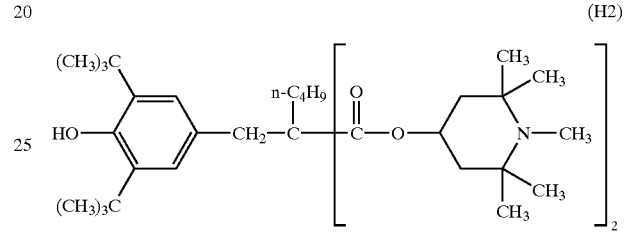

(H2)

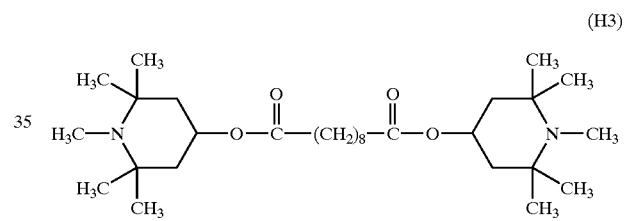

(H3)

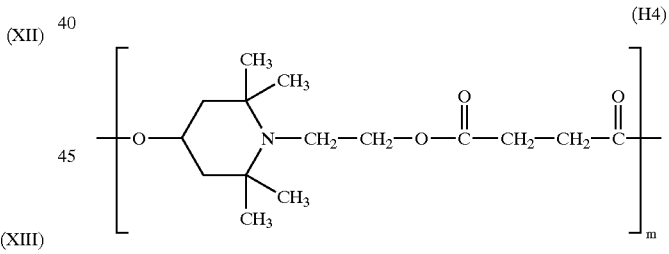

(H4)

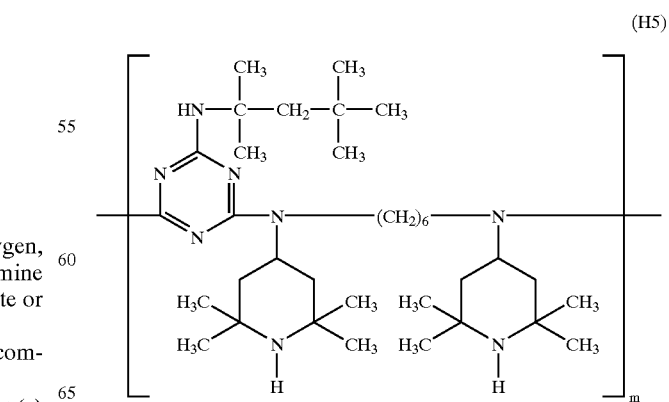

(H5)

-continued (H6)

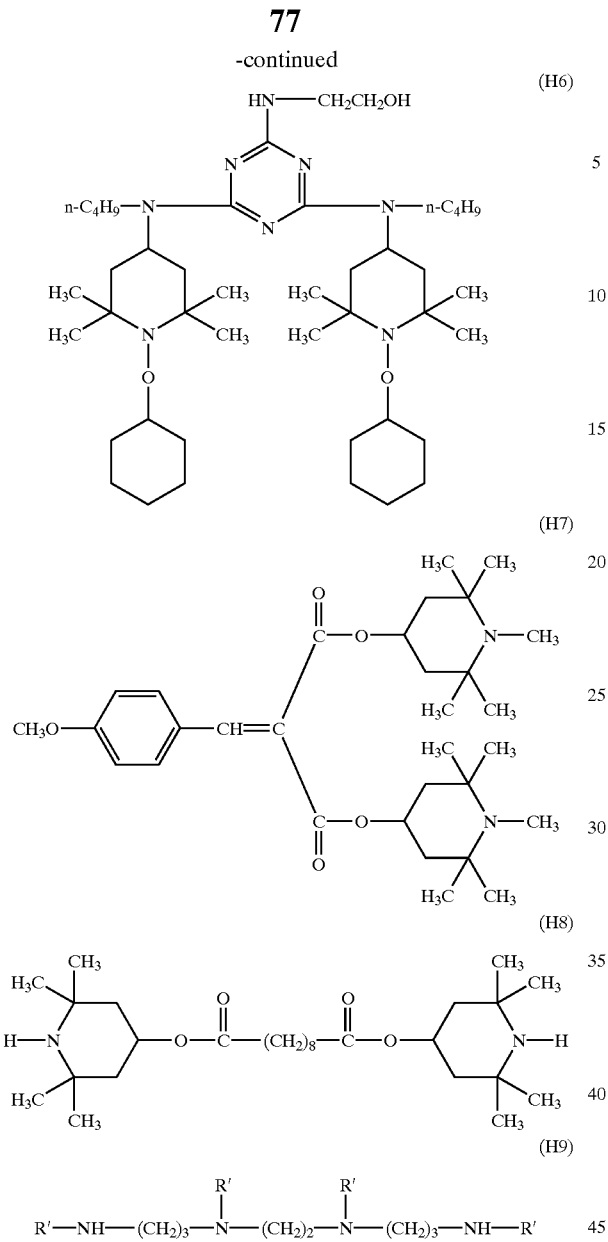

(H7)

(H8)

(H9)

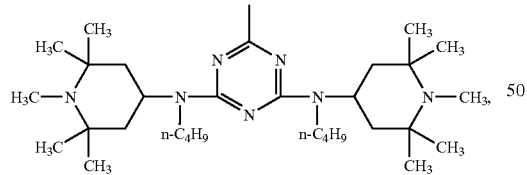

in which R' =

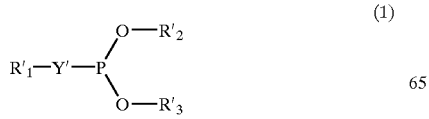

and m is a number from the range from 2 to 200.

4. A composition according to claim 2, comprising as component (d) a compound of the formula 1, 2, 3, 4, 5, 6 or 7

$$R'_1-Y'-P\begin{matrix}O-R'_2\\O-R'_3\end{matrix}\quad(1)$$

-continued $$\left[A'-X'-P\begin{matrix}O-R'_2\\O-R'_3\end{matrix}\right]_{n'}\quad(2)$$

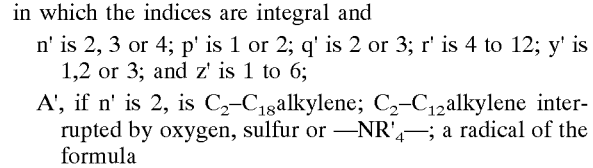

(5)

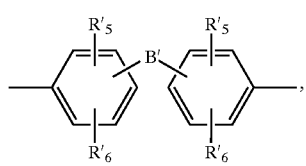

(6)

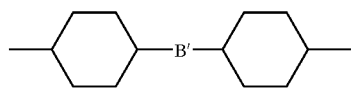

(7)

in which the indices are integral and n' is 2, 3 or 4; p' is 1 or 2; q' is 2 or 3; r' is 4 to 12; y' is 1,2 or 3; and z' is 1 to 6;

A', if n' is 2, is $C_2$–$C_{18}$alkylene; $C_2$–$C_{12}$alkylene interrupted by oxygen, sulfur or —NR'$_4$—; a radical of the formula or phenylene;

A', if n' is 3, is a radical of the formula —$C_rH_{2r'-1}$—;

A', if n' is 4, is

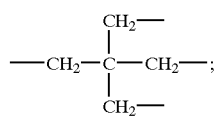

A" is as defined for A' if n' is 2;

B' is a direct bond, —CH$_2$—, —CHR'$_4$—, —CR'$_1$R'$_4$—, sulfur, C$_5$–C$_7$cycloalkylidene, or cyclohexylidene which is substituted by from 1 to 4 C$_1$–C$_4$alkyl radicals in position 3, 4 and/or 5;

D', if p' is 1, is C$_1$–C$_4$alkyl and, if p' is 2, is —CH$_2$OCH$_2$—;

D", if p' is 1, is C$_1$–C$_4$alkyl;

E', if y' is 1, is C$_1$–C$_{18}$alkyl, —OR'$_1$ or halogen;

E', if y is 2, is —O—A"—O—,

E', if y is 3, is a radical of the formula R'$_4$C(CH$_2$O—)$_3$ or N(CH$_2$CH$_2$O—)$_3$;

Q', is the radical of an at least z'-valent alcohol or phenol, this radical being attached via the oxygen atom to the phosphorus atom;

R'$_1$, R'$_2$ and R'$_3$ independently of one another are C$_1$–C$_{18}$alkyl which is unsubstituted or substituted by halogen, —COOR'$_4$, —CN or —CONR'$_4$R'$_4$; C$_2$–C$_{18}$alkyl interrupted by oxygen, sulfur or —NR'$_4$—; C$_7$–C$_9$phenylalkyl; C$_5$–C$_{12}$cycloalkyl, phenyl or naphthyl; naphthyl or phenyl substituted by halogen, 1 to 3 alkyl radicals or alkoxy radicals having a total of 1 to 18 carbon atoms or by C$_7$–C$_9$phenylalkyl; or a radical of the formula

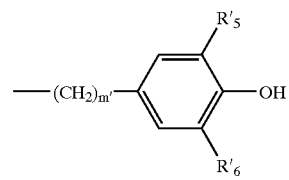

in which m' is an integer from the range 3 to 6;

R'$_4$ is hydrogen, C$_1$–C$_{18}$alkyl, C$_5$–C$_{12}$cycloalkyl or C$_7$–C$_9$phenylalkyl, R'$_5$ and R'$_6$ independently of one another are hydrogen, C$_1$–C$_8$alkyl or C$_5$–C$_6$cycloalkyl, R'$_7$ and R'$_8$, if q' is 2, independently of one another are C$_1$–C$_4$alkyl or together are a 2,3-dehydropentamethylene radical; and R'$_7$ and R'$_8$, if q' is 3, are methyl;

R'$_{14}$ is hydrogen, C$_1$–C$_9$alkyl or cyclohexyl,

R'$_{15}$ is hydrogen or methyl and, if two or more radicals R'$_{14}$ and R'$_{15}$ are present, these radicals are identical or different, X' and Y' are each a direct bond or oxygen, Z' is a direct bond, methylene, —C(R'$_{16}$)$_2$— or sulfur, and R'$_{16}$ is C$_1$–C$_8$alkyl.

5. A composition according to claim 2, in which component (d) is tris(2,4-di-tert-butylphenyl)phosphite, tris(nonylphenyl)phosphite or a compound of the formula A, B, C, D, E, F, G, H, I, K or L

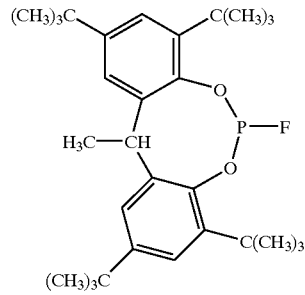

(A)

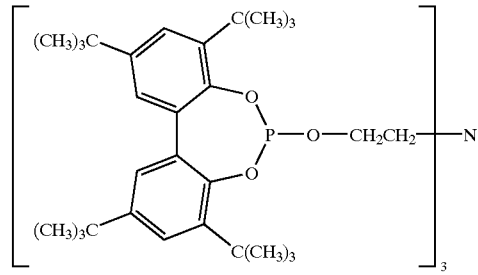

(B)

-continued
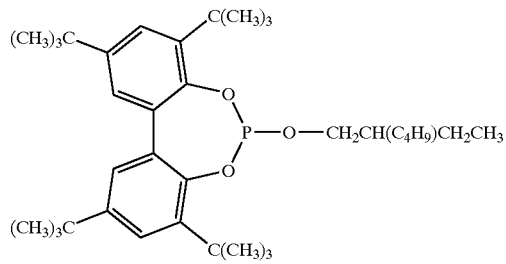
(C)
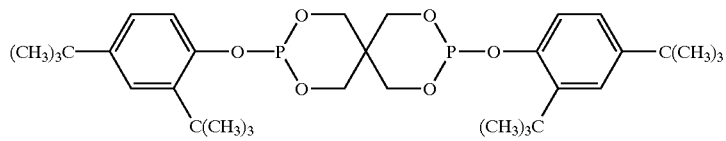
(D)
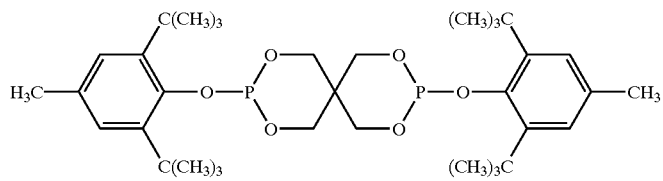
(E)
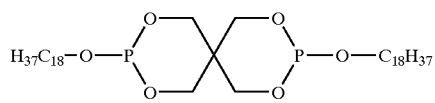
(F)
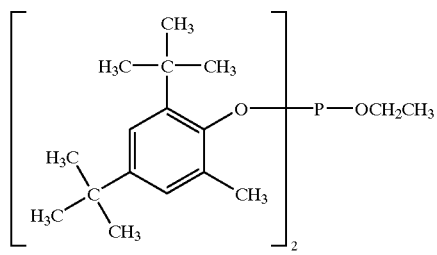
(G)
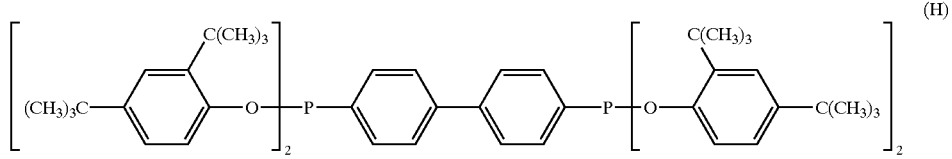
(H)
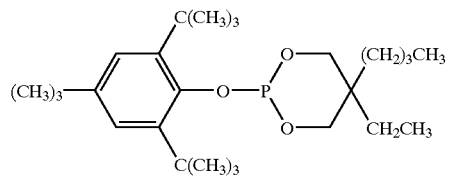
(I)
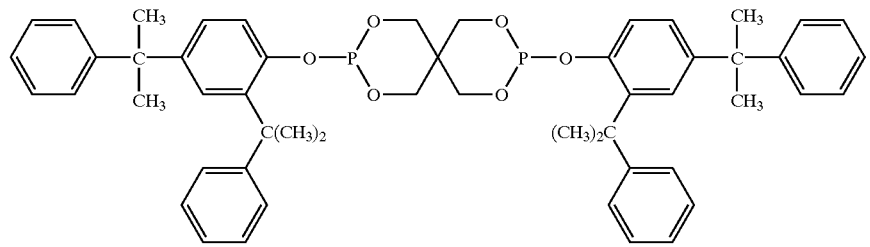
(K)

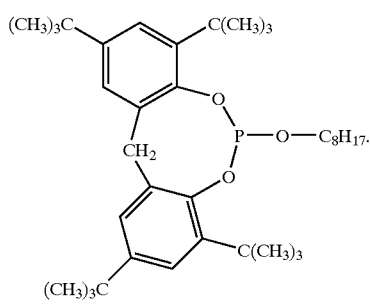

6. A composition according to claim 1, comprising as component (a) a polyolefin fibre.

7. A composition according to claim 1, comprising as component (a) an essentially phenol-free polyolefin fibre.

8. A composition according to claim 1, comprising as component (a) polyethylene or polypropylene or a copolymer thereof with mono- and diolefins.

9. A stabilizer mixture comprising i) an effective stabilizing amount of at least one compound of the formula V

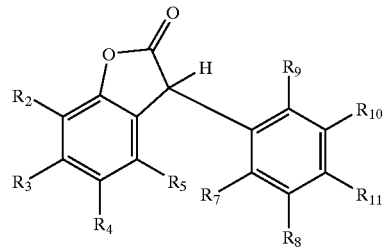

in which $R_2$ is hydrogen or $C_1$–$C_6$alkyl, $R_3$ is hydrogen, $R_4$ is hydrogen, $C_1$–$C_6$alkyl or a radical of the formula IIIa

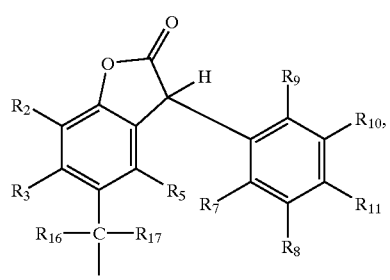

$R_5$ is hydrogen, $R_7$, $R_8$, $R_9$, $R_{10}$ and $R_{11}$ independently of one another are hydrogen, $C_1$–$C_4$alkyl, $C_1$–$C_4$alkoxy, $C_2$–$C_6$alkanoyloxy or

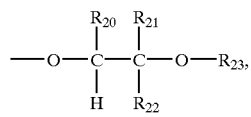

with the proviso that at least two;of the radicals $R_7$, $R_8$, $R_9$, $R_{10}$ or $R_{11}$ are hydrogen, $R_{16}$ and $R_{17}$, together with the C atom to which they are attached, form a cyclohexylidene ring which is unsubstituted or substituted by $C_1$–$C_4$alkyl;

$R_{20}$, $R_{21}$ and $R_{22}$ are hydrogen, and $R_{23}$ is hydrogen or $C_1$–$C_{18}$alkanoyl, and ii) an effective stabilizing amount of at least one compound having at least one sterically hindered amine radical of the formula XII or XIII (XII)

(XIII)

in which

G is hydrogen or methyl, and $G_1$ and $G_2$ are hydrogen, methyl or together are oxygen, in which the weight ratio of the components (i):(ii) is from 100:1 to 0.01:100, and with the proviso that the sterically hindered amine compound does not additionally contain a phosphite or phosphonite moiety.

10. A stabilizer mixture according to claim 9, additionally comprising iii) at least one compound selected from the group consisting of the organic phosphites or phosphonites, in which the weight ratio of the components (i):(ii):(iii) is from 100:1:0.01 to 0.01:1:100, and with the proviso that the an organic phosphite or phosphonite compound does not additionally contain a sterically hindered amine radical.

11. A process for stabilizing an organic material against oxidative, thermal or light-induced degradation, which comprises incorporating in or applying to said material at least one each of components (b) and (c) according to claim 1.

12. A composition according to claim 1 in which component (b) is

3-[4-(2-acetoxyethoxy)phenyl]-5,7-di-tert-butyl-benzofuran-2-one;

5,7-di-tert-butyl-3-[4-(2-stearoyloxyethoxy)phenyl] benzofuran-2-one;

3,3'-bis[5,7-di-tert-butyl-3-(4-[2-hydroxyethoxy]phenyl) benzofuran-2-one];

5,7-di-tert-butyl-3-(4-ethoxyphenyl)benzofuran-2-one;

3-(4-acetoxy-3,5-dimethylphenyl)-5,7-di-tert-butylbenzofuran-2-one;

3-(3,5-dimethyl-4-pivaloyloxy-phenyl)-5,7-di-tert-butyl-benzofuran-2-one;

5,7-di-tert-butyl-3-phenylbenzofuran-2-one;

5,7-di-tert-butyl-3-(3,4-dimethylphenyl)benzofuran-2-one; or 5,7-di-tert-butyl-3-(2,3-dimethylphenyl)benzofuran-2-one.

13. A stabilizer mixture according to claim 9 in which component (i) is

3-[4-(2-acetoxyethoxy)phenyl]-5,7-di-tert-butyl-benzofuran-2-one;

5,7-di-tert-butyl-3-[4-(2-stearoyloxyethoxy)phenyl] benzofuran-2-one;

3,3'-bis[5,7-di-tert-butyl-3-(4-[2-hydroxyethoxy]phenyl) benzofuran-2-one];

5,7-di-tert-butyl-3-(4-ethoxyphenyl)benzofuran-2-one;

3-(4-acetoxy-3,5-dimethylphenyl)-5,7-di-tert-butylbenzofuran-2-one;

3-(3,5-dimethyl-4-pivaloyloxy-phenyl)-5,7-di-tert-butyl-benzofuran-2-one;

5,7-di-tert-butyl-3-phenylbenzofuran-2-one;

5,7-di-tert-butyl-3-(3,4-dimethylphenyl)benzofuran-2-one; or 5,7-di-tert-butyl-3-(2,3-dimethylphenyl)benzofuran-2-one.

14. A composition according to claim 1, comprising as component (b) a compound of the formula Va or Vb

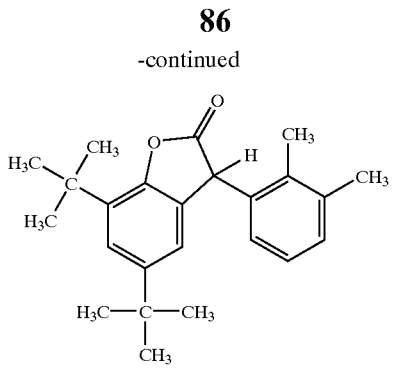

(Va)

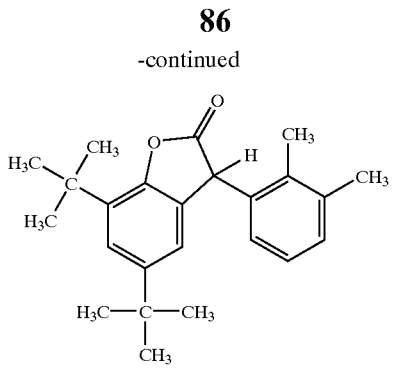

(Vb)

or a mixture of the two compounds of the formula Va and Vb.

15. A stabilizer mixture according to claim 9, comprising as component (i) a compound of the formula Va or Vb

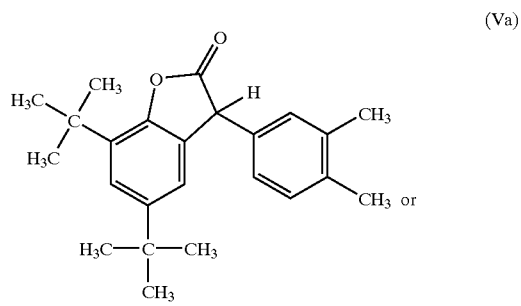

(Va)

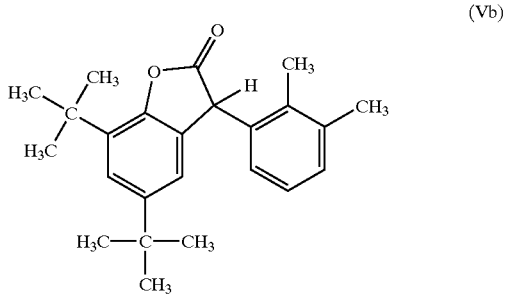

(Vb)

or a mixture of the two compounds of the formula Va and Vb.

16. A composition according to claim 1, comprising as component (c) a compound of the formula H4, H5 or H9

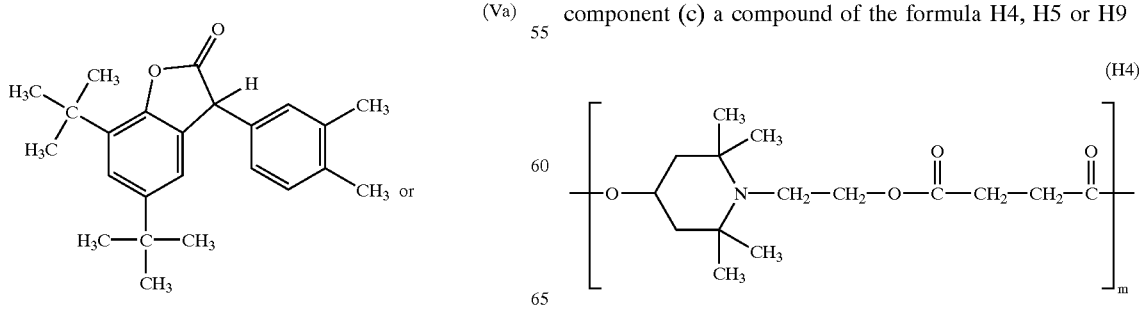

(H4)

-continued (H5)

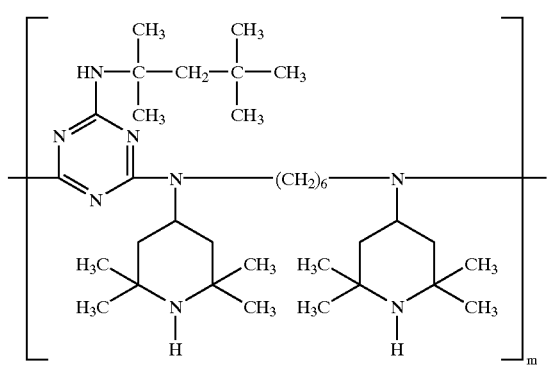

(H9)

R'—NH—(CH$_2$)$_3$—N(R')—(CH$_2$)$_2$—N(R')—(CH$_2$)$_3$—NH—R' in which R' =

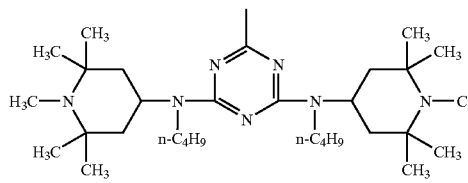

and m is a number from the range from 2 to 200.

17. A composition according to claim 1, comprising as component (b) a compound of the formula Va or Vb (Va)

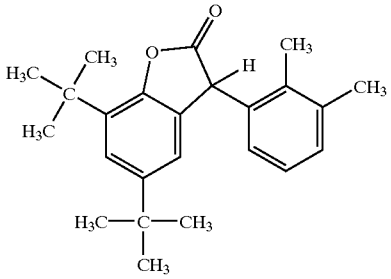

-continued (Vb)

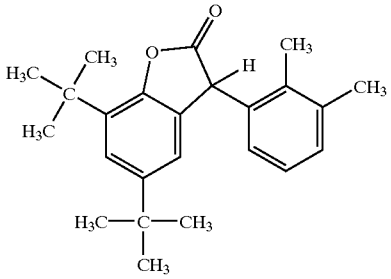

or a mixture of the two compounds of the formula Va and Vb; and, as component (c), a compound of the formula H4, H5 or H9

(H4)

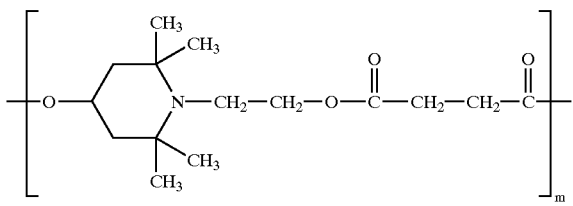

(H5)

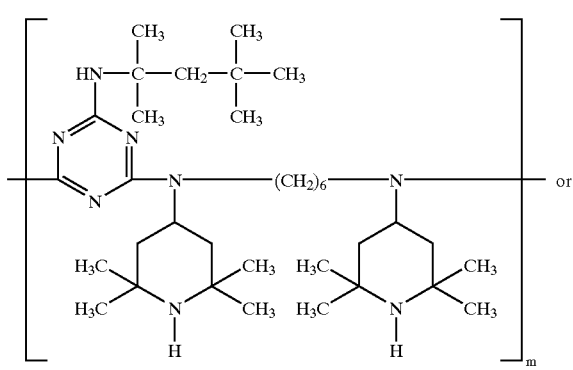

(H9)

R'—NH—(CH$_2$)$_3$—N(R')—(CH$_2$)$_2$—N(R')—(CH$_2$)$_3$—NH—R' in which R' =

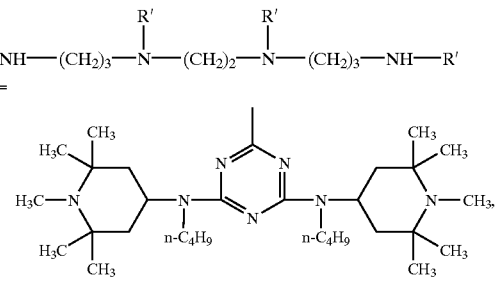

and m is a number from the range from 2 to 200.

* * * * *